United States Patent
Ohkubo et al.

(10) Patent No.: US 10,694,077 B2
(45) Date of Patent: Jun. 23, 2020

(54) COLOR CONVERSION TABLE CREATION APPARATUS AND METHOD, COLOR CONVERSION APPARATUS, AND PROGRAM

(71) Applicant: FUJIFILM Corporation, Tokyo (JP)

(72) Inventors: Akito Ohkubo, Tokyo (JP); Hirokazu Kondo, Tokyo (JP); Hajime Terayoko, Tokyo (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 0 days.

(21) Appl. No.: 16/438,812

(22) Filed: Jun. 12, 2019

(65) Prior Publication Data

US 2019/0297226 A1 Sep. 26, 2019

Related U.S. Application Data

(63) Continuation of application No. PCT/JP2017/041098, filed on Nov. 15, 2017.

(30) Foreign Application Priority Data

Dec. 13, 2016 (JP) .................. 2016-241123

(51) Int. Cl.
*H04N 1/60* (2006.01)
*G06K 15/02* (2006.01)
*H04N 1/00* (2006.01)

(52) U.S. Cl.
CPC ......... *H04N 1/6025* (2013.01); *G06K 15/027* (2013.01); *G06K 15/1878* (2013.01);
(Continued)

(58) Field of Classification Search
None
See application file for complete search history.

(56) References Cited

U.S. PATENT DOCUMENTS

2003/0234943 A1 12/2003 Van Bael
2007/0285694 A1 12/2007 Horita et al.
(Continued)

FOREIGN PATENT DOCUMENTS

EP 1 641 243 A2 3/2006
JP 2009-099129 A 5/2009
(Continued)

OTHER PUBLICATIONS

International Search Report dated Feb. 6, 2018 from the International Searching Authority in counterpart International Application No. PCT/JP2017/041098.

(Continued)

*Primary Examiner* — Scott A Rogers
(74) *Attorney, Agent, or Firm* — Sughrue Mion, PLLC

(57) ABSTRACT

Provided are a color conversion table creation apparatus and method, a color conversion apparatus, and a program capable of further increasing color matching accuracy. A color conversion table creation apparatus includes an image reading unit (30) that acquires read image data of a target printed article, a first color conversion unit (64) that performs color conversion by using a first color conversion table representing a correspondence relationship between a signal value of a first color space obtained from the image reading unit (30) and a chromaticity value of a second color space which is a device-independent color space, an image correlation unit (62) that performs correlation of a positional relationship between the read image data or read chromaticity value image data converted into a chromaticity value and original document image data, and a color conversion table creation unit that creates a second color conversion table representing a multi-dimensional correspondence relationship between a third color space of the original document image data and a second color space on the basis of a
(Continued)

correspondence relationship between the original document image data and a chromaticity value of a read image, in which a first printed article which is printed by a printing apparatus (18) on the basis of first image data is read by the image reading unit (30), and thus an output device color conversion table (94A) is created.

25 Claims, 33 Drawing Sheets

(52) U.S. Cl.
CPC ..... *H04N 1/00015* (2013.01); *H04N 1/00034* (2013.01); *H04N 1/00045* (2013.01); *H04N 1/00068* (2013.01); *H04N 1/00087* (2013.01); *H04N 1/60* (2013.01); *H04N 1/6033* (2013.01); *H04N 1/6058* (2013.01)

(56) References Cited

U.S. PATENT DOCUMENTS

| | | |
|---|---|---|
| 2009/0086226 A1 | 4/2009 | Iguchi et al. |
| 2015/0365564 A1 | 12/2015 | Imaseki et al. |
| 2016/0248942 A1 | 8/2016 | Horita et al. |
| 2017/0251128 A1 | 8/2017 | Horita et al. |
| 2017/0366709 A1 | 12/2017 | Horita |

FOREIGN PATENT DOCUMENTS

| | | |
|---|---|---|
| JP | 2016-048900 A | 4/2016 |
| JP | 2016-048904 A | 4/2016 |
| JP | 2016-048905 A | 4/2016 |
| JP | 2016-192742 A | 11/2016 |

OTHER PUBLICATIONS

Written Opinion dated Feb. 6, 2018 from the International Bureau in counterpart International Application No. PCT/JP2017/041098.
International Preliminary Report on Patentability dated Jun. 18, 2019 from the International Bureau in counterpart International Application No. PCT/JP2017/041098.
Notice of Reasons for Refusal dated Nov. 15, 2019 issued by the Japanese Patent Office in counterpart Application No. 2016-241123.
Partial Supplementary European Search Report dated Nov. 13, 2019 issued by the European Patent Office in counterpart application No. 17880751.7.
Rodriguez, "A Graphic Arts Perspective on RGB-to-CMYK Conversion", IEEE, Proceedings of International Conf. on Image Processing, Oct. 23, 1995, pp. 319-322.
Communication dated Feb. 18, 2020 by the European Patent Office in application No. 17880751.7.
Communication dated Apr. 2, 2020 by the Japanese Patent Office in application No. 2016-241123.

ORIGINAL DOCUMENT IMAGE DATA

TARGET PRINTED ARTICLE

CORRESPONDENCE DATA BETWEEN ORIGINAL DOCUMENT IMAGE (CM) AND CHROMATICITY VALUE (Lab)

| ID | C  | M  | Lab          |
|----|----|----|--------------|
| 1  | 20 | 90 | 50, 60, −13  |
| 2  | 24 | 66 | 60, 36, −17  |
| 3  | 35 | 35 | 71, 9, −20   |
| 4  | 47 | 23 | 72, −4, −26  |
| 5  | 10 | 15 | 89, 6, −8    |

FIG. 15

| ID | C | M | TARGET Lab | PRINTING Lab | DIFFERENCE Lab |
|---|---|---|---|---|---|
| 1 | 20 | 90 | 50, 60, −13 | 49, 61, −13 | +1, −1, 0 |
| 2 | 24 | 66 | 60, 36, −17 | 59, 40, −15 | +1, −4, −2 |
| 3 | 35 | 35 | 71, 9, −20 | 71, 12, −23 | 0, −3, +3 |
| 4 | 47 | 23 | 72, −4, −26 | 73, −7, −21 | −1, +3, −5 |
| 5 | 10 | 15 | 89, 6, −8 | 90, 6, −6 | −1, 0, −2 |

COLOR CONVERSION TABLE CREATION APPARATUS AND METHOD, COLOR CONVERSION APPARATUS, AND PROGRAM

CROSS-REFERENCE TO RELATED APPLICATIONS

The present application is a Continuation of PCT International Application No. PCT/JP2017/041098 filed on Nov. 15, 2017 claiming priority under 35 U.S.C § 119(a) to Japanese Patent Application No. 2016-241123 filed on Dec. 13, 2016. Each of the above applications is hereby expressly incorporated by reference, in their entirety, into the present application.

BACKGROUND OF THE INVENTION

1. Field of the Invention

The present invention relates to a color conversion table creation apparatus and method, a color conversion apparatus, and a program, and particularly to a color conversion technique for image data applied to color reproduction in a printing apparatus.

2. Description of the Related Art

In a printing field, a color conversion process for image data is performed by using a color conversion table such as an International Color Consortium (ICC) profile in order to perform desired color reproduction in a printing apparatus. The ICC profile is created for each printing apparatus on the basis of a colorimetric result of a color chart which is printed and output. A general color matching method using the ICC profile is performed according to the following step 1 to step 3.

[Step 1] Creation of Source Profile

Color chart image data represented by a signal value of CMYK (or RGB) is sent to a source side printing apparatus, and a color chart is output by using the source side printing apparatus. The color chart printed article which is output in the above-described way is subjected to color measurement by using a colorimeter such that a printing color of a color patch corresponding to the signal value of CMYK (or RGB) is specified, a value of CMYK (or RGB) is correlated with a value of a color in a device-independent color space, and thus a source profile is created. The source profile is an input side profile, and has the same meaning as an "input profile".

Regarding the notation of CMYK, C indicates cyan, M indicates magenta, Y indicates yellow, and K indicates black. Regarding the notation of RGB, R indicates red, G indicates green, and B indicates blue. As the device-independent color space, for example, an L*a*b* color space or an XYZ color space may be used.

[Step 2] Creation of Destination Profile

A destination side printing apparatus also outputs a color chart by using color chart image data in the same manner as described above, the color chart printed article is subjected to color measurement by using a colorimeter such that a value of CMYK (or RGB) is correlated with a value of a color in a device-independent color space, and thus a destination profile is created. The destination profile is an output side profile, and has the same meaning as an "output profile".

[Step 3] Color Conversion Process Using Profile and Execution of Image Output

Color conversion signal processing is performed on image data of a printing original document which is desired to match colors of a target printed article by using the source profile and the destination profile, and printing is performed by a destination side printing apparatus on the basis of the converted image data. In the above-described way, a color of an output image output from the source side printing apparatus can be matched with a color of the target printed article output from the destination side printing apparatus.

In contrast, JP2016-048904A discloses a system including a color conversion table creation apparatus which can create a target printed article and a profile of the target printed article, that is, a source profile on the basis of original document image data, in order to obtain a printed article matching the target printed article which is a color sample corresponding to a reproduction target. A "target profile" disclosed in JP2016-048904A corresponds to a source profile. According to the technique disclosed in JP2016-048904A, a source profile can be created by reading the target printed article with a scanner or the like without using a color chart.

In a case where a printed article of which a color matches that of the target printed article is output by using the source profile created according to the technique disclosed in JP2016-048904A, a profile of a printing apparatus which is an output device, that is, a destination profile is necessary as described above. A "printer profile" disclosed in JP2016-048904A corresponds to a destination profile.

SUMMARY OF THE INVENTION

However, in a case where a source profile which is a color sample is created by using the system disclosed in JP2016-048904A, and a destination profile is created by using a colorimeter according to the method described in the above [Step 2], this corresponds to a case where the profiles are created on the basis of values obtained by measuring colors of a source side profile and a destination side profile by using different colorimeters, and thus color matching accuracy deteriorates.

The present invention has been made in light of the circumstances, and an object thereof is to provide a color conversion table creation apparatus and method, a color conversion apparatus, and a program capable of solving the problems and further increasing color matching accuracy.

In order to achieve the object, the following invention aspects are provided.

According to a first aspect, there is provided a color conversion table creation apparatus comprising an image reading unit that reads a target printed article, and acquires read image data representing a read image of the target printed article; a first color conversion unit that converts a signal value of a first color space into a chromaticity value of a second color space by using a first color conversion table representing a correspondence relationship between the signal value of the first color space obtained from the image reading unit and the chromaticity value of the second color space which is a device-independent color space; an image correlation unit that performs a first image correlation process of performing correlation of a positional relationship between the read image data represented by a signal value of the first color space and original document image data of the target printed article; and a color conversion table creation unit that creates a second color conversion table representing a multi-dimensional correspondence relationship between a third color space of the original document image data and the second color space on the basis of a correspondence relationship between the original document image data represented by a signal value of the third color space which is a device-dependent color space, and a chromaticity value of the read image obtained through the first image correlation process in the image correlation unit and a process in the first color conversion unit, in which the image reading unit reads a first printed article which is printed by a printing apparatus on the basis of first image data represented by a signal value of the third color space, and thus acquires first printed article read image data representing a first printed article read image which is a read image of the first printed article, in which the image correlation unit performs a second image correlation process of performing correlation of a positional relationship between the first printed article read image data and the first image data, in which the first color conversion unit performs a process of converting a signal value of the first printed article read image data into a chromaticity value of the second color space, and in which the color conversion table creation unit creates an output device color conversion table representing a multi-dimensional correspondence relationship between the third color space indicating color characteristics of the printing apparatus and the second color space on the basis of a correspondence relationship between a chromaticity value of the first printed article read image and the first image data, obtained through the second image correlation process and a process on the first printed article read image data in the first color conversion unit.

The term "chromaticity value" is not limited to an XYZ color system, and indicates a value of a color represented by a color coordinate of a device-independent color space.

The second color conversion table created in the first aspect may be used as a color conversion table of a target profile. According to the first aspect, output of a printed article using the printing apparatus and reading work for a printed article thereof can be omitted, and a color conversion table (second color conversion table) of a target profile can be created.

Since the second color conversion table created in the first aspect defines a multi-dimensional correspondence relationship between a color space (third color space) of original document image data and a device-independent color space (second color space), the degree of freedom of color correction is high, and highly accurate color matching is possible, compared with a configuration of performing color correction at a one-dimensional correspondence relationship for each color component in the related art.

According to the first aspect, it is possible to create the output device color conversion table of the printing apparatus by using an identical image reading unit and a structure of creating the second color conversion table. Thus, it is possible to increase color matching accuracy.

According to a second aspect, there is provided a color conversion table creation apparatus comprising an image reading unit that reads a target printed article, and acquires read image data representing a read image of the target printed article; a first color conversion unit that converts a signal value of a first color space into a chromaticity value of a second color space by using a first color conversion table representing a correspondence relationship between the signal value of the first color space obtained from the image reading unit and the chromaticity value of the second color space which is a device-independent color space; an image correlation unit that performs a third image correlation process of performing correlation of a positional relationship between read chromaticity value image data obtained by converting a signal value of the read image data into a chromaticity value of the second color space in the first color conversion unit, and original document image data of the target printed article; and a color conversion table creation unit that creates a second color conversion table representing a multi-dimensional correspondence relationship between a third color space of the original document image data and the second color space on the basis of a correspondence relationship between the original document image data represented by a signal value of the third color space which is a device-dependent color space, and a chromaticity value of the read image obtained through a process in the first color conversion unit and the third image correlation process in the image correlation unit, in which the image reading unit reads a first printed article which is printed by a printing apparatus on the basis of first image data represented by a signal value of the third color space, and thus acquires first printed article read image data indicating a first printed article read image which is a read image of the first printed article, in which the first color conversion unit performs a process of converting a signal value of the first printed article read image data into a chromaticity value of the second color space, in which the image correlation unit performs a fourth image correlation process of performing correlation of a positional relationship between first printed article read chromaticity value image data obtained by converting a signal value of the first printed article read image data into a chromaticity value of the second color space in the first color conversion unit, and the first image data, and in which the color conversion table creation unit creates an output device color conversion table representing a multi-dimensional correspondence relationship between the third color space indicating color characteristics of the printing apparatus and the second color space on the basis of a correspondence relationship between a chromaticity value of the first printed article read image and the first image data, obtained through the fourth image correlation process.

The first aspect employs a configuration in which the image correlation unit performs an image correlation process on read image data obtained from the image reading unit, and then the first color conversion unit performs a color conversion process. The second aspect employs a configuration in which the first color conversion unit performs a color conversion process on read image data obtained from the image reading unit, and then the image correlation unit performs an image correlation process. The color conversion table creation apparatus of the second aspect can also achieve the same effect as that of the color conversion table creation apparatus of the first aspect.

As a third aspect, in the color conversion table creation apparatus of the first aspect or the second aspect, the first image data may be data of a color chart, and the first printed article may be a printed article on which the color chart is printed.

As a fourth aspect, in the color conversion table creation apparatus of the third aspect, the color chart may be a chart including a plurality of color patches of different colors, and a single partition of the color patches may have an area larger than an area of a single pixel of a reading pixel defined on the basis of a reading resolving power of the image reading unit, and have an area smaller than an area of a square shape of which one side has 6 millimeters.

As a fifth aspect, in the color conversion table creation apparatus of the third aspect, the color chart may be a gradation chart in which a grayscale is consecutively changed.

As a sixth aspect, in the color conversion table creation apparatus of the first aspect or the second aspect, the first image data may be image data representing a picture other than a color chart, and may be image data of an image which is a picture to be printed and is designated in a printing job.

As a seventh aspect, in the color conversion table creation apparatus of any one of the first aspect to the sixth aspect, the output device color conversion table may be created by using a plurality of types of the first image data and a plurality of types of the first printed articles which are printed on the basis of the respective types of the first image data.

The plurality of types of first image data may be data of a plurality of types of color charts, and may be a plurality of types of image data representing pictures other than a color chart. There may be a case where the plurality of types of first image data are "a plurality of types of image data" obtained by combining data of one or more types of color charts with one or more types of image data representing pictures other than a color chart. For example, there may be an aspect in which, first, an output device color conversion table is created by using color chart data and a color chart printed article thereof, and then the output device color conversion table is corrected or an output device color conversion table is recreated by using image data representing a picture other than a color chart and a printed article of the picture. Correction of an output device color conversion table includes not only an aspect of rewriting part of original data but also an aspect of adding new data.

As an eighth aspect, the color conversion table creation apparatus of the seventh aspect may further comprise a display unit that provides visualization information to a user in creating the output device color conversion table by using the plurality of types of first printed articles.

As a ninth aspect, in the color conversion table creation apparatus of the eighth aspect, information indicating a range in which data of a color gamut is covered in the entire color gamut required for the output device color conversion table may be displayed on the display unit.

As a tenth aspect, the color conversion table creation apparatus of the ninth aspect may further comprise a deficient region designation operation unit that receives an operation of a user designating a deficient region which is a color gamut in which data is deficient in the entire color gamut required for the output device color conversion table; and a digital data creation unit that creates digital data as the first image data including color information of the deficient region according to designation from the deficient region designation operation unit.

As an eleventh aspect, the color conversion table creation apparatus of the ninth aspect may further include a deficient region automatic determination unit that automatically determines a deficient region which is a color gamut in which data is deficient in the entire color gamut required for the output device color conversion table; and a digital data creation unit that creates digital data as the first image data including color information of the deficient region according to a determination result in the deficient region automatic determination unit.

As a twelfth aspect, in the color conversion table creation apparatus of any one of the eighth aspect to the eleventh aspect, the first printed article read image may be displayed on the display unit.

As a thirteenth aspect, the color conversion table creation apparatus of any one of the eighth aspect to the twelfth aspect may further comprise a designation operation unit that receives at least one of a first designation operation of a user designating data which is to be used to create the output device color conversion table or a second designation operation of the user designating non-use data which is not to be used to create the output device color conversion table, and the color conversion table creation unit may create the output device color conversion table according to designation from the designation operation unit.

As a fourteenth aspect, in the color conversion table creation apparatus of any one of the first aspect to the thirteenth aspect, the output device color conversion table may be created by the color conversion table creation unit, and then the output device color conversion table is further updated by using, as the first printed article, a printed article which is printed by the printing apparatus according to a printing job.

As a fifteenth aspect, the color conversion table creation apparatus of any one of the first aspect to the fourteenth aspect may further comprise an information acquisition unit that acquires information for specifying a combination of a color material type and a base material type used to create a printed article in the printing apparatus; a first color conversion table database that stores a plurality of color conversion tables applicable as the first color conversion table; and a first color conversion table selection unit that selects a single color conversion table from among the plurality of color conversion tables stored in the first color conversion table from among the plurality of color conversion tables stored in the first color conversion table database, the plurality of color conversion tables may include a color conversion table representing a correspondence relationship between a reading signal in the image reading unit and a chromaticity value for each combination of a color material type and a base material type used to create a printed article in the printing apparatus, and the first color conversion table selection unit may perform a process of selecting a single color conversion table from among the plurality of color conversion tables on the basis of the information acquired via the information acquisition unit.

According to the fifteenth aspect, switching to the appropriate first color conversion table can be performed in accordance with a printing condition, and thus color matching accuracy is further improved.

As a sixteenth aspect, in the color conversion table creation apparatus of the fifteenth aspect, the information acquired by the information acquisition unit may include color material information for specifying a color material type and base material type information for specifying a base material type.

As a seventeenth aspect, in the color conversion table creation apparatus of the fifteenth aspect or the sixteenth aspect, the information acquisition unit may be configured to include a user interface that receives an input operation for information for specifying a combination of a color material type and a base material type used to create a printed article in the printing apparatus.

According to the seventeenth aspect, a user inputs information for specifying a combination of a color material type and a base material type used for printing via the user interface, and can perform switching to the first color conversion table appropriate for a printing condition.

As an eighteenth aspect, in the color conversion table creation apparatus of the fifteenth aspect or the sixteenth aspect, the information acquisition unit may be configured to include a communication unit that transmits and receives data to and from the printing apparatus, and incorporates the information from the printing apparatus via the communication unit.

According to the eighteenth aspect, it is possible to acquire necessary information from the printing apparatus, and to automatically select the appropriate first color conversion table on the basis of the acquired information.

The second color conversion table and the output device color conversion table created by the color conversion table creation apparatus of any one of the first aspect to the eighteenth aspect can be respectively used as an input profile and an output profile of a color management system.

As a nineteenth aspect, the color conversion table creation apparatus of any one of the first aspect to the eighteenth aspect may comprise the image correlation unit and the color conversion table creation unit corresponding to a u-color base in a case where p is an integer of 3 or greater, and u is an integer greater than p, in which the third color space is a u-color-based color space; and a p-color-to-u-color conversion processing unit that converts p-color-based image data into u-color-based image data, and the p-color-to-u-color conversion processing unit may convert the p-color-based image data into the u-color-based image data by using a correspondence relationship that p colors of u colors have one-to-one correspondence, and respective signal components of the rest (u-p) colors of the u colors are 0.

According to the nineteenth aspect, a u-color-based system can be applied to a p-color base, and interpolation accuracy can be increased.

In a case of using a u-color-based color management system which converts u-color-based image data into u-color-based image data by using an input profile and an output profile, the color conversion table creation apparatus creating the second color conversion table used as an input profile and the output device color conversion table used as an output profile may be configured as a u-color-based color conversion table creation apparatus including a u-color-based image correlation unit and a color conversion table creation unit which handle u-color-based image data.

A "p-color-to-u-color" conversion process is added to the previous stage of a process in a u-color-based color conversion system configured with a combination of the u-color-based color conversion table creation apparatus and the u-color-based color management system, a "u-color-to-p-color" conversion process is added to the subsequent stage of the process in the u-color-based color conversion system, and thus a p-color-based color conversion system which performs a p-color-to-p-color conversion as a whole may be provided.

As a twentieth aspect, in the color conversion table creation apparatus of the nineteenth aspect, the u-color base may be a four-color base of CMYK using four colors including cyan, magenta, yellow, and black, and the p-color base may be a three-color base of RGB using three colors including red, green, and blue, and, in a case where a signal of each color of CMYK and a signal of each color of RGB are signals normalized to a value in a range from 0 to 1, the p-color-to-u-color conversion processing unit may convert four-color-based image data into three-color-based image data by using a correspondence relationship of $C=(1-R)$, $M=(1-G)$, $Y=(1-B)$, and $K=0$.

According to a twenty-first aspect, there is provided a color conversion apparatus comprising the color conversion table creation apparatus of the nineteenth aspect or the twentieth aspect; a second color conversion unit that performs color conversion on image data by using an input profile and an output profile, the second color conversion table created by the color conversion table creation apparatus being used as the input profile, and the output device color conversion table created by the color conversion table creation apparatus being used as the output profile; and a u-color-to-p-color conversion processing unit that converts u-color-based image data obtained through the color conversion in the second color conversion unit into p-color-based image data, in which each of the original document image data and the first image data is converted into u-color-based image data by the p-color-to-u-color conversion processing unit, in which u-color-based original document image data which is u-color-based image data obtained by converting the original document image data in the p-color-to-u-color conversion processing unit is subjected to color conversion in the second color conversion unit, and in which the u-color-to-p-color conversion processing unit performs inverse conversion to the conversion in the p-color-to-u-color conversion processing unit on the basis of the one-to-one correspondence relationship in the p-color-to-u-color conversion processing unit, and converts p-color-based image data into u-color-based image data by not using signals of the rest (u-p) colors to which a correspondence relationship of signal components being 0 is applied in the p-color-to-u-color conversion processing unit.

According to a twenty-second aspect, there is provided a color conversion table creation method comprising an image reading step of causing an image reading unit to read a target printed article, and to acquire read image data representing a read image of the target printed article; a first color conversion step of converting a signal value of a first color space into a chromaticity value of a second color space by using a first color conversion table representing a correspondence relationship between the signal value of the first color space obtained from the image reading unit and the chromaticity value of the second color space which is a device-independent color space; an image correlation step of performing a first image correlation process of performing correlation of a positional relationship between the read image data represented by a signal value of the first color space and original document image data of the target printed article; a color conversion table creation step of creating a second color conversion table representing a multi-dimensional correspondence relationship between a third color space of the original document image data and the second color space on the basis of a correspondence relationship between the original document image data represented by a signal value of the third color space which is a device-dependent color space, and a chromaticity value of the read image obtained through the first image correlation process in the image correlation step and a process in the first color conversion step; a step of causing the image reading unit to read a first printed article which is printed by a printing apparatus on the basis of first image data represented by a signal value of the third color space, and thus to acquire first printed article read image data representing a first printed article read image which is a read image of the first printed article; a step of performing a second image correlation process of performing correlation of a positional relationship between the first printed article read image data and the first image data; a step of performing a process of converting a signal value of the first printed article read image data into a chromaticity value of the second color space by using the first color conversion table; and a step of creating an output device color conversion table representing a multi-dimensional correspondence relationship between the third color space indicating color characteristics of the printing apparatus and the second color space on the basis of a correspondence relationship between a chromaticity value of the first printed article read image and the first image data, obtained through the second image correlation process and the process of converting a signal value of the first printed article read image data into a chromaticity value of the second color space.

The same contents as the specified contents of the color conversion table creation apparatus or the color conversion apparatus specified in the second aspect to the twenty-first aspect may be combined with the color conversion table creation method of the twenty-second aspect as appropriate. In this case, a processing unit or a functional unit as means for realizing a process or a function specified in the color conversion table creation apparatus or the color conversion apparatus may be understood as an element of a "step" of a process or an operation corresponding thereto.

According to a twenty-third aspect, there is provided a color conversion table creation method comprising an image reading step of causing an image reading unit to read a target printed article, and to acquire read image data representing a read image of the target printed article; a first color conversion step of converting a signal value of a first color space into a chromaticity value of a second color space by using a first color conversion table representing a correspondence relationship between the signal value of the first color space obtained from the image reading unit and the chromaticity value of the second color space which is a device-independent color space; an image correlation step of performing a third image correlation process of performing correlation of a positional relationship between read chromaticity value image data obtained by converting a signal value of the read image data into a chromaticity value of the second color space in the first color conversion step, and original document image data of the target printed article; a color conversion table creation step of creating a second color conversion table representing a multi-dimensional correspondence relationship between a third color space of the original document image data and the second color space on the basis of a correspondence relationship between the original document image data represented by a signal value of the third color space which is a device-dependent color space, and a chromaticity value of the read image obtained through a process in the first color conversion step and the third image correlation process in the image correlation step; a step of causing the image reading unit to read a first printed article which is printed by a printing apparatus on the basis of first image data represented by a signal value of the third color space, and thus to acquire first printed article read image data indicating a first printed article read image which is a read image of the first printed article; a step of performing a process of converting a signal value of the first printed article read image data into a chromaticity value of the second color space by using the first color conversion table; a step of performing a fourth image correlation process of performing correlation of a positional relationship between first printed article read chromaticity value image data obtained by converting a signal value of the first printed article read image data into a chromaticity value of the second color space by using the first color conversion table, and the first image data; and a step of creating an output device color conversion table representing a multi-dimensional correspondence relationship between the third color space indicating color characteristics of the printing apparatus and the second color space on the basis of a correspondence relationship between a chromaticity value of the first printed article read image and the first image data, obtained through the fourth image correlation process.

The same contents as the specified contents of the color conversion table creation apparatus or the color conversion apparatus specified in the second aspect to the twenty-first aspect may be combined with the color conversion table creation method of the twenty-third aspect as appropriate. In this case, a processing unit or a functional unit as means for realizing a process or a function specified in the color conversion table creation apparatus or the color conversion apparatus may be understood as an element of a "step" of a process or an operation corresponding thereto.

According to a twenty-fourth aspect, there is provided a program causing a computer to realize a function of acquiring read image data representing a read image of a target printed article from an image reading unit reading the target printed article; a first color conversion function of converting a signal value of a first color space into a chromaticity value of a second color space by using a first color conversion table representing a correspondence relationship between the signal value of the first color space obtained from the image reading unit and the chromaticity value of the second color space which is a device-independent color space; an image correlation function of performing a first image correlation process of performing correlation of a positional relationship between the read image data represented by a signal value of the first color space and original document image data of the target printed article; a color conversion table creation function of creating a second color conversion table representing a multi-dimensional correspondence relationship between a third color space of the original document image data and the second color space on the basis of a correspondence relationship between the original document image data represented by a signal value of the third color space which is a device-dependent color space, and a chromaticity value of the read image obtained through the first image correlation process using the image correlation function and a process using the first color conversion function; a function of causing the image reading unit to read a first printed article which is printed by a printing apparatus on the basis of first image data represented by a signal value of the third color space, and thus to acquire first printed article read image data representing a first printed article read image which is a read image of the first printed article; a function of performing a second image correlation process of performing correlation of a positional relationship between the first printed article read image data and the first image data; a function of performing a process of converting a signal value of the first printed article read image data into a chromaticity value of the second color space by using the first color conversion table; and a function of creating an output device color conversion table representing a multi-dimensional correspondence relationship between the third color space indicating color characteristics of the printing apparatus and the second color space on the basis of a correspondence relationship between a chromaticity value of the first printed article read image and the first image data, obtained through the second image correlation process and the process of converting a signal value of the first printed article read image data into a chromaticity value of the second color space.

The same contents as the specified contents of the color conversion table creation apparatus or the color conversion apparatus specified in the second aspect to the twenty-first aspect may be combined with the program of the twenty-fourth aspect as appropriate. In this case, a processing unit or a functional unit as means for realizing a process or a function specified in the color conversion table creation apparatus or the color conversion apparatus may be understood as an element of a "function" of the program performing a process or an operation corresponding thereto.

According to a twenty-fifth aspect, there is provided a program causing a computer to realize a function of acquiring read image data representing a read image of a target printed article from an image reading unit reading the target printed article; a first color conversion function of converting a signal value of a first color space into a chromaticity value of a second color space by using a first color conversion table representing a correspondence relationship between the signal value of the first color space obtained from the image reading unit and the chromaticity value of the second color space which is a device-independent color space; an image correlation function of performing a third image correlation process of performing correlation of a positional relationship between read chromaticity value image data obtained by converting a signal value of the read image data into a chromaticity value of the second color space by using the first color conversion function, and original document image data of the target printed article; a color conversion table creation function of creating a second color conversion table representing a multi-dimensional correspondence relationship between a third color space of the original document image data and the second color space on the basis of a correspondence relationship between the original document image data represented by a signal value of the third color space which is a device-dependent color space, and a chromaticity value of the read image obtained through a process using the first color conversion function and the third image correlation process using the image correlation function; a function of causing the image reading unit to read a first printed article which is printed by a printing apparatus on the basis of first image data represented by a signal value of the third color space, and thus to acquire first printed article read image data indicating a first printed article read image which is a read image of the first printed article; a function of performing a process of converting a signal value of the first printed article read image data into a chromaticity value of the second color space by using the first color conversion table; a function of performing a fourth image correlation process of performing correlation of a positional relationship between first printed article read chromaticity value image data obtained by converting a signal value of the first printed article read image data into a chromaticity value of the second color space by using the first color conversion table, and the first image data; and a function of creating an output device color conversion table representing a multi-dimensional correspondence relationship between the third color space indicating color characteristics of the printing apparatus and the second color space on the basis of a correspondence relationship a chromaticity value of the first printed article read image and the first image data, obtained through the fourth image correlation process.

The same contents as the specified contents of the color conversion table creation apparatus or the color conversion apparatus specified in the second aspect to the twenty-first aspect may be combined with the program of the twenty-fifth aspect as appropriate. In this case, a processing unit or a functional unit as means for realizing a process or a function specified in the color conversion table creation apparatus or the color conversion apparatus may be understood as an element of a "function" of the program performing a process or an operation corresponding thereto.

According to the present invention, it is possible to create an output device color conversion table of a printing apparatus by using a structure of creating a color conversion table (second color conversion table) as a target profile on the basis of original document image data and a target printed article. According to the present invention, each of the second color conversion table as a target profile and the output device color conversion table can be created by using an identical image reading unit, and thus it is possible to increase color matching accuracy.

BRIEF DESCRIPTION OF THE DRAWINGS

FIG. 15 is a table illustrating an example of correspondence data among original document image signal, a target chromaticity value, a printing chromaticity value, and a difference chromaticity value.

DESCRIPTION OF THE PREFERRED EMBODIMENTS

Hereinafter, embodiments of the present invention will be described in detail with reference to the accompanying drawings.

<<Outline of Configuration Example of Printing System>>

Figure 1:
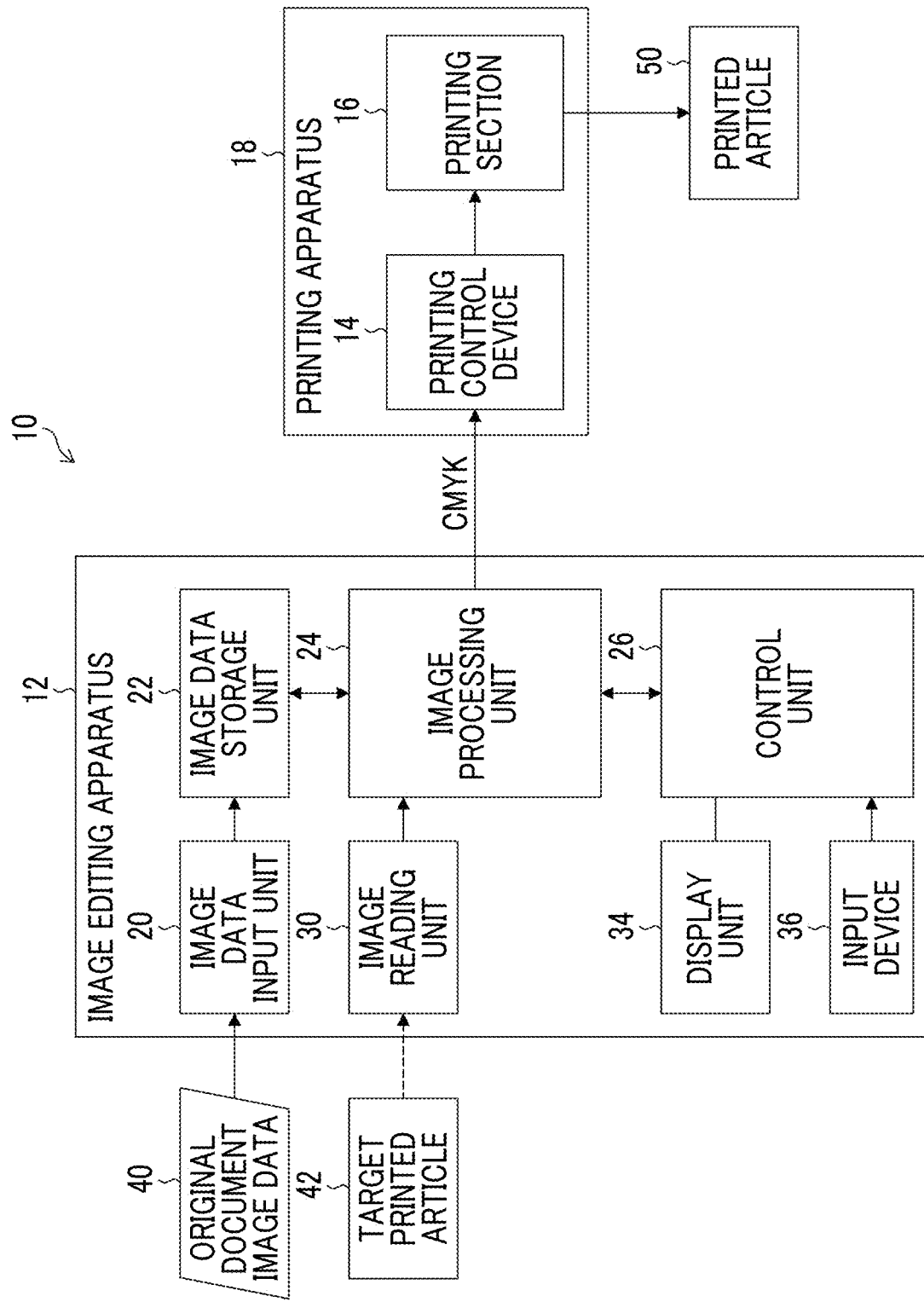
FIG. 1 is a block diagram illustrating a system configuration of a printing system including a color conversion table creation apparatus according to an embodiment of the present invention.

FIG. 1 is a block diagram illustrating a system configuration example of a printing system including a color conversion table creation apparatus according to an embodiment of the present invention. A printing system 10 includes an image editing apparatus 12, a printing control device 14, and a printing section 16. The image editing apparatus 12 functions as a color conversion table creation apparatus according to the embodiment, and performs a process of creating a color conversion table required for color reproduction in the printing section 16. The image editing apparatus 12 is a device which performs image processing such as processing of image data in addition to a color conversion process using a color conversion table. The processing of image data is included in the concept of image editing. Printing image data generated by the image editing apparatus 12 is sent to the printing control device 14.

The printing control device 14 controls a printing operation of the printing section 16 on the basis of the printing image data generated by the image editing apparatus 12. The printing control device 14 may include a halftone processing unit which converts continuous tone image data into binary or multi-value halftone image data. In the present embodiment, the image editing apparatus 12 and the printing control device 14 are illustrated as separate constituent elements, but the function of the printing control device 14 may be installed in the image editing apparatus 12. For example, a single computer may function as the image editing apparatus 12 and the printing control device 14.

The printing section 16 is image formation means for performing printing under the control of the printing control device 14. A printing method or the type of color material to be used in the printing section 16 is not particularly limited. As the printing section 16, various printers such as an ink jet printer, an electrophotographic printer, a laser printer, an offset printing machine, and a flexographic printing machine may be used. The term "printer" is understood to have the same meaning as terms such as a printing machine, a printing apparatus, an image recording apparatus, an image forming apparatus, and an image output apparatus. As the color material, ink or toner may be used according to the type of printing section 16.

Herein, for simplification of description, a plateless digital printer is supposed, and a configuration in which the printing control device 14 is combined with the printing section 16 will be referred to as a printing apparatus 18. There may be an aspect in which the printing apparatus 18 is configured by integrally combining the printing control device 14 with the printing section 16, and there may be an aspect in which the printing control device 14 and the printing section 16 are configured as separate devices, and transmit and receive signals through wired or wireless communication connection.

In a case where a plate printer using a printing plate is employed as the printing section 16, a system configuration including a plate making device (not illustrated) such as a plate recorder making a printing plate on the basis of image data in addition to the printing control device 14 is provided. In this case, a configuration in which the plate making device (not illustrated), the printing control device 14, and the printing section 16 are combined with each other corresponds to the printing apparatus 18.

The printing system 10 of the present embodiment uses an ink jet printer which can form a color image by using ink of four colors such as cyan (C), magenta (M), yellow (Y), and black (K) as an example of the printing apparatus 18. However, the number of colors of ink or a combination thereof is not limited to this example. For example, there may an aspect in which ink of a light color such as light cyan (LC) or light magenta (LM) is added to four colors such as CMYK, or an aspect in which ink of a special color such as red or green is used.

The image editing apparatus 12 includes an image data input unit 20, an image data storage unit 22, an image processing unit 24, and a control unit 26. The image editing apparatus 12 includes an image reading unit 30, a display unit 34, and an input device 36. The image editing apparatus 12 may be realized by a combination of hardware and software of a computer. The software has the same meaning as a "program". The image editing apparatus 12 may be realized as one function of a raster image processor (RIP) apparatus.

The image data input unit 20 is a data acquisition unit incorporating original document image data 40. The image data input unit 20 may include data input terminals incorporating the original document image data 40 from the outside or other signal processing units in the apparatus. As the image data input unit 20, a wired or wireless communication interface unit may be employed, a medium interface unit which performs reading and writing on a portable external storage medium such as a memory card may be employed, or an appropriate combination of these aspects may be employed.

A target printed article 42 is a color sample printed article of a target color to be reproduced, and is given as an actual color sample. The original document image data 40 is digital image data indicating image contents to be printed. In the present example, the original document image data 40 is image data indicating a picture of an original document image of the target printed article 42. The original document image data 40 and the target printed article 42 are provided from a printing requester (client). The original document image data 40 may be data of the entire image indicating the whole image contents on a printing surface of the target printed article 42, and may be data of an image component (original document component) as a part of an image recorded on the printing surface.

A data format of the original document image data 40 is not particularly limited. In the present example, image data of 8 bits (256 grayscales) is used for each of CMYK as the original document image data 40, but a data format of the original document image data 40 may be a format of an RGB signal without limitation to a CMYK signal, and may be a format of a combination of a CMYK signal and a special color signal. The number of grayscales of a signal (number of bits) is not limited to this example.

The image data storage unit 22 is means for storing the original document image data 40 acquired via the image data input unit 20. The original document image data 40 incorporated from the image data input unit 20 is stored in the image data storage unit 22. The image data storage unit 22 may be, for example, a main memory which is a memory built into a computer functioning as the image editing apparatus 12, a hard disk drive or a solid-state drive which is an auxiliary storage device, an external storage device connected to the computer, or a combination thereof.

The image reading unit 30 reads a printed article such as the target printed article 42 or a printed article 50 printed by the printing apparatus 18, converts an optical image into electronic image data, and generates read image data as a color image representing a read image.

The image reading unit 30 includes an imaging device which images a reading object such as the target printed article 42 or the printed article 50, and performs conversion into an electric signal indicating image information. A color CCD linear image sensor may be used as the imaging device. The CCD stands for a charge-coupled device. The color CCD linear image sensor is an image sensor in which light receiving elements each having respective color filters of red (R), green (G), and blue (B) are arranged linearly. A color CMOS linear image sensor may be used instead of the color CCD linear image sensor. The CMOS stands for complementary metal oxide semiconductor. The image reading unit 30 may include an illumination optical system which illuminates a reading object, and a signal processing circuit which processes a signal obtained from the imaging device so as to generate digital image data, in addition to the imaging device.

For example, a color image scanner which can output a read image as RGB image data may be used in the image reading unit 30. A scanner which can acquire read image data represented by an image signal having color components of R/G/B is used in the image reading unit 30 of the present example. A read image acquired from the image reading unit 30 will be referred to as a "scan image" in some cases. A camera may be used instead of the scanner.

The image reading unit 30 functions as means for acquiring read image data of the target printed article 42. The image reading unit 30 functions as means for reading the printed article 50 printed by the printing apparatus 18, and acquiring read image data of the printed article 50. The read image data acquired via the image reading unit 30 is sent to the image processing unit 24.

A function in which read image data obtained by the image reading unit 30 is incorporated into the image processing unit 24 corresponds to a "function of acquiring read image data".

The image processing unit 24 performs a process of creating a color conversion table on the basis of the read image data acquired from the image reading unit 30 and the original document image data 40. The image processing unit 24 has a function of performing a color conversion process using the color conversion table on the original document image data 40, so as to generate image data to be delivered to the printing apparatus 18. The image processing unit 24 has a function, as necessary, of performing a process such as resolution conversion or grayscale conversion on the original document image data 40 or read image data. Details of process contents in the image processing unit 24 will be described later.

In the present embodiment, a description will be made of an example of using an L*a*b* color system as a color system (color coordinate system) of a device-independent color space representing a target value of a color, but a color system is not limited thereto. For example, not only an XYZ color system (a stimulus value Y including luminance (brightness), and stimulus values X and Z of colors), a Yxy color system (luminance Y, and chromaticity coordinates x and y), and an L*u*v* color system defined by the International Commission on Illumination, but also an HSV color system (hue (H), saturation (S), and value (V) or brightness (B)), an HLS color system (hue (H), saturation (S), and luminance (L)), and a YCbCr color system (luminance Y, and color differences Cb and Cr) may be used.

In the present specification, for simplification of notation, a color space of the L*a*b* color system will be referred to as an "Lab color space", and a chromaticity value represented by a coordinate value of the Lab color space will be referred to as an "Lab value". Image data in which an image signal value of each pixel is described by an Lab value will be referred to as an "Lab image" in some cases.

The control unit 26 controls an operation of each unit of the image editing apparatus 12. The display unit 34 and the input device 36 function as a user interface. For example, displays based on various display methods such as a liquid crystal display and an organic electro-luminescence (EL) display may be used in the display unit 34. The display has the same meaning as a display device.

The input device 36 may employ various means such as a keyboard, a mouse, a touch panel, and a track ball, and may be an appropriate combination thereof. There may be an aspect in which the display unit 34 and the input device 36 are integrally formed as in a configuration in which a touch panel is disposed on a screen of the display unit 34.

An operator may perform input of various pieces of information, such as input of printing conditions, selection of an image quality mode, designation of a color measurement position, input and editing of address information, and retrieval of information by using the input device 36 while viewing contents displayed on the screen of the display unit 34. Input contents and other various pieces of information may be recognized through display thereof on the display unit 34.

Figure 2:
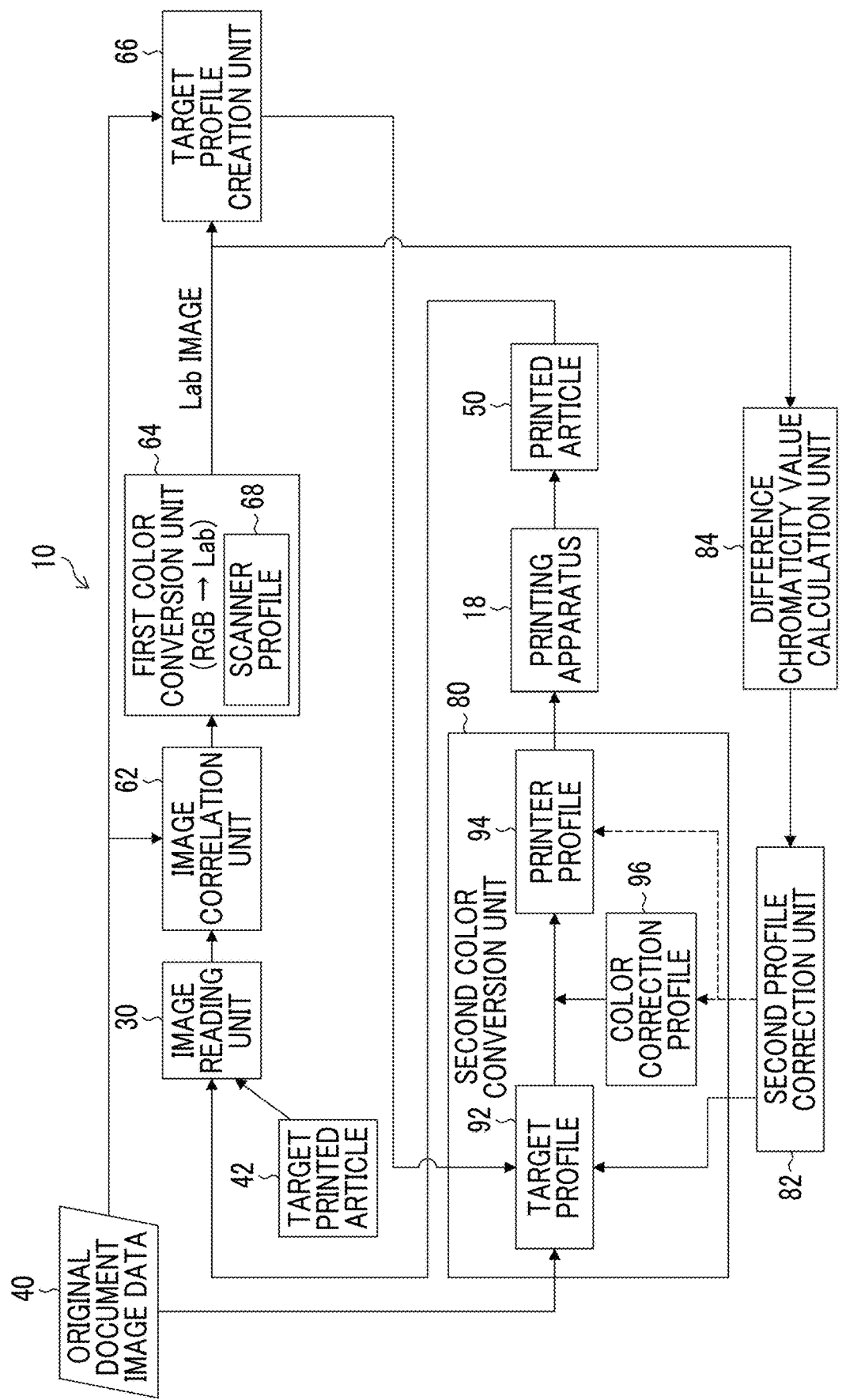
FIG. 2 is a block diagram illustrating the overall outline of the printing system.

FIG. 2 is a block diagram illustrating the overall outline of the printing system 10. In FIG. 2, the same element as the element described in FIG. 1 is given the same reference numeral. The printing system 10 of the present example has a function of performing color matching such that the printed article 50 of which a color equivalent to that of the target printed article 42 is reproduced by the printing apparatus 18 is obtained on the basis of the given target printed article 42 and original document image data 40). The "equivalent color" includes a satisfactory allowable range which is regarded to be substantially equivalent within a color difference range allowable by a requester.

In order to realize such color matching, the printing system 10 includes the image reading unit 30, and further includes, as illustrated in FIG. 2, an image correlation unit 62 which performs a process of performing registration of read image data obtained from the image reading unit 30 with the original document image data 40, a first color conversion unit 64 which performs a color conversion process on the read image data, and a target profile creation unit 66 which creates a color conversion table of a target profile on the basis of a correspondence relationship between the color-converted read image data having undergone the color conversion process in the first color conversion unit 64 and the original document image data 40.

The first color conversion unit 64 performs a process of converting read image data represented by a signal value (RGB in the present example) of a color components of a device-dependent color space into color-converted read image data represented by a signal value (Lab in the present example) of a color component of a device-independent color space.

The first color conversion unit 64 performs a color conversion process (RGB→Lab conversion) of converting an RGB value into an Lab value by using a color conversion table (corresponding to a "first color conversion table") of a scanner profile 68. The scanner profile 68 includes a color conversion table ("first color conversion table") representing a correspondence relationship between an RGB value which is a read image signal value of a device-dependent color space obtained from the image reading unit 30 and a device-independent Lab value. Herein, an Lab color space is used as a device-independent color space, but other device-independent color spaces may be used. A color space of read image signals (RGB) obtained from the image reading unit 30 corresponds to a "first color space", and a device-independent color space exemplified as an Lab color space corresponds to a "second color space". The color conversion function of the first color conversion unit 64 corresponds to a "first color conversion function".

Each of the image correlation unit 62, the first color conversion unit 64, and the target profile creation unit 66 is included in the image processing unit 24 of the image editing apparatus 12 described in FIG. 1.

The image processing unit 24 includes, as illustrated in FIG. 2, a second color conversion unit 80 performing color conversion of the original document image data 40, a second profile correction unit 82, and a difference chromaticity value calculation unit 84.

The second color conversion unit 80 performs a conversion process of the original document image data 40 by using a target profile 92 and a printer profile 94 conforming to a format of an ICC profile, and generates an image signal with a data format suitable for the printing apparatus 18. Herein, a description will be made of an example of generating an output device signal based on a format of a CMYK signal as an image signal with a data format suitable for the printing apparatus 18.

The target profile 92 is also referred to as an input profile. A color conversion table (referred to as an "input color conversion table") of the target profile 92 is a color conversion table describing therein a CMYK→Lab conversion relationship in which a target color of a CMYK signal of the original document image data 40 is defined in a device-independent color space (here, an Lab space). A color space (here, a CMYK color space) of the original document image data 40 corresponds to a "third color space".

The printer profile 94 is also referred to as an output profile. A color conversion table (referred to as an "output color conversion table") of the printer profile 94 is a color conversion table defining a correspondence relationship between a CMYK signal which is output to the printing apparatus 18 and an Lab value of an output color from the printing apparatus 18. The output color conversion table is a table describing therein a conversion relationship (Lab→CMYK) into an output CMYK value corresponding to an Lab value to be reproduced.

The difference chromaticity value calculation unit 84 is a calculation unit which computes a difference chromaticity value (Lab difference) indicating a difference between a target chromaticity value (an Lab value of the target printed article 42) generated through color conversion from read image data of the target printed article 42 in the first color conversion unit 64 and a printing chromaticity value (an Lab value of the printed article 50) generated on the basis of read image data of the printed article 50.

Difference information calculated by the difference chromaticity value calculation unit 84 is provided to the second profile correction unit 82. The second profile correction unit 82 performs a process of correcting the target profile 92 on the basis of the difference information. The second profile correction unit 82 is not limited to a configuration of correcting the target profile 92, and may employ a configuration of correcting the printer profile 94. Alternatively, the second profile correction unit 82 may have a configuration of creating a color correction profile 96 on the basis of the difference information, combining the target profile 92, the color correction profile 96, and the printer profile 94 with each other, and correcting a color conversion table of the second color conversion unit 80.

An operation of performing color matching between the target printed article 42 and the printed article 50 by using the image reading unit 30 of the printing system 10 of the present embodiment may be largely classified into the following two stages.

In a first stage, the target printed article 42 is read by the image reading unit 30 such that a target profile is estimated, that is, the target profile is created.

In a second stage, each of the target printed article 42 and the printed article 50 printed by the printing apparatus 18 is read by the image reading unit 30, and color matching accuracy is improved by correcting a profile applied to the second color conversion unit 80 on the basis of reading results.

The printing system 10 of the present embodiment may create the printer profile 94 by using a structure of creating the target profile 92 on the basis of the target printed article 42 and the original document image data 40.

A configuration corresponding to the first step will be referred to as a "first principal configuration", a configuration corresponding to the second step will be referred to as a "second principal configuration", and, hereinafter, each of the first principal configuration and the second principal configuration will be described in detail.

<First Principal Configuration>

Figure 3:
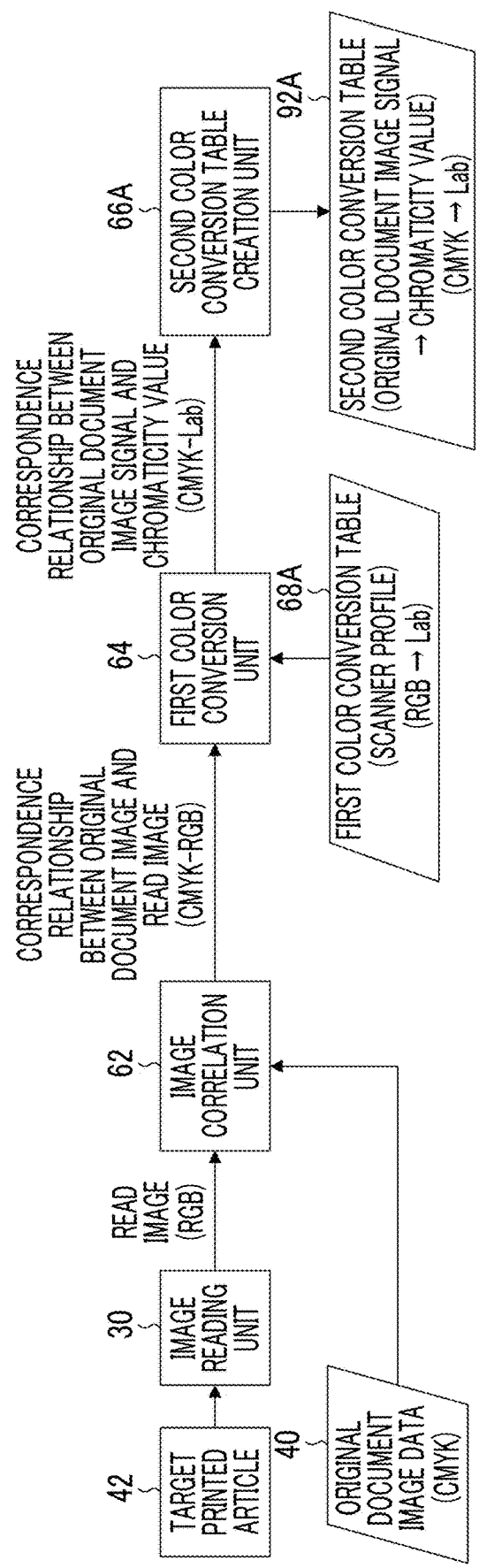
FIG. 3 is a block diagram illustrating a first principal configuration of the printing system.

FIG. 3 is a block diagram illustrating a flow of a process in the first principal configuration. In FIG. 3, the original document image data 40 is described as CMYK, read image data is described as RGB, and a chromaticity value is described as Lab, but color spaces to be applied in implementation of the present invention are not limited to these examples. The original document image data 40 may be RGB image data, may be CMY image data, and may be image data in which a CMYK signal is combined with a special color signal.

A chromaticity value represented by a device-independent color space may be a value of an XYZ color system, an Luv color system, and other color systems. Arbitrariness of a color space is the same for the following description.

As illustrated in FIG. 3, a process of creating a target profile in the first principal configuration is performed according to the following procedures.

[Procedure 1] The target printed article 42 is read by the image reading unit 30 (an example of an image reading step for a target printed article), and read image data is acquired (an example of a read image data acquisition step for a target printed article). In the present example, an RGB image is assumed to be obtained as the read image data. The acquired read image data is sent to the image correlation unit 62.

[Procedure 2] The image correlation unit 62 performs a process of performing correlation of a positional relationship between the read image data and the original document image data 40 (image correlation step). The process in the procedure 2 corresponds to an example of a "first image correlation process". A step of incorporating the original document image data 40 (an example of an original document image data acquisition step) may be performed before or after the read image data acquisition step for a target printed article.

In the image correlation unit 62, a correspondence relationship between pixel positions of the original document image and the read image is specified, and data (an example of "correspondence relationship data of an original document image and a read image") indicating a correspondence relationship between a signal value (in the present example, a CMYK value) of the original document image data and a signal value (in the present example, an RGB value) of the read image data is obtained.

[Procedure 3] The first color conversion unit 64 performs a process of converting the RGB value of the read image data into an Lab value by using a first color conversion table 68A (an example of a "first color conversion step"). The first color conversion table 68A is a color conversion table of the scanner profile 68 described in FIG. 2, and defines a correspondence relationship between a signal value of read image data and a chromaticity value (in the present example, an Lab value). In other words, the first color conversion table 68A is a table defining an RGB→Lab conversion relationship for converting an input RGB signal into an output Lab value. The RGB value of the read image data is converted into the chromaticity value of the device-independent color space by the first color conversion unit 64.

[Procedure 4] Data (an example of "correspondence relationship data between an original document image signal and a chromaticity value") indicating a correspondence relationship between an original document image signal (CMYK value) and a chromaticity value (Lab value) is obtained through the procedure 2 and the procedure 3. A second color conversion table creation unit 66A creates a second color conversion table 92A on the basis of the "correspondence relationship data between an original document image signal and a chromaticity value" (an example of a "second color conversion table creation step").

The second color conversion table creation unit 66A corresponds to the target profile creation unit 66 described in FIG. 2. The second color conversion table 92A created by the second color conversion table creation unit 66A corresponds to a "color conversion table creation unit". The second color conversion table creation unit 66A (refer to FIG. 3) is a table defining a CMYK→Lab conversion relationship for converting a CMYK signal of original document image data into a chromaticity value (Lab value). The second color conversion table 92A corresponds to a target profile representing a target color, and may be used as a color conversion table of the target profile 92 applied to the second color conversion unit 80 described in FIG. 2.

Modification Example

Figure 4:
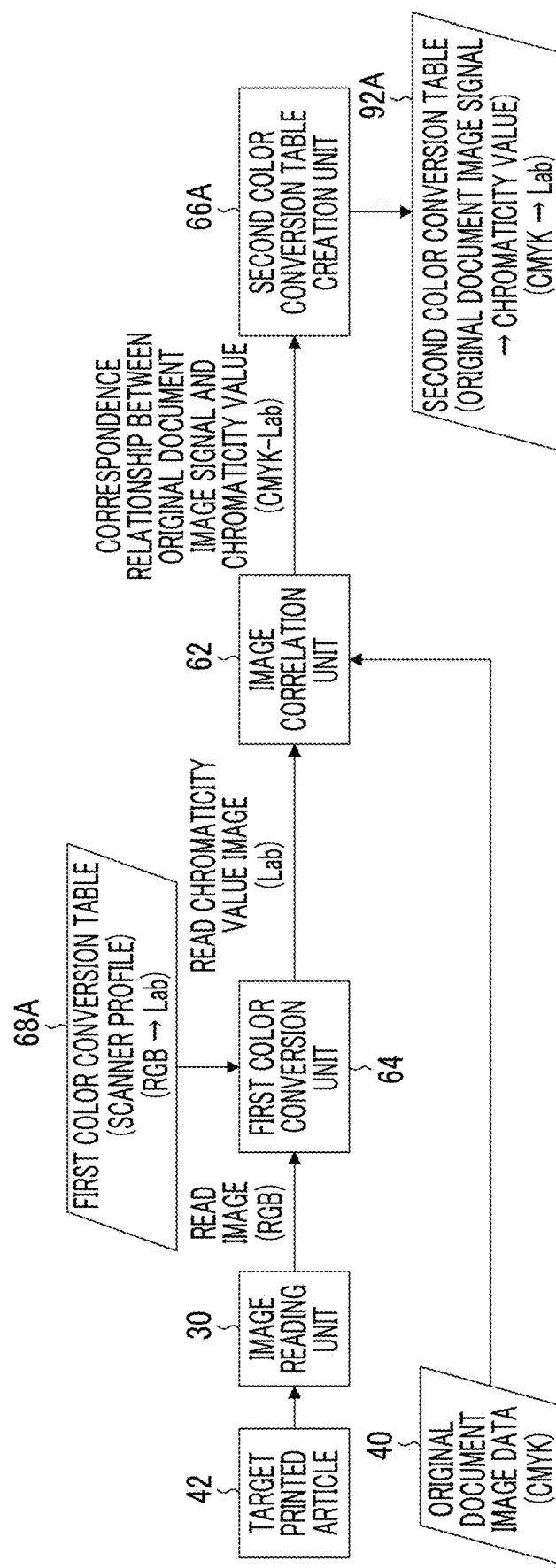
FIG. 4 is a block diagram illustrating a modification example of the first principal configuration.

FIG. 4 illustrates a modification example of the configuration illustrated in FIG. 3. In FIG. 4, an element which is identical or similar to the element described in FIG. 3 is given the same reference numeral, and a description thereof will be omitted.

In the configuration illustrated in FIG. 4, orders of processes in the image correlation unit 62 and the first color conversion unit 64 are replaced with each other compared with the configuration illustrated in FIG. 3. In the example illustrated in FIG. 4, an RGB→Lab conversion process (an example of a "first color conversion processing step") is performed on read image data of RGB acquired from the image reading unit 30 by the first color conversion unit 64, and then an image correlation process between an obtained Lab image (an example of a read chromaticity value image) of the read image and the original document image data 40 is performed. The configuration illustrated in FIG. 4 can achieve the same effect as that of the configuration illustrated in FIG. 3.

As illustrated in FIG. 4, converted data obtained by the first color conversion unit 64 performing a color conversion process on read image data acquired from the image reading unit 30 is referred to as "read chromaticity value image data". The image correlation process between an Lab image of a read image and the original document image data 40, performed by the image correlation unit 62 illustrated in FIG. 4 corresponds to an example of a "third image correlation process".

<Second Principal Configuration>

Figure 5:
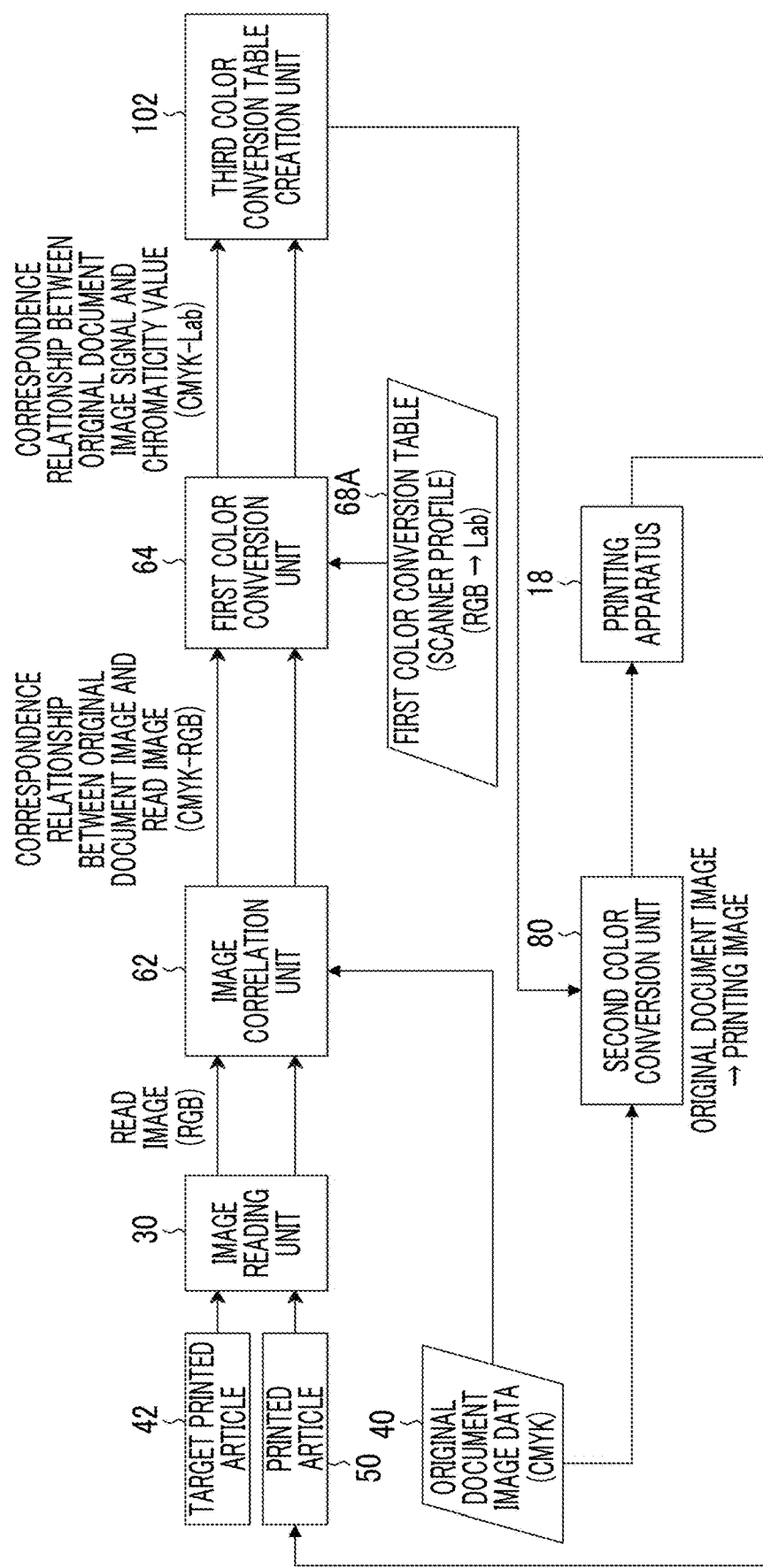
FIG. 5 is a block diagram illustrating a second principal configuration.

FIG. 5 is a block diagram illustrating the second principal configuration. In FIG. 5, an element which is identical or similar to the element described in FIGS. 1 to 4 is given the same reference numeral, and a description thereof will be omitted. A "third color conversion table creation unit 102" in FIG. 5 is a processing unit corresponding to the difference chromaticity value calculation unit 84 and the second profile correction unit 82 illustrated in FIG. 2.

Although not illustrated in the drawing, in the same manner as in the first principal configuration described in FIGS. 3 and 4, in the second principal configuration, process orders of the image correlation unit 62 and the first color conversion unit 64 illustrated in FIG. 5 may be replaced with each other, and the same effect as in FIG. 5 can also be achieved by employing such a configuration.

A description will be made of procedures of a process in the second principal configuration illustrated in FIG. 5 with reference to a flowchart in FIG. 6. In the second principal configuration illustrated in FIG. 5, first, an input color conversion table and an output color conversion table are set in the second color conversion unit 80 (step S110 in FIG. 6). The input color conversion table is the color conversion table of the target profile 92 described in FIG. 2, and the output color conversion table is the color conversion table of the printer profile 94.

Figure 6:
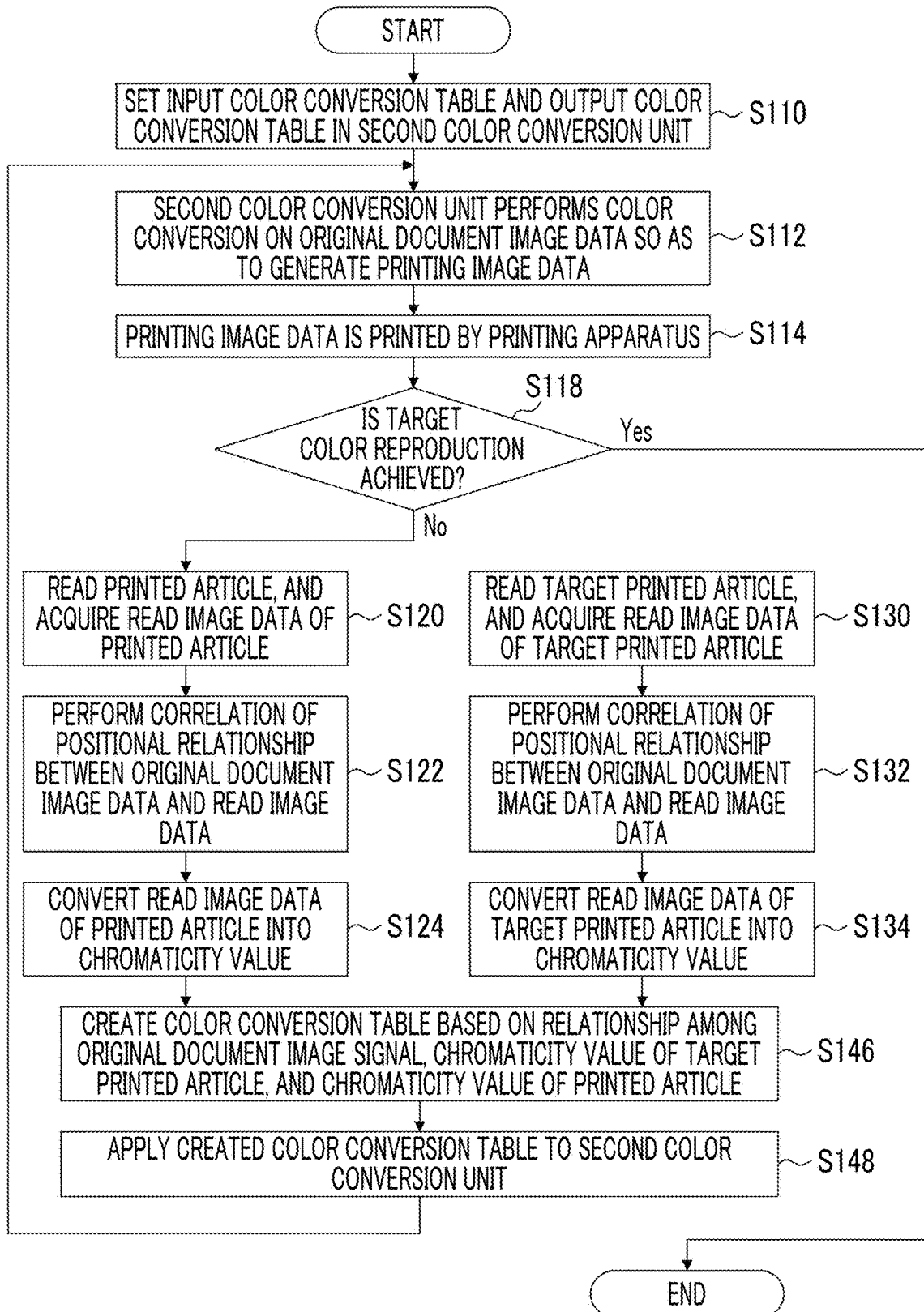
FIG. 6 is a flowchart illustrating procedures of a process using the second principal configuration.

The input color conversion table and the output color conversion table set in step S110 in FIG. 6 are color conversion tables given as initial settings in the second color conversion unit 80. As the input color conversion table used for an initial setting, the "second color conversion table 92A" created by the first principal configuration described in FIG. 3 is preferably used. However, the second color conversion table 92A is only an example, an input color conversion table of a standard profile of Japan Color (registered trademark) may be used, and a color conversion table created in the past in the printing system 10 may be applied.

An output color conversion table which is defined for each printing apparatus 18 in advance according to the type of printing paper to be used may be used, but, in the case of the present embodiment, the output color conversion table is created by using the first principal configuration described in FIG. 3 or 4. A method of creating a printer profile which is an output color conversion table in the printing system 10 of the present embodiment will be described later in detail.

After the input color conversion table and the output color conversion table are set in the second color conversion unit 80, the second color conversion unit 80 performs color conversion on the original document image data 40 by using the color conversion tables, so as to generate printing image data suitable to be input to the printing apparatus 18 (step S112 in FIG. 6; an example of a "second color conversion step").

In a case of the present example, the original document image data 40 of CMYK is converted into printing image data of CMYK by using the input color conversion table and the output color conversion table of the second color conversion unit 80.

The printing image data generated by the second color conversion unit 80 is sent to the printing apparatus 18, and is printed by the printing apparatus 18 (step S114 in FIG. 6; an example of a "printing step"). The printed article 50 is obtained through the printing step (step S114).

It is determined whether or not the printed article 50 in which the target color reproduction is achieved is obtained by comparing the obtained printed article 50 with the target printed article 42 (step S118). A determination method in step S118 includes, for example, the following two methods. In other words, a first example of the determination method is a method of performing determination through visual comparison between the printed article 50 and the target printed article 42. A second example of the determination method is a method of performing quantitative determination based on a difference between chromaticity values acquired by reading the printed article 50 and the target printed article 42 with the image reading unit 30.

As a further specific example of the second example of the determination method, for example, an average color difference or the maximum color difference is computed, and it is determined that the target color reproduction is achieved in a case where the average color difference or the maximum color difference is equal to or less than a threshold value. As another specific example, both of an average color difference and the maximum color difference may be computed, and determination may be performed through combination of the average color difference and the maximum color difference. In this case, for example, in a case where the average color difference is equal to or less than a first threshold value, and the maximum color difference is equal to or less than a second threshold value, it may be determined that the target color reproduction is achieved. Alternatively, an evaluation function for obtaining another evaluation value (index value) through combination of an average color difference and the maximum color difference may be defined, and it may be determined whether or not the target color reproduction is achieved by comparing an evaluation value obtained by using the evaluation function with a threshold value defined as a determination reference.

In other words, in the second example of the determination method, determination is performed on the basis of a difference between chromaticity values which are respectively obtained in step S124 and step S134 which will be described later. A calculation function and a determination function of performing such quantitative determination are installed, and thus an automatic determination process can be realized.

Instead of the determination method (first example) using visual comparison or in combination thereof, the quantitative determination method (second example) based on a difference between chromaticity values may be employed.

In the determination in step S118, in a case where the printed article 50 in which color reproduction equivalent to the target printed article 42 is achieved is obtained, a determination result in step S118 is Yes, and thus the color matching process may be finished.

In contrast, in a case where the printed article 50 of the target color cannot be obtained in the determination in step S118, a determination result in step S118 is No, the flow proceeds to step S120 in FIG. 6, and the image reading unit 30 reads the printed article 50, so as to acquire read image data of the printed article 50 (step S120 in FIG. 6). Step S120 corresponds to an "image reading step for a printed article" or a "read image data acquisition step for a printed article".

In the present example, an RGB image is obtained as the read image data, and the acquired read image data is sent to the image correlation unit 62. The image correlation unit 62 performs an image correlation process of performing correlation of a positional relationship between the read image data of the printed article 50 (referred to as "printed article read image data") and the original document image data 40 (step S122 in FIG. 6). A step of incorporating the original document image data 40 (original document image data acquisition step) may be performed before or after the read image data acquisition step for a printed article. However, in a case where the original document image data 40 is incorporated into the system by the first principal configuration described in FIG. 3, the original document image data 40 is not required to be incorporated again, and the original document image data 40 may be read from the image data storage unit 22 (refer to FIG. 1).

In the image correlation unit 62, a correspondence relationship between pixel positions of the original document image and the read image is specified, and data indicating a correspondence relationship with a signal value (RGB value) of the printed article read image data corresponding to a signal value (CMYK value) of the original document image data is obtained.

The first color conversion unit 64 performs a process of converting the RGB value of the read image data into an Lab value on the printed article read image data having undergone the image correlation process in the image correlation unit 62, by using the first color conversion table 68A (step S124 in FIG. 6; a "first color conversion step"). Consequently, a chromaticity value (Lab value) of the printed article read image data is obtained.

In the same manner as the processes in steps S120 to S124 performed on the printed article 50, according to acquisition of read image data (step S130), correlation between original document image data and the read image data (step S132), and color conversion into a chromaticity value (step S134) are performed on the target printed article 42.

In other words, the image reading unit 30 reads the target printed article 42 so as to acquire read image data of the target printed article 42 (step S130 in FIG. 6). Step S130 corresponds to an "image reading step for a target printed article" or a "read image data acquisition step for a target printed article". The acquired read image data of the target printed article 42 (referred to as "target printed article read image data") is sent to the image correlation unit 62. The image correlation unit 62 performs an image correlation process of performing correlation of a positional relationship between the target printed article read image data and the original document image data 40 (step S132 in FIG. 6).

In the image correlation unit 62, a correspondence relationship between pixel positions of the original document image and the read image is specified, and data indicating a correspondence relationship with a signal value (RGB value) of the target printed article read image data corresponding to a signal value (CMYK value) of the original document image data is obtained.

The first color conversion unit 64 performs a process of converting the RGB value of the read image data into an Lab value on the target printed article read image data having undergone the image correlation process in the image correlation unit 62, by using the first color conversion table 68A (step S134 in FIG. 6; a "first color conversion step"). Consequently, a chromaticity value (Lab value) of the target printed article read image data is obtained.

The processes in steps S130 to S134 may be performed before the processes in steps S120 to S124, or may be performed in parallel to the processes in steps S120 to S124. In a case where the "second color conversion table 92A" has been created according to the procedures 1 to 4 in the first principal configuration described in FIG. 3, information regarding the chromaticity value of the target printed article read image data is already obtained, and thus the processes in steps S130 to S134 may be omitted.

In the above-described way, information regarding the chromaticity value (that is, a chromaticity value of the target printed article 42) of the target printed article read image data corresponding to the original document image data 40 and information regarding the chromaticity value (that is, a chromaticity value of the printed article 50) of the printed article read image data are obtained, and a process of creating a color conversion table is performed on the basis of a difference between the chromaticity value of the target printed article 42 and the chromaticity value of the printed article 50 by using a relationship among the original document image signal, the chromaticity value of the target printed article 42, and the chromaticity value of the printed article 50 (step S146 in FIG. 6).

A processing unit creating the color conversion table in step S146 is the "third color conversion table creation unit 102" in FIG. 5. The color conversion table created by the third color conversion table creation unit 102 is a table used by the second color conversion unit 80, and the third color conversion table creation unit 102 creates any one of the input color conversion table, the output color conversion table, and the color correction table of the color correction profile 96 (refer to FIG. 2) used by the second color conversion unit 80.

In the above-described way, the color conversion table created by the third color conversion table creation unit 102 is applied to the second color conversion unit 80 (step S148 in FIG. 6), the flow returns to step S112, and the processes in step S112 and the subsequent steps are repeatedly performed. In the repeatedly performed processes, the processes in steps S130 to S134 regarding reading of the target printed article 42 are not necessary.

According to the second principal configuration described in FIGS. 5 and 6, a color conversion table applied to the second color conversion unit 80 can be improved to a more suitable table, and thus it is possible to further improve color conversion accuracy.

<Description of Each Unit>

A function of each unit of the first principal configuration (FIGS. 3 and 4) and the second principal configuration (FIG. 5) will be described in more detail.

[Image Reading Unit 30]

In the first principal configuration illustrated in FIGS. 3 and 4, the image reading unit 30 does not read the printed article 50, and reads only the target printed article 42. In other words, in the first principal configuration, a target profile is created on the basis of only the original document image data 40 and a reading result of the target printed article 42 without printing the printed article 50.

In contrast, in the second principal configuration illustrated in FIG. 5, two types of printed articles such as the target printed article 42 and the printed article 50 printed by the printing apparatus 18 are read by the image reading unit 30. In other words, in the second principal configuration, the printed article 50 obtained by the printing apparatus 18 printing the original document image data 40 is read, the given target printed article 42 is read, and the color conversion table of the second color conversion unit 80 is corrected such that a difference between both of the reading results is reduced.

[Image Correlation Unit 62]

The image correlation unit 62 performs correlation between image positions (that is, pixel positions) of the original document image data 40 and read image data obtained by reading a printed article (the target printed article 42 or the printed article 50).

The read image data mentioned here corresponds to either an RGB image obtained from the image reading unit 30 or a chromaticity value image (Lab image) obtained by the first color conversion unit 64 performing color conversion on the RGB image. In a case of the configuration illustrated in FIG. 3, the read image data is an RGB image, and, in a case of the configuration illustrated in FIG. 4, the read image data is a chromaticity value image (Lab image).

A well-known image registration method may be used for the correlation (registration) process between image positions of the original document image data 40 and the read image data. For example, as the image registration method, the method disclosed in the paragraphs [0064] to [0068] of JP2016-048904A may be used.

Figure 7:
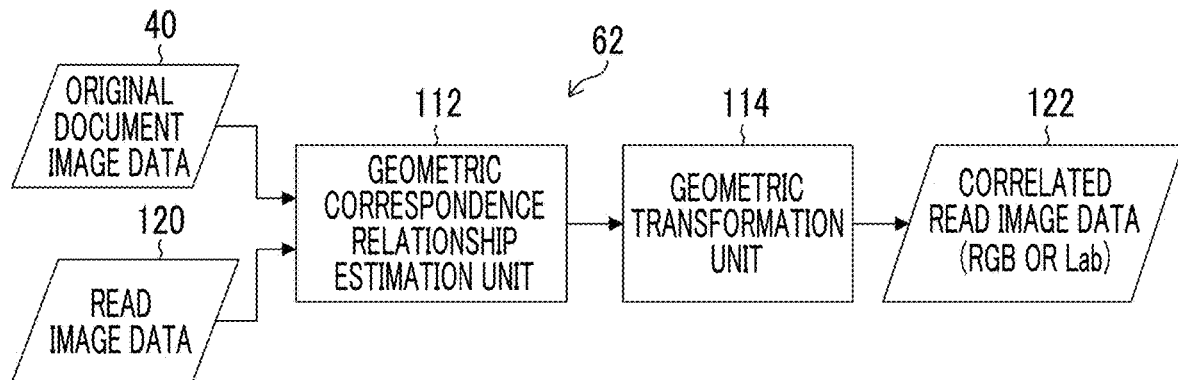
FIG. 7 is a block diagram illustrating a specific example of an image registration process in an image correlation unit.

FIG. 7 is a block diagram illustrating a specific example of an image registration process in the image correlation unit 62. The image correlation unit 62 includes a geometric correspondence relationship estimation unit 112 and a geometric transformation unit 114. The geometric correspondence relationship estimation unit 112 incorporates the original document image data 40 and read image data 120 thereinto, and estimates a geometric correspondence relationship between the two images. The geometric correspondence relationship includes at least one of an image displacement amount, a rotation angle, or a variable magnification between two contrasted images.

The geometric transformation unit 114 performs a geometric transformation process on one or both of the two images such that the two images match each other, on the basis of the geometric correspondence relationship estimated by the geometric correspondence relationship estimation unit 112. For example, there may be a configuration in which geometric transformation is performed on the read image data, and geometric transformation is not performed on the original document image data 40. As an example of the geometric transform, affine transformation may be applied.

For example, (a) a method using a marker, (b) a method using a pattern matching method, and (c) a method using a phase only correlation may be used to estimate a geometric correspondence relationship between two images. Hereinafter, a description will be made by referring to contents disclosed in JP2016-048904A.

(a) Method Using Marker

In a printing industry, a printed article is output in which a marker indicating a reference position, called a "dragonfly" is disposed at four corners of an original document image or at the center of each side. In a case where the printed article with the markers is read, a deviation amount of a position of the marker is measured, and thus a displacement amount, a rotation angle, or a variable magnification between images can be obtained.

For example, four to six dragonflies (markers) are formed on a single printed article. A geometric transformation parameter may be obtained by comparing positional deviations of a marker on original image data and read image data of a printed article with each other.

A geometric transformation parameter is obtained by obtaining a correspondence relationship between a dot indicating a position of a feature point of a marker in the original document image data and a dot indicating a position of a feature point of a marker in the read image data. Here, it is known that for example, afline transformation is performed one of the two images, and two dot patterns are matched with each other. Therefore, in order to obtain a geometric transformation parameter, an optimal affine parameter to which each position of the two dot patterns is most approximate may be found. For example, an evaluation function of an affine parameter for affine transformation of a feature point of a marker in the read image data into a feature point of a marker in the original document image data is defined, and an affine parameter of when the evaluation function is the minimum is set as a geometric transformation parameter.

(b) Method Using Pattern Matching Method

As an example of estimating only a displacement amount, there may be a template matching method. In the template matching method, one image is used as a template, the coincidence with the other image is obtained while deviating a position of one image, and a position at which the coincidence is highest is detected. In a case where geometric transformation cannot be restricted to a displacement, the template matching method is required in combination with a method (hough transformation or the like) of estimating a rotation angle or a method (multi-scale analysis or the like) of estimating a variable magnification.

In a block matching method to which template matching is applied, one image may be divided into blocks, and a displacement amount may be obtained by detecting a position at which the coincidence with the other image is highest for each block. In the block matching method, a rotation angle or a variable magnification may be estimated on the basis of a displacement amount for each block.

(c) Method Using Phase Only Correlation

As an example of a method of obtaining a displacement amount, a rotation angle, or a variable magnification with high accuracy, there is a phase only correlation (POC) or a rotation invariant phase only correlation (RIPOC). The phase only correlation is a method of obtaining a displacement amount by detecting a position at which a correlation between two phase images obtained from two comparison object images is highest by using the phase images obtained by applying discrete Fourier transformation to images. The rotation invariant phase only correlation is a method of measuring a displacement amount on a phase image in which a rotation angle and a variable magnification are transformed by performing log-polar coordinate transformation on the phase image.

A geometric transformation parameter is obtained according to the exemplified methods (a) to (c), and then the geometric transformation unit 114 performs geometric transformation on the read image data 120 (or the original document image data 40). During the conversion, in a case where pixels after transformation are not correlated with each other on a one-to-one basis due to movement or any rotation in sub-pixel accuracy, or magnification varying in a real value, a pixel value may be derived by using a pixel interpolation method as appropriate. Examples of the pixel interpolation method may include a bilinear method and a bicubic method.

In the above-described way, a correlation of a positional relationship with the original document image data 40 is defined, and correlated read image data 122 is obtained. The correlated read image data 122 is sent to the first color conversion unit 64 (refer to FIGS. 2 to 5).

[Preprocess for Image Correlation (Registration)]

In a case where a resolution of the original document image data 40 is different from a resolution of the read image data 120, the image correlation unit 62 preferably performs resolution conversion for matching the resolution of the read image data 120 with the resolution of the original document image data 40. The image correlation unit 62 is configured to include a resolution conversion unit (not illustrated) performing a resolution conversion process.

For example, as in a case where the original document image data 40 is a CMYK image, and the read image data 120 is an RGB image, in a case where color spaces of the original document image data 40 and the read image data 120 are different from each other, it is preferable that both of the data are subjected to grayscale conversion, and are thus converted to be included in an identical color space before image registration (correlation) is performed by the image correlation unit 62.

The grayscale conversion may be performed, for example, by converting the read image data 120 into an Lab value with the scanner profile 68 (refer to FIG. 2), and by generating a monochrome image by extracting only an L value (brightness). For the original document image data 40, a color profile of the target printed article 42 is not present at the time of creating a target profile by using the first principal configuration (FIGS. 3 and 4), but a representative profile such as Japan Color (registered trademark) may be used.

Since it is supposed that pixel values (density values) are different from each other even though both of the original document image data 40 and the read image data 120 are subjected to grayscale conversion, an edge extraction process may be further performed on a grayscale image to be converted into a binary edge image, and then registration may be performed. For example, a well-known Sobel method or Prewitt method may be used for the edge extraction process.

Since it is supposed that edge thicknesses of two edge images are different from each other, a thinning process may be further performed on each of the edge images such that edge thicknesses are aligned with each other, and then registration may be performed. For example, a well-known Hilditch method or a Tamura method may be used for the thinning process.

As mentioned above, in a case where image color spaces of the original document image data 40 and the read image data are different from each other, a preprocess for registration is preferably performed such that a geometric correspondence relationship between images is easily estimated. A preprocess may be performed even in a case where the original document image data 40 and the read image data have an identical color space.

The target printed article 42 is an actual printed article (actually shipped printed article) printed by another printing apparatus other than the printing apparatus 18, and thus there may be a case where the target printed article 42 does not correspond to the original document image data 40 on a one-to-one basis. A case where the target printed article 42 does not correspond to the original document image data 40 on a one-to-one basis may include the following examples.

<Example 1>: A case where the target printed article 42 is printed article in which the identical original document image data 40 is disposed in a plurality on an identical printing surface <Example 2>: A case where the target printed article 42 is a printed article in which image data (image data which is different from the original document image data 40) which is not a color matching object with the original document image data 40 is disposed in a plurality on an identical printing surface Disposing a plurality of different pieces of image data on an identical printing surface is referred to as "different imposition" or "ganging".

<Example 3>: A case where the original document image data 40 configures a part of the target printed article 42 (a part of design and/or a layout)

As exemplified in the above <Example 1> to <Example 3>, in a case where the target printed article 42 does not correspond to the original document image data 40 on a one-to-one basis, it is useful to perform a partial image extraction process of extracting a partial image corresponding to the original document image data 40 of interest from a read image of the target printed article 42.

Herein, as a specific example of <Example 1>, a description will be made of a case where the target printed article 42 is a printed article in which the original document image data 40 is disposed (imposed) in a plurality in a nesting shape on an identical printing surface.

Figure 8:
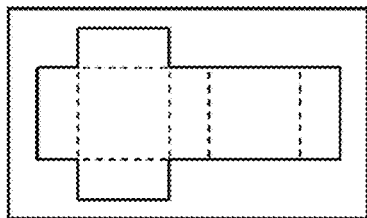
FIG. 8 is a diagram illustrating an example of original document image data.
Figure 9:
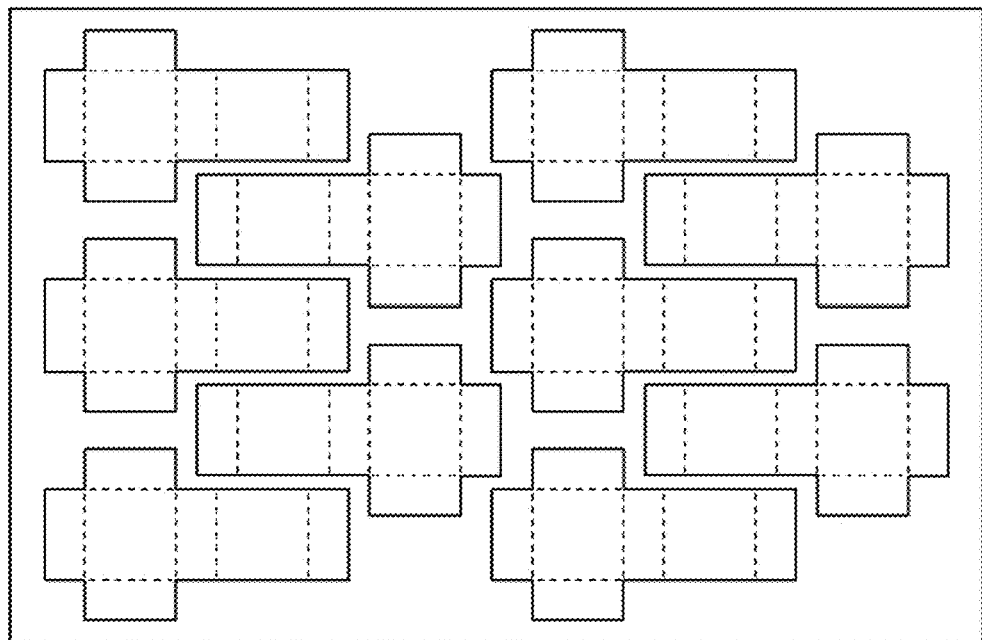
FIG. 9 is a diagram illustrating an example of a target printed article.

FIGS. 8 and 9 illustrate examples thereof. FIG. 8 is a diagram illustrating an example of the original document image data. FIG. 9 is a diagram illustrating an example of the target printed article. The target printed article illustrated in FIG. 9 is a printed article in which the original document image data in FIG. 8 is disposed (imposed) in a plurality in a nesting shape on a printing surface, and is printed.

In this case, instead of using the read image data of the target printed article without change, a partial image corresponding to the original document image data is preferably extracted from the read image data in advance before registration is performed by the image correlation unit 62.

As a method of a process of extracting a partial image, there may be a method in which a partial image corresponding to an original document image is specified by using well-known pattern matching and is automatically extracted, or a method in which a read image is displayed on the display unit 34 as a monitor, and a user manually designates a range of a partial image corresponding to an original document image.

It is useful to perform a partial image extraction process in the same manner for the case of <Example 2> or <Example 3> without limitation to the case of <Example 1>.

The partial image extraction process is not necessary in a case where the original document image data 40 corresponds to the target printed article 42 on a one-to-one basis, for example, in a case where a color sample corresponding to a single original document image is provided from a requester.

Figure 10:
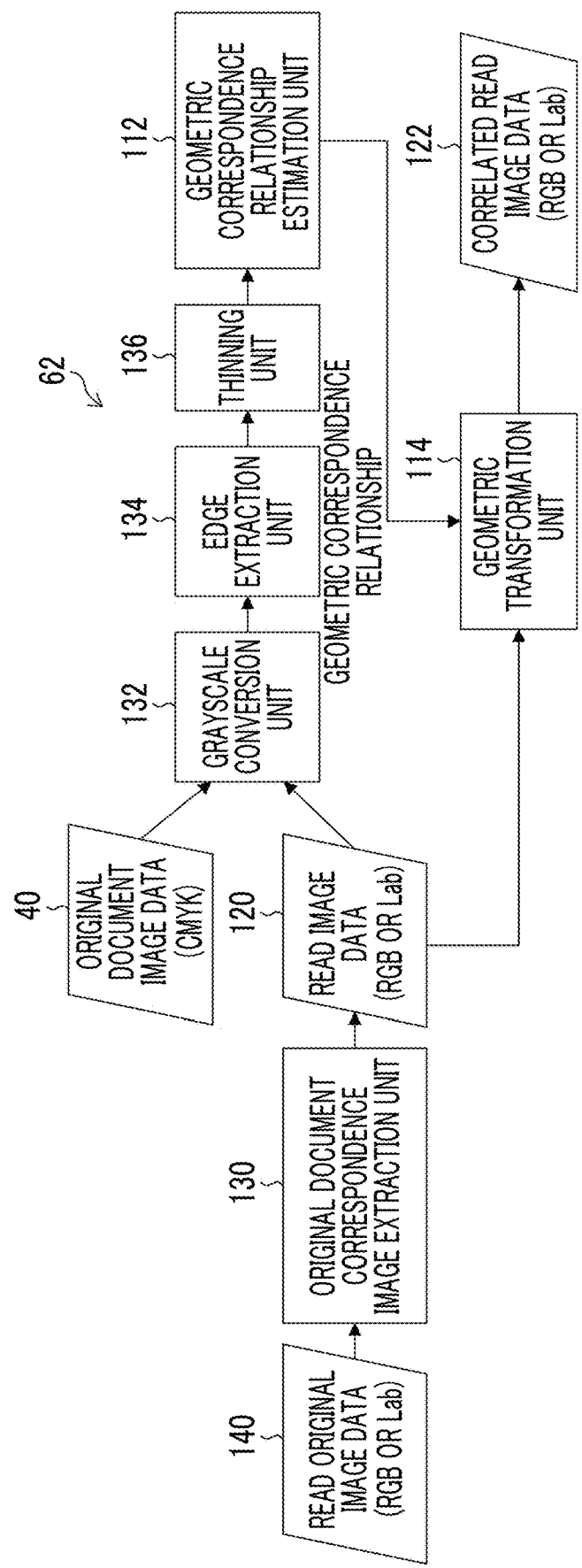
FIG. 10 is a block diagram illustrating a configuration of performing an image correlation process including a pre-process.

FIG. 10 is a block diagram illustrating a configuration of performing an image correlation process including the preprocess. The image correlation unit 62 illustrated in FIG. 10 includes an original document correspondence image extraction unit 130 (corresponding to an "image extraction unit"), a grayscale conversion unit 132, an edge extraction unit 134, a thinning unit 136, the geometric correspondence relationship estimation unit 112, and the geometric transformation unit 114.

The original document correspondence image extraction unit 130 performs a process of extracting a partial image corresponding to the original document image data 40 from read original image data 140 which is obtained by reading the target printed article 42 in which a plurality of images are disposed to be imposed as exemplified in FIG. 9. The read original image data 140 is data of a read image generated by reading the entire printing surface of the target printed article as illustrated in FIG. 9. The read original image data 140 may be an RGB image, and may be an Lab image.

Data of the partial image extracted by the original document correspondence image extraction unit 130 is the read image data 120 contrasted with the original document image data 40.

The grayscale conversion unit 132 performs a process of grayscale conversion on each of the original document image data 40 and the read image data 120. The edge extraction unit 134 performs a process of extracting an edge from a grayscale image. The thinning unit 136 performs a thinning process on an edge image generated by the edge extraction unit 134.

The edge image having undergone the thinning process in the thinning unit 136 is input to the geometric correspondence relationship estimation unit 112, and a geometric correspondence relationship between the original document image data 40 and the read image data 120 is specified in the geometric correspondence relationship estimation unit 112. The geometric transformation unit 114 performs a geometric transformation process on the read image data 120 by using the geometric correspondence relationship obtained in the above-described way, and thus the correlated read image data 122 is obtained.

The correlation processing function of the image correlation unit 62 corresponds to an "image correlation function". In a case where the original document image data 40 and a printed image of the target printed article 42 correspond to each other on a one-to-one basis, the read original image data 140 in FIG. 10 is handled as the read image data 120 without being changed.

[First Color Conversion Unit 64]

The first color conversion unit 64 performs a process of converting data of a read image (for example, an RGB image) acquired from the image reading unit 30 into data of a device-independent color space. As described in FIG. 2, in the present example, a read image signal value (RGB) in the image reading unit 30 is converted into a chromaticity value (Lab) of the device-independent color space by using an RGB→Lab conversion table as a color conversion table (corresponding to a "first color conversion table") of the scanner profile 68 which is prepared in advance.

Here, in a case where there are a plurality of identical image signal values in original document image data, corresponding chromaticity values of a read image may be different from each other due to the influence of noise in the image reading unit 30, dust attached to a printed article, or a flaw of a printed article. Therefore, in order to reduce the influence of noise or the like, chromaticity values of a read image corresponding to identical original document image signal values are preferably averaged.

The scanner used in the image reading unit 30 generally acquires an image signal (scanner image signal) which is acquired via filters of RGB three primary colors. The spectral sensitivities of the filters of RGB three primary colors are different from XYZ color-matching functions of a spectral colorimeter.

The scanner profile is a profile in which a scanner image signal is correlated with a color (a chromaticity value of a device-independent color space). The spectral sensitivities (that is, the spectral sensitivities of the scanner) of the filters of RGB three primary colors in the scanner are different from the XYZ color-matching functions of the spectral colorimeter. Thus, in a case of color materials or base materials having different spectral characteristics, XYZ values (Lab values) acquired with the colorimeter may be different from each other even in a case where RGB signal values acquired with the scanner are the same as each other. In other words, the scanner profile depends on a color material or a base material of a printed article.

Therefore, regarding the scanner profile, an appropriate profile is preferably selected automatically or through a user's operation in accordance with conditions of a color material or a base material to be used.

[Target Profile Creation Unit 66 (Second Color Conversion Table Creation Unit 66A)]

Data representing a correspondence relationship between an image signal value (in the present example, a CMYK value) of each pixel in the original document image data 40 and a chromaticity value (an Lab value in the present example) of each pixel in the read image data of the target printed article 42 is obtained through the processes in the image reading unit 30, the image correlation unit 62, and the first color conversion unit 64. The target profile creation unit 66 (FIG. 2), that is, the second color conversion table creation unit 66A (FIG. 3) creates a color conversion table defining a conversion relationship (CMYK→Lab) for conversion from an image signal value (CMYK) into a chromaticity value (Lab) on the basis of the "the correspondence relationship data between an original document image signal and a chromaticity value".

In a case of a printing system of the related art, in creating such a color conversion table, generally, a correspondence relationship between an image signal value and a chromaticity value which are regularly disposed in the entire color space by using a color chart, and the color conversion table is created through interpolation using a predetermined interpolation method on the basis of the correspondence relationship.

In contrast, in the present embodiment, since a color conversion table is created on the basis of the target printed article 42 which is an actual reproduction target and the original document image data 40 thereof, the color conversion table is required to be created on the basis of a correspondence relationship between an image signal value and a chromaticity value which are partially irregularly disposed in a color space. Thus, a method using general interpolation of the related art cannot be used. Thus, the following methods are used.

Figure 11:
FIG. 11 is a table illustrating an example of correspondence data between an original document image signal and a chromaticity value.
Figure 12:
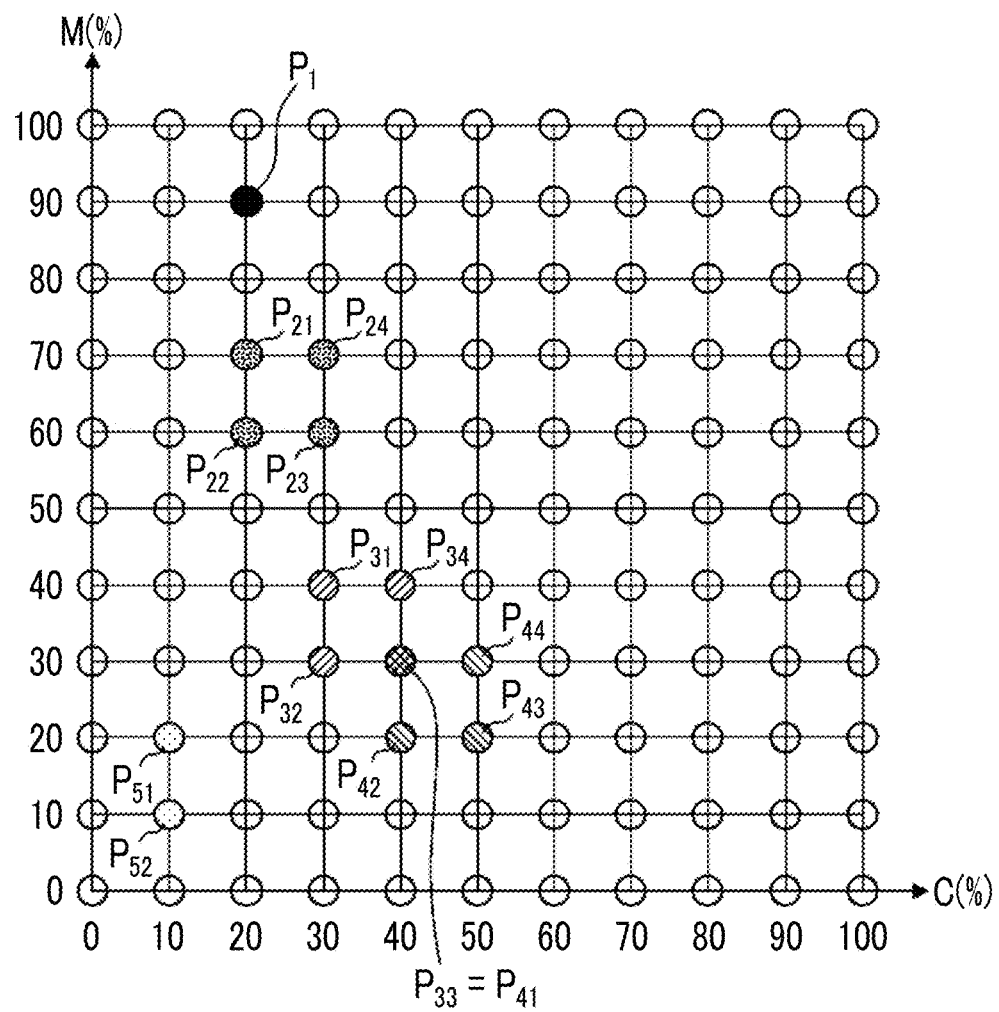
FIG. 12 is an explanatory diagram illustrating grid points of a color space (here, a CM plane) of original document image data corresponding to an input side of a color conversion table.

[Example 1] Method of Directly Correlating Correspondence Relationship Data Between Original Document Image Signal and Chromaticity Value to Color Conversion Table With reference to examples illustrated in FIGS. 11 and 12, a description will be made of a method of directly correlating correspondence relationship data between an original document image signal and a chromaticity value with a grid point of a color space of the color conversion table. Herein, for simplification of description, a description will be made of the concept of a color conversion table for CM two colors. FIG. 11 illustrates an example of correspondence relationship data between an original document image signal (CM) and a chromaticity value (Lab). FIG. 12 illustrates grid points of a color space (here, a CM surface) of original document image data corresponding to an input side of the color conversion table.

In FIG. 12, a range (domain) which may be taken by a signal value is expressed by 0% to 100% on each of a C axis and an M axis, and the grid points are set at a pitch of 10% on each axis. A pitch of a signal on each axis defining a grid point is not limited to 10% in implementation of the invention. In a case where integer values (0 to 255) of 8 bits are used as signal values of an image signal, a value between 0 and 255 may be correlated in a linear form with the signal value "0" as 0% and the signal value "255" as "100%".

The grid points at the pitch of 10% illustrated in FIG. 12 indicate grid points of original document image signals on an input side in a color conversion table. In a color conversion table, a corresponding Lab value is allocated to each grid point.

"ID" in FIG. 11 is an identification sign for specifying a color (CM value) used in original document image data. Each of the C value and the M value indicates a signal value in the range of 0% to 100%. An Lab value includes values of respective components such as an L value, an a value, and a b value.

A CM value of ID=1 indicates (C,M)=(20,90), and an Lab value corresponding to the CM value of ID=2 indicates (L,a,b)=(50,60,−13).

A CM value of ID=2 indicates (C,M)=(24,66), and an Lab value corresponding to the CM value indicates (L,a,b)=(60, 36,−17).

In creation of a color conversion table, a corresponding chromaticity value (Lab value) is set for a grid point of the color conversion table corresponding to an original document image signal value (CM value) of each ID illustrated in FIG. 12.

The CM value of ID=1 indicates a color corresponding to a grid point P1 in FIG. 11. The corresponding Lab value (50,60,−13) is set for the grid point P1 corresponding to ID=1.

With respect to IDs=2 to 5, there are no directly corresponding grid points, and thus chromaticity values are set for near grid points. As illustrated in FIG. 12, with respect to IDs=2, 3, and 4, chromaticity values are set for four peripheral grid points surrounding an original document image signal value.

With respect to ID=2, the identical Lab value (60,36,−17) is set for four grid points $P_{21}$, $P_{22}$, $P_{23}$, and $P_{24}$ surrounding (C,M)=(24,66). In the same manner for ID=3 and ID=4, a chromaticity value is set for four grid points surrounding an original document image signal value. However, as in ID=3 and ID=4, in a case where parts of four grid points surrounding each original document image signal value overlap each other, and different chromaticity value candidates are present for an identical grid point, the chromaticity value candidates are averaged and are set.

In other words, four grid points surrounding (C,M)=(35, 35) of ID=3 are $P_{31}$, $P_{32}$, $P_{33}$, and $P_{34}$, and four grid points surrounding (C,M)=(47,23) of ID=4 are $P_{41}$ (=$P_{33}$), $P_{42}$, $P_{43}$, and $P_{44}$. With respect to the grid point ($P_{33}$=$P_{41}$) represented by (C,M)=(40,30), the chromaticity value candidate (71,9,−20) of ID=3 and the chromaticity value candidate (72,−4,−26) of ID=4 are present, and thus an average value (71.5, 2.5,−23) of Lab values of ID=3 and ID=4 is allocated thereto.

The Lab value (71,9,−20) of ID=3 is set for the other grid points $P_{31}$, $P_{32}$, and $P_{34}$. The Lab value (72,−4,−26) of ID=4 is set for the grid points $P_{42}$, $P_{43}$, and $P_{44}$.

With respect to ID=5, since the C value is "10%", "two grid points" $P_{51}$ and $P_{52}$ are used instead of "surrounding four grid points", and a corresponding Lab value (89,6,−8) is set for the grid points $P_{51}$ and $P_{52}$.

Among all grid points of the color conversion table, a grid point having no relation to an original document image signal value is not used for color conversion of the original document image data 40, and thus an appropriate value is set therefor. Any value such as Lab=(100, 0, 0) may be set for grid points indicated by white circles in FIG. 12.

In FIGS. 11 and 12, for simplification of description, the color conversion table for CM two colors has been described, but a chromaticity value may be set for a grid point in the same manner for color conversion tables for three or more colors.

In a case of two colors, grid points surrounding any CM value are a maximum of four points, in a case of three colors, grid points are a maximum of eight points, and, in a case of four colors, grid points are a maximum of sixteen points.

In FIGS. 11 and 12, with respect to ID=1, the Lab value (chromaticity value) is directly correlated with the grid point corresponding to the CM value, but a slightly deviated point may be referred to due to a calculation error or the like in a case where the color conversion table is referred to, and may thus be calculated to be interpolated with a chromaticity value of an adjacent grid point. Thus, an identical chromaticity value is preferably set not only in a directly corresponding grid point but also in a peripheral adjacent grid point.

There is no problem in that the original document image data 40 is subjected to color conversion by using the color conversion table created according to the method described in Example 1, and is printed by the printing apparatus 18.

However, in a case where an operator observes a result printed by using the color conversion table created according to the method in Example 1, and adjusts (corrects) the original document image data for further color adjustment, a problem may occur. In other words, in a case where the operator adjusts the original document image data 40, a desired color change may not occur, or a color change which is different from a color change intended by the operator may occur, and thus color adjustment for the original document image data is difficult.

In order to prevent the occurrence of a problem as much as possible in adjustment of the original document image data as described above, it is preferable that the entire color space (even a color portion having no direct relation to the original document image data) has a corresponding chromaticity value (a color close to a color imagined by the operator), and smoothness of a color change is secured. In a case where smooth continuity in the entire color space is caused to be secured, methods as in Examples 2, 3, and 4 described below may be used.

[Example 2] Method of Correcting Temporary Color Conversion Table by Using Correspondence Relationship Data Between Original Document Image Signal and Chromaticity Value In Example 2, a "temporary color conversion table" in which smoothness of a color change corresponding to the entire color space is secured is prepared, and the temporary color conversion table is locally (partially) corrected by using correspondence relationship data between an original document image signal and a chromaticity value.

As the "temporary color conversion table" mentioned here, in a case of CMYK input, any one of color conversion tables such as Japan Color (registered trademark), SWOP, GRACoL, and Fogra, representing standard color reproduction in offset printing may be used, and, in a case of RGB input, any one of color conversion tables such as sRGB and AdobeRGB may be used. The SWOP stands for "Specifications for Web Offset Publications". The GRACol stands for "General Requirements for Applications in Commercial Offset Lithography".

The standard color conversion table and a color conversion table created according to the method of Example 2 in the past may be accumulated in a database, a color conversion table closest to correspondence relationship data between an original document image signal and a chromaticity value, newly acquired from a read image of the present target printed article 42 and the original document image data 40 may be selected from the database, and the selected color conversion table may be used as the "temporary color conversion table". The standard color conversion table or the color conversion table created in the past corresponds to an "existing color conversion table".

In selection of the color conversion table closest to "correspondence relationship data between an original document image signal and a chromaticity value", for example, a color conversion table in which an average value of color differences from correspondence relationship data between an original document image signal and a chromaticity value is smallest or a color conversion table in which the maximum value of color differences from correspondence relationship data between an original document image signal and a chromaticity value is smallest may be automatically extracted from the database so as to be used as the "temporary color conversion table". In a case where a plurality of candidates of the "temporary color conversion table" are extracted through automatic extraction, the candidates may be displayed on the display unit 34, and a user may select a color conversion table.

Setting of a chromaticity value for a grid point, described in [Example 1], is performed on the "temporary color conversion table". In other words, chromaticity values are set for the grid points $P_1$, $P_{21}$ to $P_{24}$, $P_{31}$ to $P_{34}$, $P_{41}$ to $P_{44}$, and $P_{51}$ and $P_{52}$ (refer to FIG. 12) corresponding to IDs=1 to 5 described in FIG. 11 in the same manner as in Example 1, and the temporary color conversion table is corrected such that chromaticity values for the grid points indicated by the white circles in FIG. 12 are the same as values in the "temporary color conversion table".

A corrected color conversion table obtained in the above-described way locally replaces a chromaticity value for a grid point with respect to the temporary color conversion table, and thus it is expected that continuity (smoothness) of a chromaticity value between a grid point for which a chromaticity value is replaced and a grid point for which a chromaticity value is not replaced deteriorates. Thus, it is preferable to secure smoothness of conversion of a chromaticity value by further performing a smoothing process on the corrected color conversion table.

[Example 3] Method Using Color Reproduction Model

As a color reproduction model, for example, a Neugebauer model may be used. The Neugebauer model is a model in which a chromaticity value of a multiplication color of 0% and 100% of each color material (primary color) is added according to an area ratio of each color material, and thus a chromaticity value of a reproduced color due to multiplication of any area ratio of each color material is obtained. In the Neugebauer model, generally, an XYZ value is used as a "chromaticity value".

Figure 13:
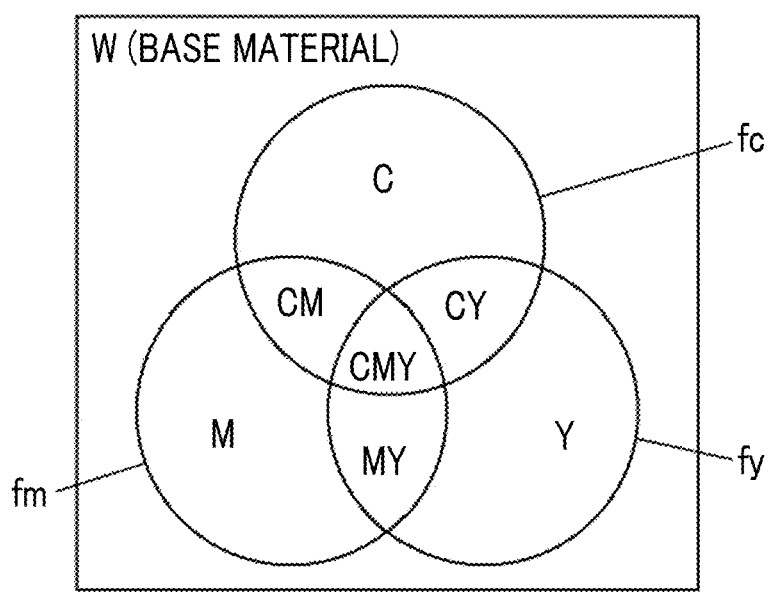
FIG. 13 is an explanatory diagram illustrating a method of calculating a chromaticity value by using a Neugebauer model.

Herein, with reference to FIG. 13, the color reproduction model will be described by using an example of CMY three color materials. In a case where a CMY area ratio of a prediction object color is indicated by (fc, fm, fy), an area ratio Fi (where i=w, c, m, y, cm, my, yc, and cmy) in multiplication of 0% and 100% of each color material may be calculated as in the following equation. In the equation, "·" indicates multiplication.

$Fw=(1-fc)\cdot(1-fm)\cdot(1-fy)$ $Fc=fc\cdot(1-fm)\cdot(1-fy)$ $Fm=(1-fc)\cdot(1-fm)\cdot fy$ $Fcm=fc\cdot fm\cdot(1-fy)$ $Fmy=(1-fc)\cdot fm\cdot fy$ $Fyc=fc\cdot(1-fm)\cdot fy$ $Fcmy=fc\cdot fm\cdot fy$ Here, "w" indicates a base material (printing base material) of a printed article such as printing paper. The area ratio indicates a coating ratio per unit area on the printing base material. Herein, the area ratio is expressed as a value of 0 or more and 1 or less. In addition, fc, fmn, and fy are values obtained on the basis of signal values (image signal values) of image data.

In a case where a chromaticity value (for example, X of an XYZ value) for multiplication of 0% and 100% of each color material is indicated by Xpi (where i=w, c, m, y, cm, my, yc, and cmy), the chromaticity value X for the CMY area ratio (fc, fm, fy) may be obtained according to the following equation.

$$X = \sum_i F_i \cdot Xp_i$$

Y and Z values of an XYZ value may be obtained in the same manner, and conversion from an XYZ value into an Lab value may be simply performed. This may also be applied to printing of two colors or printing of four or more colors in addition to printing of three colors.

In a case where the Neugebauer model is used to create a color conversion table, a chromaticity value for multiplication of 0% and 100% of each color material is necessary.

However, the present embodiment is based not on a color chart but on an actual printed article (target printed article 42), and thus a multiplication color of 0% and 100% of each color material does not exist in a correspondence relationship between an image signal value (CMYK) obtained through reading of the target printed article 42 and a chromaticity value (XYZ) for the target printed article 42.

Therefore, there may be a configuration in which a chromaticity value (Xpi,Ypi,Zpi) corresponding to multiplication of 0% and 100% of each color material of the Neugebauer model is set as an unknown number, a correspondence relationship between an image signal value (CMYK), that is, "Fi", and a chromaticity value (Xm,Ym, Zm) for the target printed article is set as correct answer data, and (Xpi,Ypi,Zpi) is estimated according to an optimization method. In other words, the optimization for finding (Xpi,Ypi,Zpi) minimizing a square sum of a difference expressed in the following expression is performed.

The following expression is an expression related to X. Expressions related to Y and Z may also be expressed in the same manner.

$$\sum_j \left\{ \left( \sum_i F_{ij} \cdot Xp_i \right) - Xm_j \right\}^2 \to \min$$

Here, j is a subscript indicating an ID (that is, each pixel) of correspondence relationship data between an image signal value (CMYK) and a chromaticity value (Xm,Ym,Zm) for the target printed article.

As the optimization method, for example, a Newton method, a quasi-Newton method, or a simplex method may be used. Methods other than the methods exemplified here may be used, and an applied method is not limited.

A chromaticity value for each grid point of a color conversion table may be calculated according to the Neugebauer model by using (Xpi,Ypi,Zpi) obtained through the optimization.

(Xpi,Ypi,Zpi) is estimated through the optimization calculation as mentioned above, but, in a case where there is a multiplication color of 0% and 100% of a color material exists in an image signal, a corresponding chromaticity value may be used as a value of (Xpi,Ypi,Zpi) without being changed. The number of unknown numbers is reduced, and thus optimization is facilitated.

In the above description, the Neugebauer model is used, but a Yule-Nielsen modified Neugebauer model of the following equation may be used. Here, n is a so-called Yule-Nielsen's correction coefficient, and corrects nonlinearity of multiplication for the Neugebauer model.

$$X = \sum_i \{F_i \cdot Xp_i^{1/n}\}^n$$

In a case where the model with the correction coefficient is used, n may be added to unknown numbers, and optimization may be performed. In addition, n may be common to XYZ values, and may be obtained as different coefficients (nx, ny, and nz) for X, Y, and Z.

For example, a Cellular-Neugebauer model in which colors (Xpi, Ypi, and Zpi) serving as bases of color prediction are extended to multiplication colors (for example, 0%, 40%, and 100%) also including an intermediate area ratio may be used. There is no limitation to the Neugebauer model in implementation of the present invention. A model representing a relationship between an image signal and a chromaticity value may be used, and color reproduction models other than the Neugebauer model may be used. A new model may be made by expressing color reproduction (a relationship between an image signal and a chromaticity value) as a numerical formula by using an appropriate matrix or polynomial, and by optimizing elements of the matrix or coefficients of the polynomial.

[Example 4] Combination Method of Example 3 and Example 2

As Example 4, there is a method in which a color conversion table is created by using a color reproduction model, and the color conversion table (which is created by using the color reproduction model) is corrected on the basis of correspondence relationship data between an original document image signal and a chromaticity value. In other words, Example 4 is a method in which the method of Example 2 is performed by using the color conversion table created in Example 3 as a "temporary color conversion table".

[Second Color Conversion Unit 80]

The second color conversion unit 80 performs color conversion on the original document image data 40 by using, as an input profile, a profile using the second color conversion table 92A created by the target profile creation unit 66 (that is, the second color conversion table creation unit 66A), or an appropriate profile prepared in advance, and by using, as an output profile, a profile of the printing apparatus 18 prepared in advance. The "appropriate profile prepared in advance" includes a standard profile such as Japan Color (registered trademark), SWOP, GRACoL, and Fogra, for example, in a case of a CMYK signal.

In the second principal configuration described in FIG. 5, an input profile which is initially set for the second color conversion unit 80 may be as close to color reproduction characteristics of the target printed article 42 as possible. Thus, preferably, input profile candidates are accumulated in a database, and an input profile is selected on the basis of a correspondence relationship between an original document image signal and a chromaticity value, acquired by reading the target printed article 42. As an input profile which is initially set for the second color conversion unit 80, a profile may be selected in which an average color difference or the maximum color difference between a read chromaticity value for an original document image signal and a profile chromaticity value is smallest.

Figure 14:
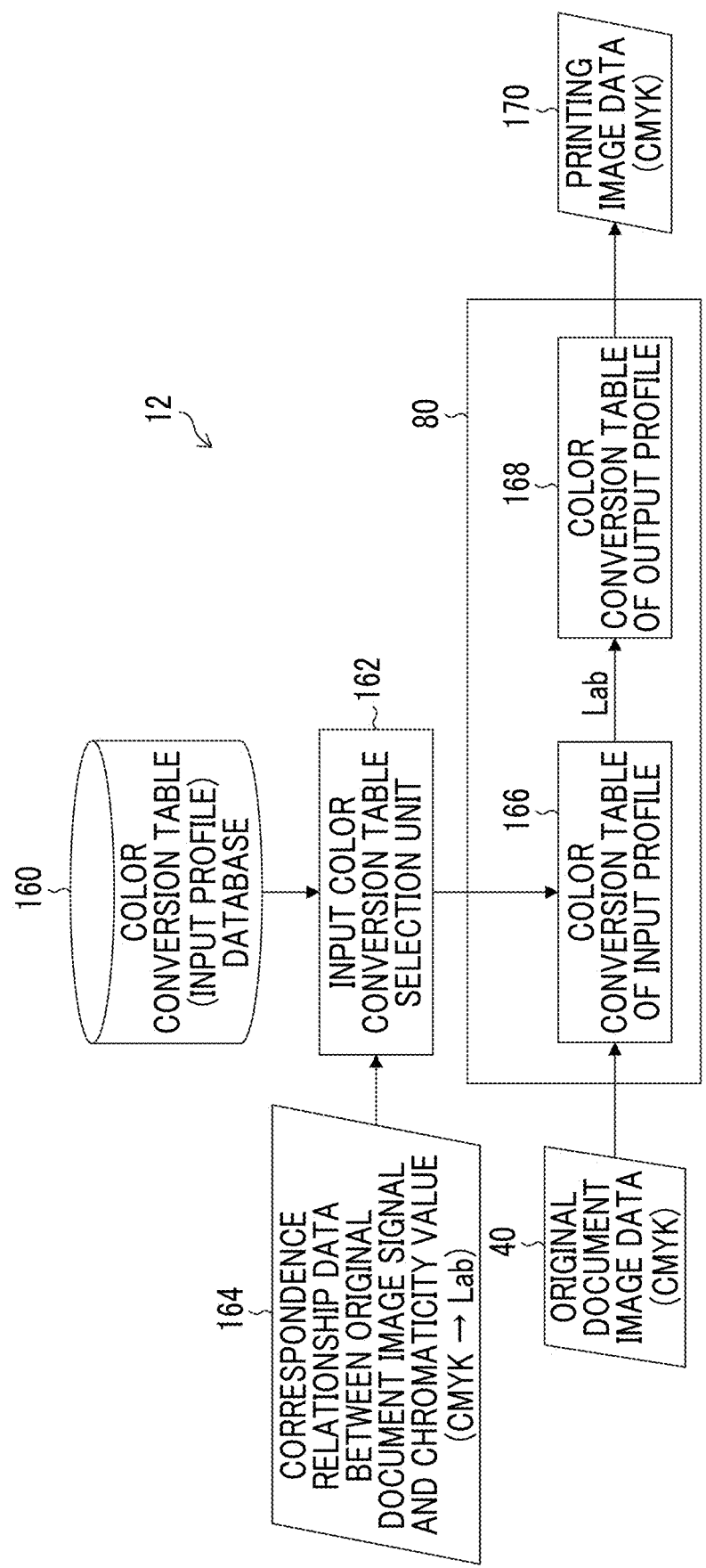
FIG. 14 is a main portion block diagram regarding a second color conversion unit.

FIG. 14 is a main portion block diagram regarding the second color conversion unit 80.

The image editing apparatus 12 includes a color conversion table database 160 and an input color conversion table selection unit 162. A color conversion table of a standard profile or an input profile created in the past is accumulated in the color conversion table database 160. The color conversion table database 160 corresponds to an "input color conversion table database".

The input color conversion table selection unit 162 performs a process of a color conversion table of an optimal input profile from the color conversion table database 160 on the basis of correspondence relationship data 164 between an original document image signal and a chromaticity value. The "correspondence relationship data 164 between an original document image signal and a chromaticity value" is generated through the processes in the image correlation unit 62 and the first color conversion unit 64 described in FIGS. 2 to 4.

The input color conversion table selection unit 162 illustrated in FIG. 14 performs a process of selecting a color conversion table in which an average color difference and the maximum color difference between a read chromaticity value for an original document image signal and a profile chromaticity value is smallest from the color conversion table database 160 on the basis of the correspondence relationship data 164 between an original document image signal and a chromaticity value.

A single color conversion table selected by the input color conversion table selection unit 162 is set as a color conversion table 166 of an input profile in the second color conversion unit 80.

The original document image data 40 is converted from a CMYK value into an Lab value on the basis of the color conversion table 166 ("input color conversion table") of an input profile in the second color conversion unit 80, and is further converted from the Lab value into a CMYK value on the basis of a color conversion table 168 ("output color conversion table") of an output profile.

In the above-described way, the original document image data 40 is subjected to CMYK→CMYK by the second color conversion unit 80, and is obtained as CMYK data corresponding to printing image data 170 after color conversion. In FIG. 14, a description will be made of a case where a color conversion process is performed stepwise by using the two color conversion tables (166 and 168), but, in an actual process, the two color conversion tables (166 and 168) may be integrated into a single color conversion table for CMYK→CMYK conversion. Color conversion can be performed through a single process by using the integrated multi-dimensional (CMYK→CMYK) color conversion table. The multi-dimensional color conversion table obtained by integrating the input color conversion table with the output color conversion table is referred to as a device link profile.

The printing image data 170 generated by the second color conversion unit 80 is delivered to the printing apparatus 18 (refer to FIGS. 1 and 2). The printing apparatus 18 prints the printed article 50 on the basis of the printing image data 170.

[Third Color Conversion Table Creation Unit 102]

Next, a description will be made of the third color conversion table creation unit 102 in FIG. 5. In the second principal configuration illustrated in FIG. 5, in the same manner as the procedures (Procedures 1 to 3; steps S130 to S134 in FIG. 6) of acquired a chromaticity value from the target printed article 42, procedures of acquiring a chromaticity value from the printed article 50 are also performed on the printed article 50 (steps S120 to S124 in FIG. 6).

Consequently, correspondence relationship data between chromaticity values for the original document image data 40 and the target printed article 42 is obtained, and correspondence relationship data between chromaticity values for the original document image data 40 and the printed article 50 is obtained. In other words, data indicating a correspondence relationship among three values such as a signal value ("original document image signal value") of the original document image data 40, a chromaticity value ("target chromaticity value") for the target printed article 42, and a chromaticity value ("printing chromaticity value") for the printed article 50 is obtained.

A difference between a target chromaticity value for each signal value of the original document image data 40 and a chromaticity value (printing chromaticity value) of an actually printed result can be acquired on the basis of the correspondence relationship data. The difference ("difference chromaticity value") between the chromaticity values is reflected in the color conversion table of the input profile (target profile 92) and the color conversion table of the output profile (printer profile 94) in the second color conversion unit 80, and the color conversion tables are corrected (refer to FIG. 2).

Alternatively, the color correction profile 96 for correcting a chromaticity value may be inserted between the input profile and the output profile, and a color correction table of the color correction profile 96 may be created by using information of the difference chromaticity value.

The third color conversion table creation unit 102 (refer to FIG. 5) is a block including the difference chromaticity value calculation unit 84 and the second profile correction unit 82 described in FIG. 2. The difference chromaticity value calculation unit 84 is a processing unit computing a difference between a target chromaticity value and a printing chromaticity value. The second profile correction unit 82 performs a process of correcting the color conversion table of the input profile or the color conversion table of the output profile, or a process of creating a color correction table of the color correction profile 96.

Example of Method of Correcting Color Conversion Table of Input Profile

As a specific example of the third color conversion table creation unit 102, a description will be made of an example of correcting the color conversion table of the input profile. In the present example, a CMYK→Lab conversion table is used as the color conversion table of the input profile.

In a case where a value (difference) obtained by subtracting a printing chromaticity value from a target chromaticity value is set as a difference chromaticity value (difference chromaticity value=target chromaticity value−printing chromaticity value), a value of a chromaticity value (a value of an output side of the color conversion table) is corrected by adding the difference chromaticity value to a grid point of the color conversion table of the input profile. Regarding a correction method, there is no limitation to a method of correcting a value of a chromaticity value by adding a difference chromaticity value without being changed as described above, and a value of a chromaticity value (a value of an output side of the color conversion table) may be corrected by adding "A×difference chromaticity value" (where A is a coefficient indicating a correction intensity). Here, a range of the correction intensity coefficient A is, for example, $0 < A \leq 2$. In a case of $A=1$, this is the same as a case where a difference chromaticity value is added without being changed such that correction is performed. In order to prevent swinging in a case where feedback adjustment is repeatedly performed, the correction intensity coefficient A is preferably set to a value which is slightly smaller than 1, for example, "0.75". The correction intensity coefficient A may be a predefined fixed value, and may be changed by a user as appropriate.

A correction object grid point is the same as in the example described in [Example 1](FIGS. 11 and 12).

A description will be made of an example of a color conversion table for CM two colors. FIG. 15 is correspondence data indicating a correspondence relationship between an original document image signal (CM) and a chromaticity value (Lab). FIG. 15 illustrates correspondence data of an original document image signal (CM), a target chromaticity value (target Lab), a printing chromaticity value (printing Lab), and a difference chromaticity value (difference Lab). FIG. 15 is obtained by adding "printing Lab" and "difference Lab" to the correspondence data described in FIG. 11.

The difference chromaticity value (difference Lab) illustrated in FIG. 15 is added to a chromaticity value (an Lab value for a grid point) of the color conversion table of the original input profile, and thus the chromaticity value is corrected.

In other words, the difference Lab=(+1,−1,0) is added to the original Lab value correlated with the grid point P1 in FIG. 12, and thus the Lab value is corrected.

In the same manner for the grid points $P_{21}$, $P_{22}$, $P_{23}$, and $P_{24}$, the difference Lab=(+1,−4,−2) is added to each original Lab value, and thus the Lab value is corrected.

In the same manner for the grid points $P_{31}$, $P_{32}$, and $P_{34}$, the difference Lab=(0,−3,+3) is added to each original Lab value, and thus the Lab value is corrected.

In the same manner for the grid points $P_{42}$, $P_{43}$, and $P_{44}$, the difference Lab=(−1,+3,−5) is added to each original Lab value, and thus the Lab value is corrected.

With respect to the overlapping grid point $P_{33}=P_{41}$ for ID=3 and ID=4, an average value of the difference Lab of ID=3 and the difference Lab of ID=4 is obtained, the average value is added to the original Lab value, and thus the Lab value is corrected. In a case of FIG. 15, an average value of the difference Lab of ID=3 and the difference Lab of ID=4 is (−0.5,0,−1), and the average value is added to the Lab value for the grid point $P_{33}=P_{41}$, and thus the Lab value is corrected.

With respect to the grid points $P_{51}$ and $P_{52}$, the difference Lab=(−1,0,−2) is added to each original Lab value, and thus the Lab value is corrected.

In the above specific example, a description has been made of an example in which the difference Lab is added without being changed, and the Lab value is corrected, but, as described above, "A×difference Lab" may be added such that correction is performed, by using the correction intensity coefficient A. In this case, with respect to the overlapping grid point, an average value of "A×difference Lab" is added such that correction is performed.

In a case where a chromaticity value for a grid point of the color conversion table is corrected according to the method, it is expected that continuity (smoothness of a change) of the color conversion table deteriorates. Thus, preferably, a smoothing process is further performed on the corrected color conversion table. Both of adjustment of difference Lab using the correction intensity coefficient A as an adjustment amount and the smoothing process may be performed.

Example of Method of Creating Color Correction Table

The same effect can also be achieved in the form of a color correction table instead of the configuration in which a difference between a target chromaticity value and a printing chromaticity value is reflected in the color conversion table of the input profile as described above.

Figure 16:
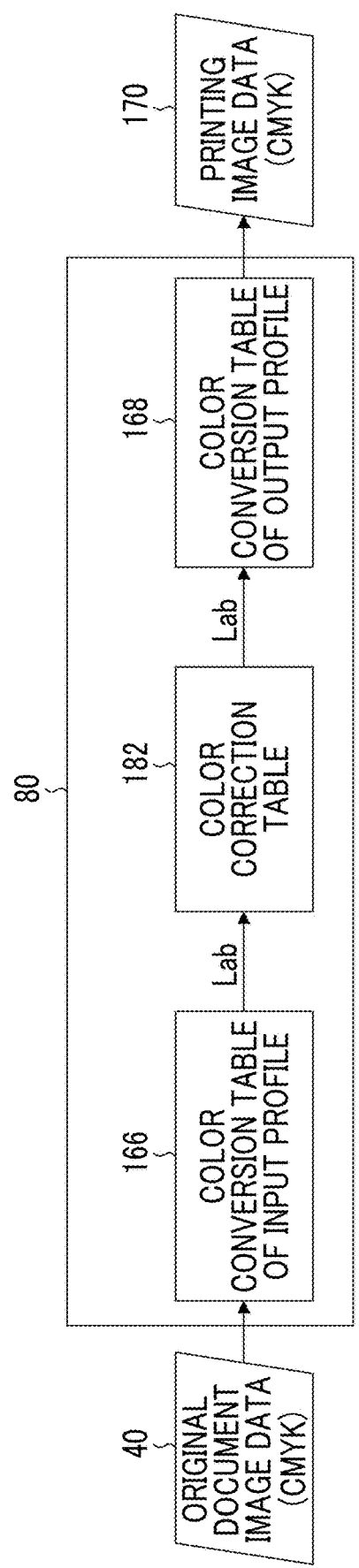
FIG. 16 is a conceptual diagram in a case where a color correction table is used.

FIG. 16 is a conceptual diagram in a case where a color correction table is used. A color correction table 182 is a table for correcting a chromaticity value between the color conversion table 166 of the input profile and the color conversion table 168 of the output profile in the second color conversion unit 80. The color correction table 182 is a color conversion table of the color correction profile 96 described in FIG. 2. Here, an Lab→Lab conversion table for converting an input Lab value into an output Lab value is exemplified as the color correction table 182. In other words, the color correction table 182 is used to correct an output value of the color conversion table 166 (input color conversion table) of the input profile.

The color correction table 182 may be created as follows on the basis of the correspondence data described in FIG. 15.

In a case where a target Lab value which is an input side Lab value in the color correction table 182 corresponds to a grid point, an Lab value (output side Lab value) for the grid point corresponding to the target Lab value is set to [target Lab+(target Lab−printing Lab)].

In a case where a target Lab value does not correspond to a grid point, an Lab value (output side Lab value) for grid points surrounding the target Lab value is set to a value of [target Lab+(target Lab−printing Lab)].

With respect to a grid point which is not a color correction object, a value of the table is set such that an input Lab value is the same as an output Lab value.

In the exemplified method of creating the color correction table 182, in a case where a correction intensity coefficient is indicated by A, and a target Lab value which is an input side Lab value in the color correction table 182 corresponds to a grid point, an Lab value (output side Lab value) for the grid point corresponding to the target Lab value may be set to [target Lab+A×(target Lab−printing Lab)]. In a case where a target Lab value does not correspond to a grid point, an Lab value (output side Lab value) for grid points surrounding the target Lab value may be set to a value of [target Lab+A×(target Lab−printing Lab)]. As described above, a range of the correction intensity coefficient A is, for example, 0<A≤2. Preferably, the correction intensity coefficient A is set to a value which is slightly smaller than 1. The correction intensity coefficient A may be a predefined fixed value, and may be changed by a user as appropriate.

In FIG. 16, a description has been made of a case where CMYK→Lab conversion using the color conversion table 166 of the input profile, Lab→Lab conversion using the color correction table 182, and Lab→CMYK conversion using the color conversion table 168 of the output profile are performed stepwise, but, in an actual calculation process, the three color conversion tables (166, 182, and 168) may be integrated into a single color conversion table for CMYK→CMYK conversion. Color conversion can be performed through a single process by using the integrated multi-dimensional (CMYK→CMYK) color conversion table.

Example of Method of Correcting Color Conversion Table of Output Profile

As another method, correcting the color conversion table 168 of the output profile can also achieve the same effect.

In a case where the color conversion table 168 of the output profile is corrected, a CMYK value for a grid point corresponding to a target Lab value is corrected such that a chromaticity value is changed by a difference chromaticity value.

In the exemplified method of correcting the color conversion table 168 of the output profile, in a case where a correction intensity coefficient is indicated by A, a CMYK value for a grid point corresponding to a target Lab value may be corrected such that a chromaticity value is changed by A×difference chromaticity value. As described above, a range of the correction intensity coefficient A is, for example, 0<A≤2. Preferably, the correction intensity coefficient A is set to a value which is slightly smaller than 1. The correction intensity coefficient A may be a predefined fixed value, and may be changed by a user as appropriate.

As described above, the third color conversion table creation unit 102 in the second principal configuration (refer to FIG. 5) corrects the input color conversion table or the output color conversion table, or creates a color correction table, on the basis of a difference between a target chromaticity value and a printing chromaticity value.

In the second principal configuration, color conversion is performed on the original document image data 40 again by using the input color conversion table or the output color conversion table after being corrected, or the color correction table, created by the third color conversion table creation unit 102, and printing is performed.

Consequently, it is expected that a color of a printed article which is printed by the printing apparatus 18 is close to a color of target printed article.

In the second principal configuration, the series of procedures "second color conversion→printing→printed article reading/chromaticity value acquisition/correlation between image and chromaticity value→color conversion table correction (color correction table creation)" are repeatedly performed, and thus it is expected that a color of a printed article is closer to a color (target color) of a target printed article.

Specific Example of Color Extraction Method after Registration

Here, a description will be made of a specific example of a color extraction method after registration between original document image data and read image data.

The image correlation unit 62 described in FIG. 2 performs registration between original document image data and read image data, and then performs a process ("color extraction process") of extracting color information from each piece of the data.

In the color extraction process after registration, a configuration may be naturally employed in which an image signal value as color information is acquired in the pixel unit at a corresponding position between original document image data and read image data, that is, pixel by pixel, but, there is no limitation to the pixel unit, and a configuration may be employed in which color information is acquired from a unit region having an area larger than an area of a pixel. The number of pixels forming a unit region for color extraction may be set to any number of 2 or more. A shape or a size of the unit region for color extraction may be variously designed.

In color extraction, there may be a configuration in which a region of interest having a unit region size is set on original document image data, and color information is extracted from a region of interest satisfying extraction conditions. Hereinafter, a specific example will be described.

Figure 17:
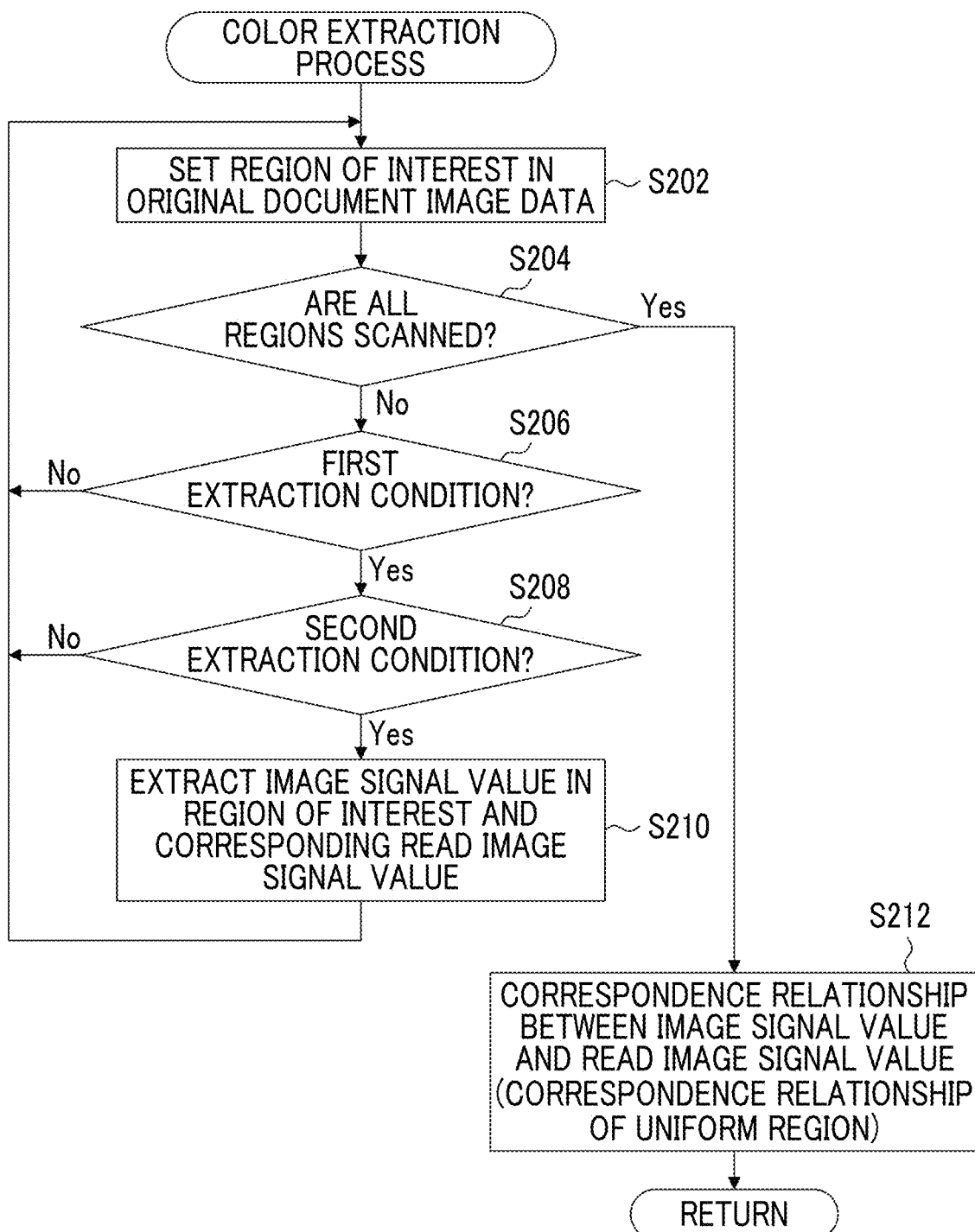
FIG. 17 is a flowchart illustrating an example of a color extraction method.

FIG. 17 is a flowchart illustrating an example of a color extraction method performed after registration between original document image data and read image data. FIG. 17 is a flowchart including steps which may be added between step S122 and step S124 in the flowchart described in FIG. 6. After step S122 in FIG. 6, the flow proceeds to step S202 in FIG. 17.

First, a process of setting a region of interest on original document image data is performed (step S202). The region of interest is an image region having a predefined size, of interest as a calculation object of a color extraction process.

The region of interest may be, for example, a square region of which one side has 1 millimeter [mm] on a printed article. A size or a shape of the region of interest may be variously set. Herein, for simplification of description, a shape of the region of interest is assumed to be a square shape.

An area of the region of interest is preferably larger than an area of a single pixel of the read image data. The area of the single pixel of the read image data is specified on the basis of a reading resolution of the image reading unit 30. In the present embodiment, since a colorimeter is not required to be used, an area of the region of interest can be made smaller than an area of an aperture of a general colorimeter. In a case where a colorimeter is also used, it is preferable that an area of the region of interest is equivalent to an area of the aperture of the colorimeter or is slightly larger than the area of the aperture.

Setting of the region of interest also includes designation of a position in an image. A position of the region of interest is sequentially moved on the original document image data, and processes (step S204 to step S210) are performed on the region of interest at each position.

In step S204, it is determined whether or not scanning based on movement of the region of interest has been completed for the entire region of the original document image data (step S204). In a case where a determination result in step S204 is No, the flow proceeds to step S206, and it is determined whether or not the region of interest satisfies a first extraction condition. The process in step S206 corresponds to a "process of determining whether or not the region of interest satisfies the first extraction condition".

The first extraction condition preferably includes a condition that a color difference in the region of interest is equal to or less than a threshold value. In a case of the present example, the first extraction condition is required to include both of two condition elements that an edge is not included in the region of interest of an image, and a color difference in the region of interest is equal to or less than the threshold value.

The condition that "an edge is not included in the region of interest" corresponds to a condition that "an edge is not present in the region of interest". The condition that "a color difference in the region of interest is equal to or less than the threshold value" corresponds to a condition that "a color difference in the region of interest is equal to or less than a first extraction threshold value defined as an allowable range".

The edge indicates a location where a gradation (brightness) or a color in an image rapidly changes. Generally, a contour or a line in an image, or a boundary portion of different colors corresponds to an edge since a gradation (brightness) or a color rapidly changes therein.

The first extraction condition corresponds to a definition of a "uniform region". In other words, the first extraction condition is a condition for extracting a "uniform region" in which an edge is not included in the region of interest of an image, and a color difference in the region of interest is equal to or less than the threshold value. The "uniform region" indicates a region in which a color is uniform. The term "uniform" is not limited to a case where a color is strictly constant, and is used as a meaning including an allowable variation or error.

The first extraction threshold value defined as an allowable range for a color difference in the region of interest may be set to, for example, a value of a ΔCMYK value as an allowable range of a variation in a CMYK value. The symbol "Δ (delta)" indicates a difference in a color value. Regarding the first extraction threshold value, each of a ΔC value, a ΔM value, a ΔY value, and a ΔK value may be set as an allowable range of a variation for each color of C, M, Y, and K.

In a case where the region of interest satisfies the first extraction condition, a determination result in step S206 is Yes, and the flow proceeds to step S208.

In step S208, it is determined whether or not the region of interest satisfies a second extraction condition.

The second extraction condition is required to satisfy both of two condition elements that read image data is present in a region of interest in read image data at a position corresponding to the region of interest satisfying the first extraction condition, and there is no image defect of a read image in the region of interest in the read image data at the corresponding position.

The image defect corresponds to, for example, a flaw of reading an object printed article or dust attached at the time of reading. "There being no image defect" corresponds to the content that "an image defect is not present". As a specific example, "there being no flaw and dust" corresponds to the content that "a flaw and dust are not present". The presence of a flaw or dust which is an image defect of a read image may be determined on the basis of whether or not a variance value of luminance in the read image data is equal to or less than a threshold value. In other words, in a case where a flaw or dust is present in the region of interest, a variance value of luminance increases due to the influence thereof. A second extraction threshold value is set as an allowable range for a variance value of luminance, and, in a case where a variance value of luminance is equal to or smaller than the second extraction threshold value, it is determined that the region of interest is a "uniform region" in which there is no influence of a flaw or dust. On the other hand, in a case where a variance value of luminance is greater than the second extraction threshold value, the presence of a flaw or dust is in doubt, and thus the region of interest is not a "uniform region" and is thus excluded from an extraction process.

In the present example, a region of interest which satisfies the first extraction condition and also satisfies the second extraction condition is extracted as a "uniform region".

In a case where a determination result in step S208 is Yes, the flow proceeds to step S210. In step S210, a process of extracting an image signal value in the region of interest determined as being a "uniform region" and a read image signal value corresponding thereto is performed. In other words, a uniform color is extracted in the size of the region of interest.

After step S210, the flow returns to step S202, a position of the region of interest is moved, and the processes in steps S202 to S210 are repeatedly performed. In a case where a determination result in step S206 is No or a determination result in step S208 is No, the flow returns to step S202 in either case.

In a case where a position of the region of interest is changed, and scanning of the entire region in the image is completed, a determination result in step S204 is Yes, and the flow proceeds to step S212.

In step S212, data indicating a correspondence relationship between the image signal value and the read image signal value extracted in step S210 is generated. In a case where the image signal value of an original document is a CMYK value, and the read image signal value is an RGB value, in step S212, a correspondence relationship of color information of CMYK-RGB is obtained with respect to the uniform region satisfying the first extraction condition and the second extraction condition. The process in step S212 corresponds to a "correspondence relationship color information extraction process".

After step S212, the flow comes out of the flowchart in FIG. 17, and proceeds to step S124 described in FIG. 6.

There may be an aspect in which the determination process for the second extraction condition described in step S208 in FIG. 17 is omitted. In a case where the first extraction condition is satisfied in step S206 without taking into consideration the influence of a flaw or dust (a determination result in step S206 is Yes), there may be an aspect in which a flow proceeds to step S210.

[Setting of Region of Interest]

Regarding setting of a region of interest, a plurality of types of regions of interest having different sizes may be set. Two or more sizes having different areas may be set as predefined sizes of regions of interest, regions of interest may be set stepwise in an area order (size order) such that each uniform region can be extracted from an image in the area order.

For example, three types of area sizes such as small, medium, and large may be prepared as an area size of a region of interest, the flowchart in FIG. 17 may be executed in order in each of a first size of a small area, a second size of a medium area, and a third size of a large area, and a color information extraction process may be performed in a region of interest with each size.

In a case where a size of a region of interest is large, a color taking up a relatively large area in an image is extracted. On the other hand, in a case where a size of a region of interest is small, a color taking up a relatively small area in an image is extracted. Since, as a color takes up a larger area in an image, it may be regarded that the importance of the color becomes higher, a "weight" indicating the importance of a color may be set according to a size of a region of interest. In a case where color extraction is performed in an area order of a region of interest, a weighting process on an extracted color becomes simple. The "weight" mentioned here is a value indicating the priority (importance) of color matching in creating a profile as a color conversion table. In creating a profile, the profile is created such that a color having a large weight is prioritized, and estimation accuracy of the color is increased.

In setting a region of interest, in a case where the accuracy of registration between the original document image data and the read image data is low, a region of interest is preferably set to a large area. For example, in a case where registration accuracy is low, a region of interest is set to a square shape of which one side has 4 millimeters [mm], and only a uniform region is extracted in a relatively large region of interest.

As means for determining registration accuracy, a configuration may be employed in which an original document image and a read image as a result of a registration process are displayed to overlap each other on a screen of the display unit 34 (refer to FIG. 1).

As an overlapping display method, one of the original document image or the read image may be used as a transparent image, so as to be displayed to overlap the other image. Through the overlapping display, a user can visually check the accuracy of registration between the original document image and the read image. In a case where registration accuracy is low, a user's selection of setting an area of a region of interest to a great value is possible.

[Application of Color Extraction Process]

The color extraction method described in FIG. 17 may be applied as a color extraction method in the image correlation unit 62 of the configuration described in FIG. 3. The color extraction method described in FIG. 17 may be added between step S132 and step S134 in the flowchart described in FIG. 6. After step S132 in FIG. 6, the flow may proceed to step S202 in FIG. 17.

The color extraction method described in FIG. 17 may also be applied as a color extraction processing method in the image correlation unit 62 of the configuration described in FIG. 4. In other words, as described in FIG. 4, the color extraction method described in FIG. 17 may be applied to the color extraction method after registration between the original document image data and the read chromaticity value image data is performed by using the read chromaticity value image data which is converted to have a chromaticity value by the first color conversion unit 64 performing a color conversion process on the read image data. In this case, for better understanding, the read image data may be replaced with "read chromaticity value image data", and an RGB signal value may be replaced with a "chromaticity value" (Lab value).

<Outline of Process of Creating Printer Profile>

The printing system 10 according to the present embodiment may create a profile of the printing apparatus 18, that is, a printer profile by using the structure of creating the second color conversion table 92A described with reference to FIGS. 3 and 4.

As described with reference to FIGS. 3 and 4, in creating a target profile, the printing system 10 creates the target profile with image data (original document image data) of a general image which is an original document image and a target printed article as inputs.

A method of creating a printer profile by using the structure of creating a target profile largely includes two methods such as a method using a color chart and a method using a general image.

Example of Using Color Chart

First, with respect to the method using a color chart, a detailed example thereof will be described below. As one of methods of creating a printer profile by using the structure of creating a target profile in the printing system 10, there may be a method in which image data of a color chart is used as original document image data, the image data of the color chart is given to the printing apparatus 18 such that the color chart is printed by the printing apparatus 18, and an obtained color chart printed article is read by the image reading unit 30 such that a printer profile is created. The color chart corresponds to an example of a "first image".

The printer profile created in the above-described way is used as a destination profile (output profile), and thus color matching accuracy can be improved.

The type of color conversion table creation apparatus having the configuration described in FIG. 3 will be referred to as a "first type", and the type of color conversion table creation apparatus having the configuration described in FIG. 4 will be referred to as a "second type".

[First Aspect Regarding Creation of Printer Profile]

Figure 18:
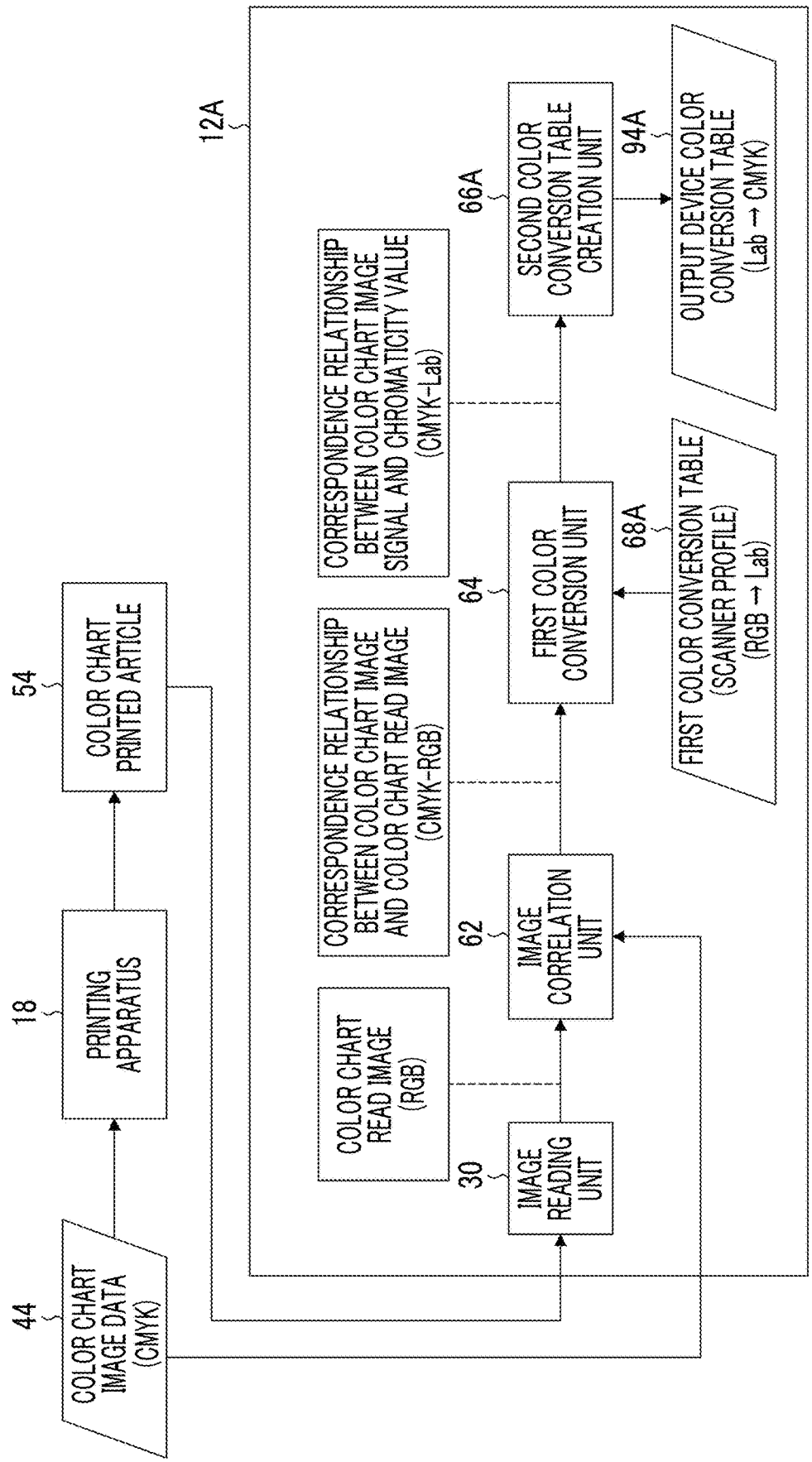
FIG. 18 is a block diagram illustrating a flow of a process of creating a printer profile of a printing apparatus by using the first type of color conversion table creation apparatus.

FIG. 18 is a block diagram illustrating a flow of a process of the first type of color conversion table creation apparatus 12A creating a printer profile of the printing apparatus 18. In FIG. 18, a constituent element identical or similar to the constituent element described in FIGS. 1 to 3 is given the same reference numeral, and a description thereof will be omitted. The image editing apparatus 12 described in FIGS. 1 to 3 functions as the color conversion table creation apparatus 12A illustrated in FIG. 18.

In the example illustrated in FIG. 18, color chart image data 44 is described as image data of CMYK, but a color space of the color chart image data 44 is not limited to this example in implementation of the invention. The color chart image data 44 may be RGB image data, may be CMY image data, and may be image data in which a CMYK signal is combined with a special color signal. The color chart image data 44 corresponds to an example of "first image data".

Figure 19:
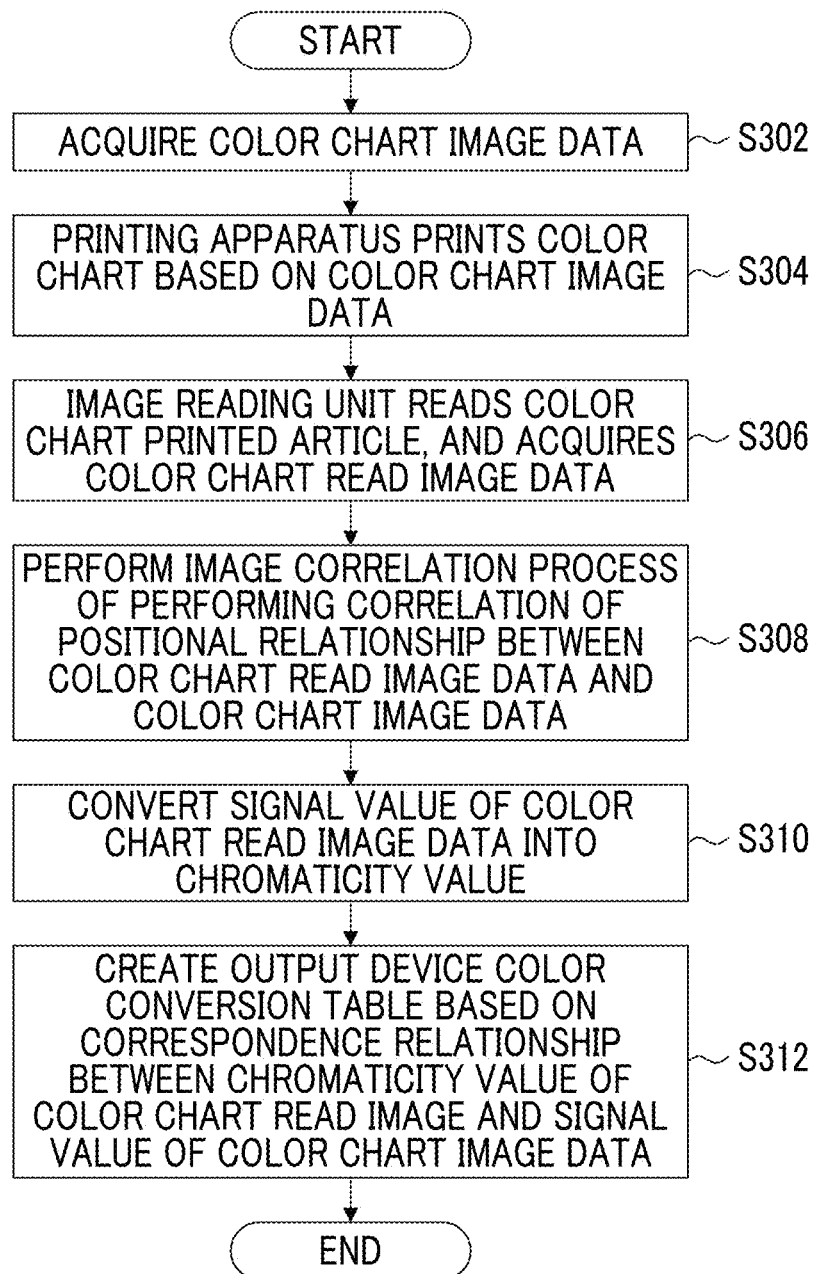
FIG. 19 is a flowchart illustrating an operation of a configuration illustrated in FIG. 18.

FIG. 19 is a flowchart illustrating an operation of the configuration illustrated in FIG. 18. With reference to FIG. 19, a description will be made of procedures of a printer profile creation process performed by the color conversion table creation apparatus 12A illustrated in FIG. 18. The color conversion table creation method according to the embodiment is performed by the color conversion table creation apparatus 12A.

In step S302 in FIG. 19, the color conversion table creation apparatus 12A acquires the color chart image data 44. The color chart image data 44 is image data of a color chart including color patches of a plurality of respective colors. The color chart image data 44 may be held in advance in a storage unit (not illustrated) built into the image editing apparatus 12 (refer to FIG. 1) which functions as the color conversion table creation apparatus 12A, and may be incorporated from the outside of the image editing apparatus 12 via a communication interface or a medium interface of the image editing apparatus 12. The color chart image data 44 may be held in advance in a storage unit (not illustrated) built into the printing control device 14 of the printing apparatus 18.

The color chart image data 44 is provided to the printing apparatus 18. The color chart image data 44 is sent to the image correlation unit 62.

In step S304 in FIG. 19, the printing apparatus 18 prints the color chart on the basis of the color chart image data 44. A color chart printed article 54 is obtained according to execution of step S304. The color chart printed article 54 corresponds to an example of a "first printed article".

In step S306, the color conversion table creation apparatus 12A reads the color chart printed article 54 by using the image reading unit 30, and acquires color chart read image data which is a read image of the color chart printed article 54. In the present example, an RGB image is assumed to be obtained as the color chart read image data.

Next, in step S308, the image correlation unit 62 performs a process of performing correlation of a positional relationship between the color chart read image data and the color chart image data 44. In the image correlation unit 62, a correspondence relationship between pixel positions of the color chart image and the color chart read image is specified, and data ("correspondence relationship data between the color chart image and the color chart read image") indicating a correspondence relationship between a signal value (CMYK value) of the color chart image data and a signal value (RGB value) of the color chart read image data is obtained. The process in step S308 corresponds to an example of a "second image correlation process". The color chart read image corresponds to an example of a "first printed article read image", and the color chart read image data corresponds to an example of "first printed article read image data".

In step S310, the first color conversion unit 64 performs a process of converting an RGB value of the color chart read image data into an Lab value by using the first color conversion table 68A (an example of a "first color conversion step").

Correspondence relationship data between a color chart image signal and a chromaticity value is obtained through the process in the image correlation unit 62 and the process in the first color conversion unit 64. The color chart image signal indicates a signal value of the color chart image data. In other words, data indicating a correspondence relationship between a signal value of the color chart image data and a chromaticity value of the color chart read image is obtained through the processes in step S308 and step S310 in FIG. 19. The data indicating the correspondence relationship can be understood to be data indicating a correspondence relationship between a chromaticity value of the color chart read image and a signal value of the color chart image data.

In step S312, the second color conversion table creation unit 66A creates an output device color conversion table 94A on the basis of the correspondence relationship data between the color chart image signal and the chromaticity value. The second color conversion table creation unit 66A may create a color conversion table defining an Lab→CMYK conversion relationship conforming to the form of an ICC profile by performing interpolation and/or extrapolation on the basis of the correspondence relationship data between the color chart image signal and the chromaticity value. The output device color conversion table 94A is a color conversion table representing a multi-dimensional correspondence relationship of Lab-CMYK indicating color characteristics of the printing apparatus 18.

As a color conversion table which is used as an output profile and defines an Lab→CMYK conversion relationship, a table is used in which values (Lab) on a device-independent color space side correspond to grid points at an equal pitch based on a predetermined pitch width.

An algorithm for creating a color conversion table defining an Lab→CMYK conversion relationship conforming to the form of an ICC profile by using a color chart is the same as an algorithm for creating a color conversion table defining a CMYK→Lab conversion relationship by using a general image, and, as described in FIGS. 11 and 12, a corresponding process of equalizing intervals of grid points is performed, and then an inverse conversion table for Lab→CMYK is created by using a method such as a Newton method.

As the color chart image signal, for example, a signal may be used in which CMYK values which are values of a device-dependent color space are disposed at an equal pitch based on a predetermined pitch width. A correspondence relationship between the color chart image signal including color patches of colors at such an equal interval and a chromaticity value read from the color chart printed article indicates a relationship of CMYK (equal pitch)-Lab values. A calculation process of creating a table for "Lab (equal pitch)-CMYK" on the basis of the correspondence relationship of "CMYK (equal pitch)-Lab" may employ a well-known method such as a Newton method.

A color chart is not necessarily limited to representing a color patch group of colors at an equal interval, indicating regular color changes due to values at an equal pitch, and may represent a color patch group of colors at a non-equal interval. For example, the color chart may lack some of the colors at an equal interval. A color chart including a color patch of a color which is not present on a grid point in a CMYK color space may be used. For example, a color chart including many color patches of colors which are present on grid points in the CMYK color space and on which importance is placed in printing may be used.

The term "output device color conversion table" is not limited to a color conversion table with a table form which can be used as an output profile without being changed, and is used the term of the concept including a table defining therein a correspondence relationship between a color coordinate of a device-dependent color space and a color coordinate of a device-independent color space before being rewritten to a table form of an output profile. The output device color conversion table is not limited to a table covering the entire gamut of a color space, and may be a table defining a correspondence relationship of a partial color gamut in the color space.

In other words, in step S312, the created output device color conversion table 94A is not limited to a table for "Lab (equal pitch)-CMYK", and may be a table for "CMYK (equal pitch)-Lab".

[Second Aspect Regarding Creation of Printer Profile]

Figure 20:
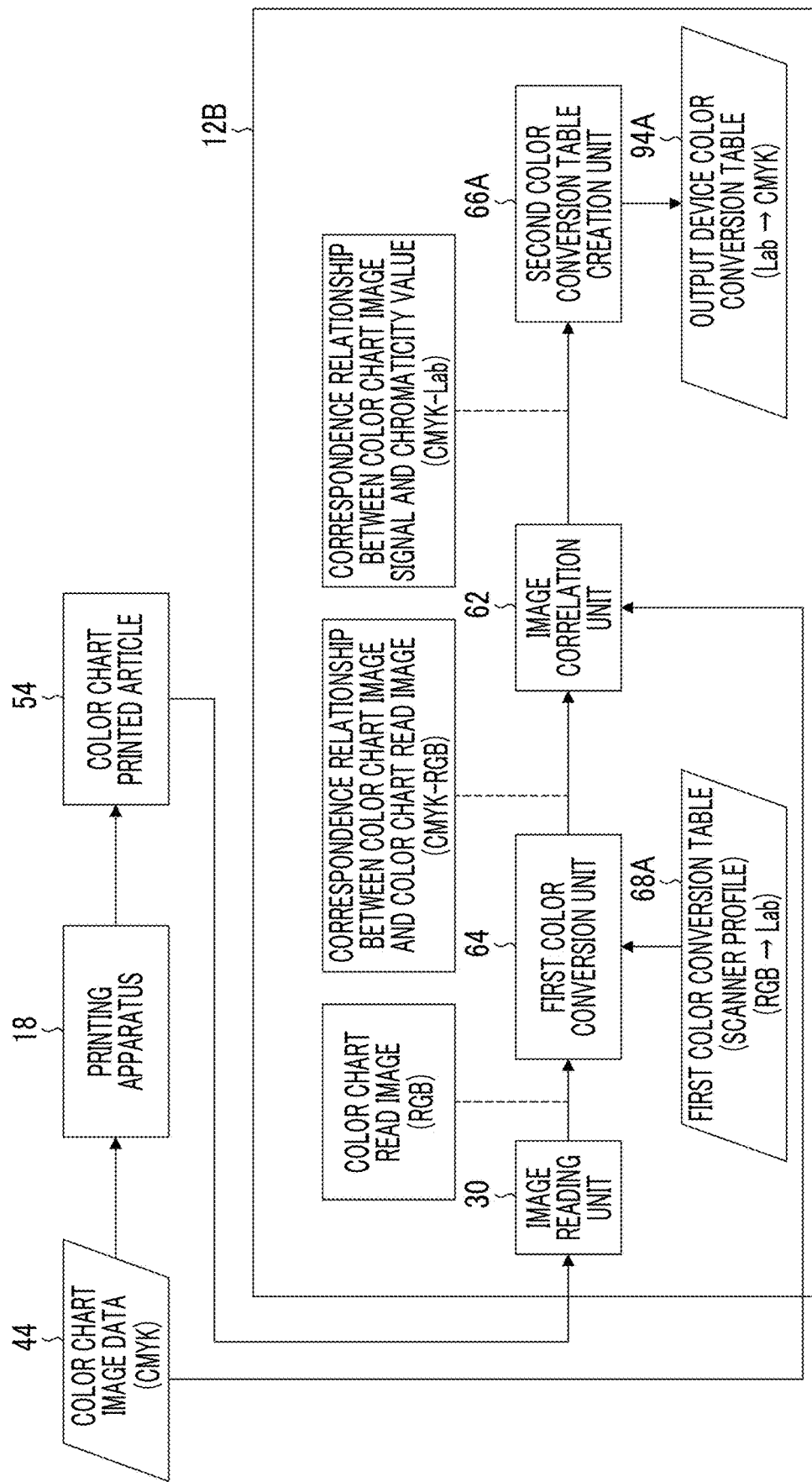
FIG. 20 is a block diagram illustrating a flow of a process of creating a printer profile of a printing apparatus by using the second type of color conversion table creation apparatus.

FIG. 20 is a block diagram illustrating a flow of a process of creating a printer profile of the printing apparatus 18 a color conversion table creation apparatus 12B belonging to the second type. In FIG. 20, a constituent element identical or similar to the constituent element described in FIGS. 1 to 4, and FIG. 18 is given the same reference numeral, and a description thereof will be omitted. The image editing apparatus 12 described in FIGS. 1 to 4 functions as the color conversion table creation apparatus 12B illustrated in FIG. 20. The configuration illustrated in FIG. 20 is in an aspect using the configuration described in FIG. 4.

In the example illustrated in FIG. 20, the first color conversion unit 64 performs an RGB→Lab conversion process ("first color conversion process step") on color chart read image data of RGB acquired from the image reading unit 30, and then performs an image correlation process between an Lab image (color chart read chromaticity value image) of the obtained color chart read image and the color chart image data 44. In a case of employing the configuration illustrated in FIG. 20, the same effect as in the configuration illustrated in FIG. 18 can also be achieved.

As illustrated in FIG. 20, data after conversion obtained by the first color conversion unit 64 performing the color conversion process on the color chart read image data obtained from the image reading unit 30 will be referred to as "color chart read chromaticity value image data". The color chart read chromaticity value image data corresponds to an example of "first printed article read chromaticity value image data".

Figure 21:
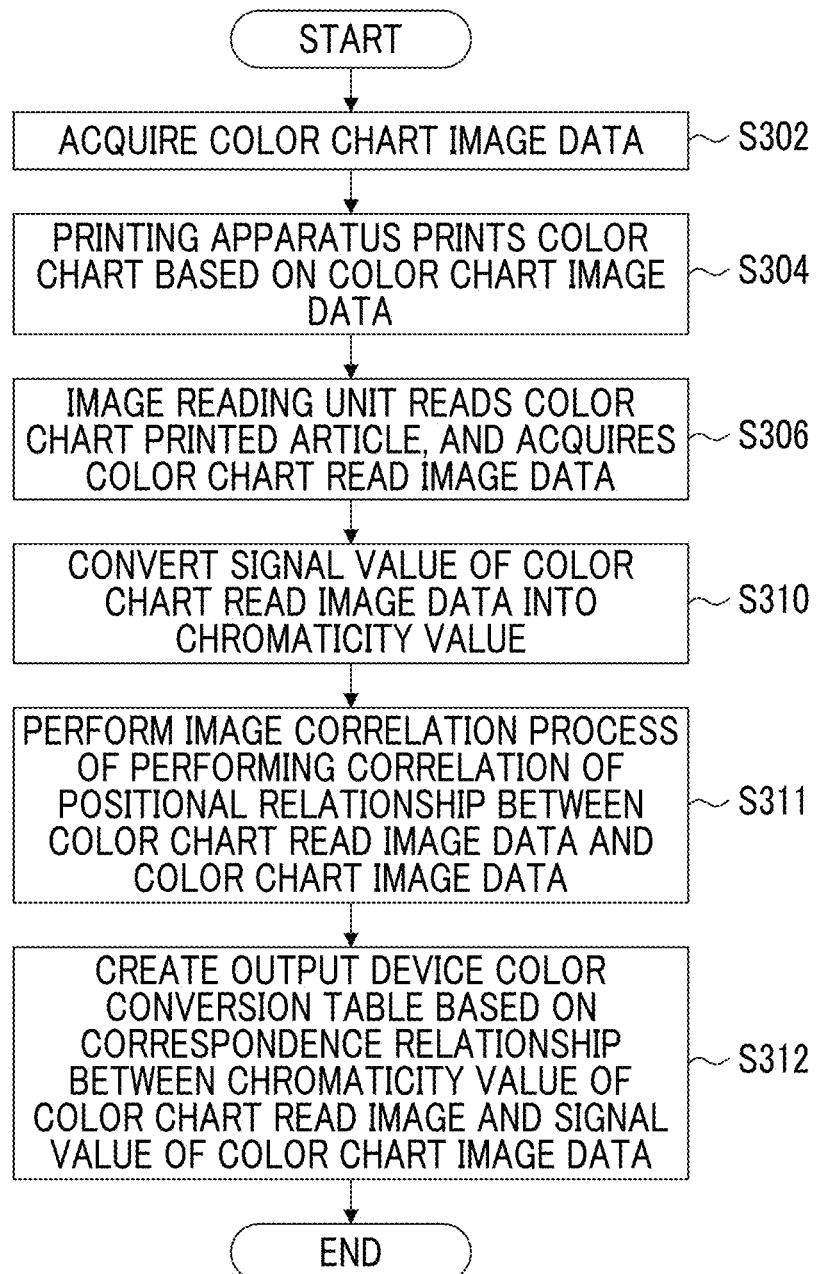
FIG. 21 is a flowchart illustrating an operation of a configuration illustrated in FIG. 20.

FIG. 21 is a flowchart illustrating an operation of the configuration illustrated in FIG. 20. In FIG. 21, the same step numbers are given to steps identical or similar to the steps described in the flowchart of FIG. 19. With reference to FIG. 21, a description will be made of procedures of a printer profile creation process performed by the second type of color conversion table creation apparatus 12B illustrated in FIG. 20.

In step S302 in FIG. 21, the color conversion table creation apparatus 12B acquires the color chart image data 44. The color chart image data 44 is image data of a color chart including color patches of a plurality of respective colors. The color chart image data 44 may be held in advance in a storage unit (not illustrated) built into the image editing apparatus 12 (refer to FIG. 1) which functions as the color conversion table creation apparatus 12B, and may be incorporated from the outside of the image editing apparatus 12 via a communication interface or a medium interface of the image editing apparatus 12. The color chart image data 44 may be held in advance in a storage unit (not illustrated) built into the printing control device 14 of the printing apparatus 18.

The color chart image data 44 is provided to the printing apparatus 18. The color chart image data 44 is sent to the image correlation unit 62.

In step S304, the printing apparatus 18 prints the color chart on the basis of the color chart image data 44. A color chart printed article 54 is obtained according to execution of step S304.

In step S306, the color conversion table creation apparatus 12B reads the color chart printed article 54 by using the image reading unit 30, and acquires color chart read image data which is a read image of the color chart printed article 54. In the present example, an RGB image is assumed to be obtained as the color chart read image data.

In step S310, the first color conversion unit 64 performs a process of converting an RGB value of the color chart read image data into an Lab value by using the first color conversion table 68A (an example of a "first color conversion step").

Step S310 in FIG. 21 is executed, and thus color chart read chromaticity value image data is obtained. The color chart read chromaticity value image data corresponds to an example of "first printed article read luminance value image data".

In step S310, the image correlation unit 62 performs an image correlation process for correlation of a positional relationship between the color chart read chromaticity value image data and the color chart image data 44. In the image correlation unit 62, a correspondence relationship between pixel positions of the color chart image and the color chart read chromaticity value image is specified, and data indicating a correspondence relationship between a signal value (CMYK value) of the color chart image data and a chromaticity value of the color chart read image data, that is, correspondence relationship data between the color chart image signal and the chromaticity value is obtained. The process in step S310 corresponds to an example of a "fourth image correlation process".

In step S312, the second color conversion table creation unit 66A creates the output device color conversion table 94A on the basis of the correspondence relationship data between the color chart image signal and the chromaticity value. The second color conversion table creation unit 66A may create a color conversion table defining an Lab→CMYK conversion relationship by performing interpolation and/or extrapolation on the basis of the correspondence relationship data between the color chart image signal and the chromaticity value.

Specific Example 1 of Color Chart

Figure 22:
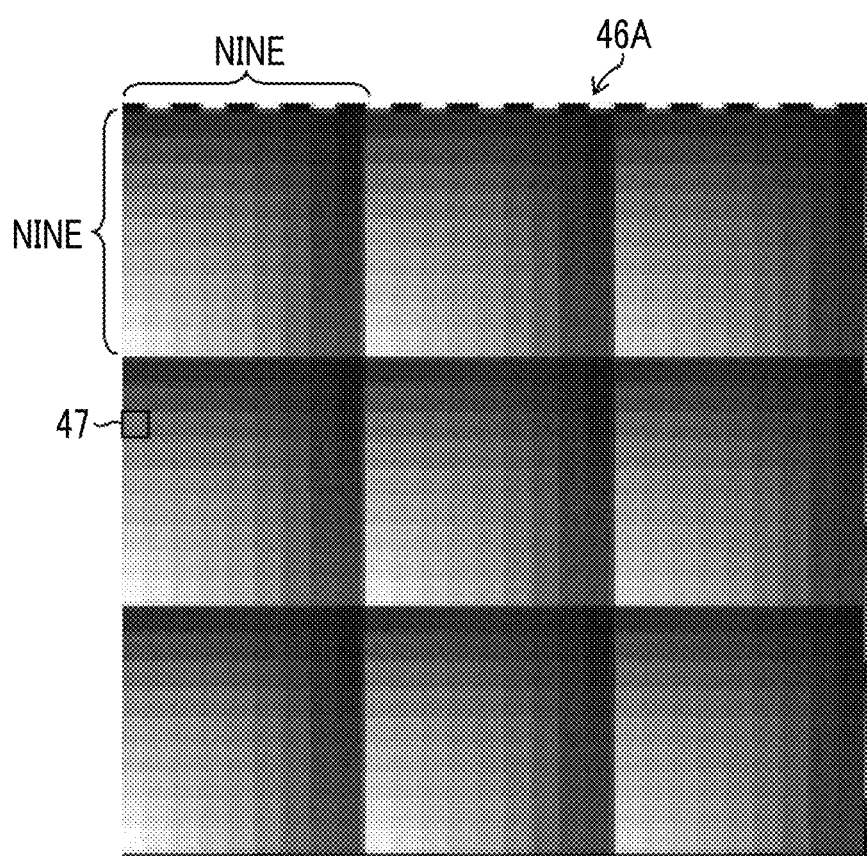
FIG. 22 is a diagram illustrating an example of a color chart.

FIG. 22 is a diagram illustrating an example of a color chart. Herein, for simplification of description, an RGB 8-bit system will be described as an example. This is also the same for specific examples illustrated in FIGS. 22 and 23. The RGB 8-bit system indicates a system handling 8-bit image data of each color of RGB. As a color chart applied to the RGB 8-bit system, for example, a color chart 46 including 9×9×9 color patches as illustrated in FIG. 21 may be used. The color chart 46 of 9×9×9 is configured to include color patches 47 of 9×9×9 colors formed of combinations of colors in which a signal value of each color component of RGB is changed in nine steps at the pitch of "32" such as 0, 32, 64, 96, . . . , and 255.

In a method of the related art in which color measurement is performed by using a colorimeter such as a spectral colorimeter a format of a color chart is restricted to a format in which measurement can be performed by using the colorimeter. For example, in terms of the size, each color patch is required to have an area larger than an area of an aperture of the colorimeter. A size of a circular aperture of a general colorimeter is about 6 millimeters in diameter.

In relation to this fact, in the present embodiment, since the color chart printed article 54 is read by using the image reading unit 30 such as a scanner instead of a colorimeter, a format of a color chart may include a color patch less than an aperture size of a colorimeter without being restricted by the aperture size of the colorimeter.

In other words, a single partition of the color patches 47 in the color chart 46 illustrated in FIG. 22 may have an area larger than an area of a single pixel of a reading pixel defined on the basis of a reading resolving power of the image reading unit 30, and may have an area smaller than an area of a square shape of which one side has 6 millimeters. A size of a partition of the color patches 47 is preferably smaller than a square shape of which one side has 3 millimeters or less, more preferably smaller than a square shape of which one side has 2 millimeters or less, and most preferably smaller than a square shape of which one side has 1 millimeter or less. As a patch size becomes smaller, a color chart can be printed with a smaller area of paper, and thus color measurement is hardly influenced by locality. A lower limit of a patch size may be set to a size of a reading pixel defined on the basis of a reading resolving power of the image reading unit 30. The reading resolving power has the same meaning as a reading resolution.

A patch size also depends on a window size defining a calculation object pixel range in a processing algorithm for processing read image data obtained from the image reading unit 30, and is set to an appropriate size. For example, a patch size is set to a size of 1 millimeter square on paper. According to the specific example 1, it is possible to print all of the 9×9×9 color patches with a paper area smaller than that of a color chart of the related art.

In FIG. 22, a color chart including the 9×9×9 color patches according to uniform division (equal interval) has been exemplified, but there is no limitation to a color chart in which the respective colors are regularly arranged, and some colors may be omitted, and color patches of colors represented by signal values at a non-equal interval may be included.

Specific Example 2 of Color Chart

Figure 23:
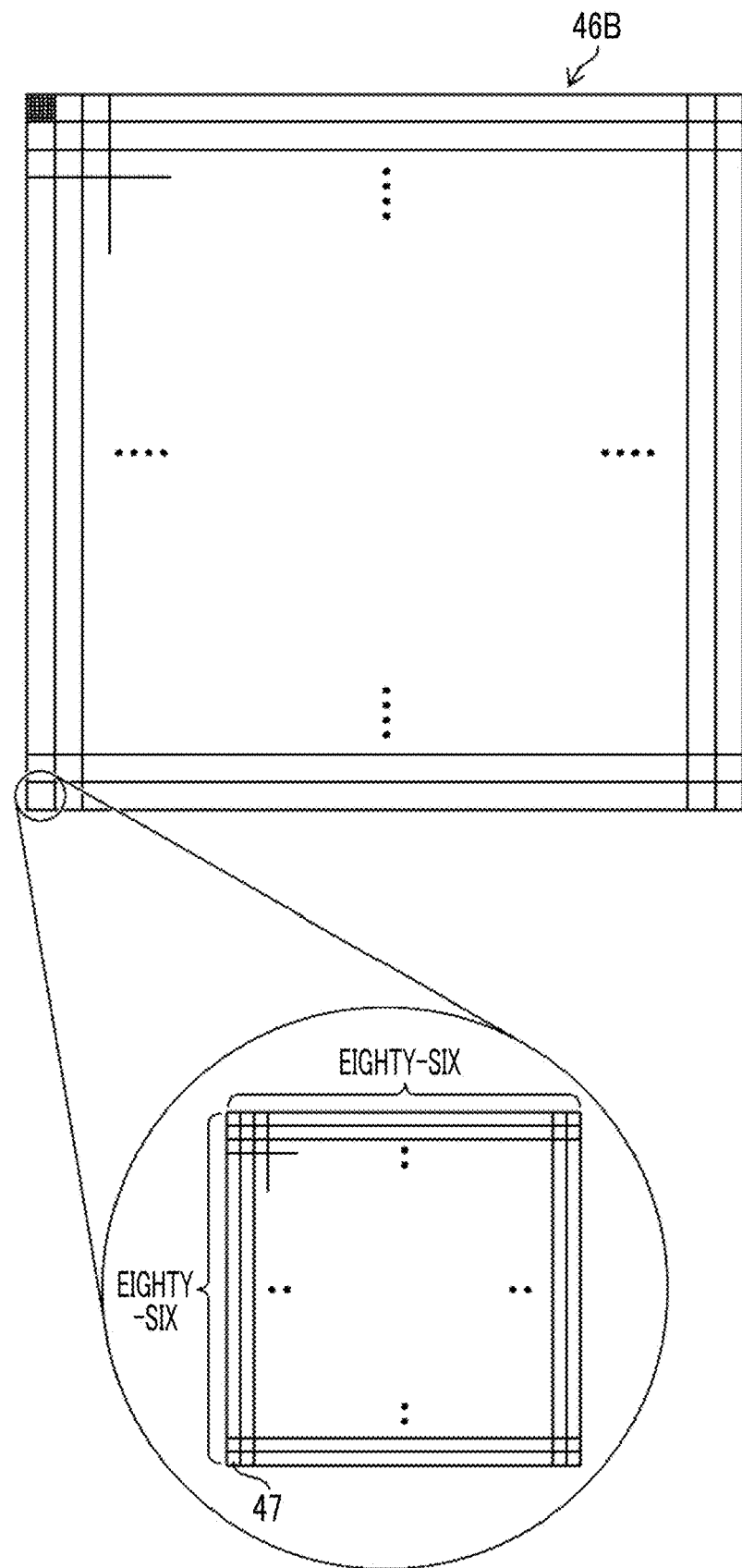
FIG. 23 is a diagram illustrating another example of a color chart.

Instead of the color chart of 9×9×9 described in FIG. 22, a color chart including color patches finer than in the color chart may be used. FIG. 23 is a diagram illustrating another example of a color chart. FIG. 23 illustrates a color chart 46B including 86×86×86 color patches 47. The color chart 46B of 86×86×86 is configured to include color patches 47 of 86×86×86 colors formed of combinations of colors in which a signal value of each color in a range of 0 to 255 is changed in 86 steps at the pitch of "3" such as 0, 3, 6, 9, . . . , and 255 such that the signal value of each color of RGB is indicated by 0, 3, 6, 9, 12, . . . , and 255.

A size of each color patch 47 may be larger than a size of a reading pixel of the image reading unit 30 and may be less than 6 millimeters in the same manner as in the specific example 1 in FIG. 22.

In a case where the color chart exemplified in FIG. 23 is used, 86×86×86 colors can be measured at one time, and fine measured data can be obtained.

In FIG. 23, a color chart including the 86×86×86 color patches according to uniform division (equal interval) has been exemplified, but there is no limitation to a color chart in which the respective colors are regularly arranged, and some colors may be omitted, and color patches of colors represented by signal values at a non-equal interval may be included.

Specific Example 3 of Color Chart

Instead of the color chart 46B of 86×86×86 described in FIG. 23, a color chart including color patches finer than in the color chart, ultimately, color patches of 256×256×256 colors at the pitch of grayscale "1" may be used. The color chart is a chart in which gradation occurs in various color directions.

Figure 24:
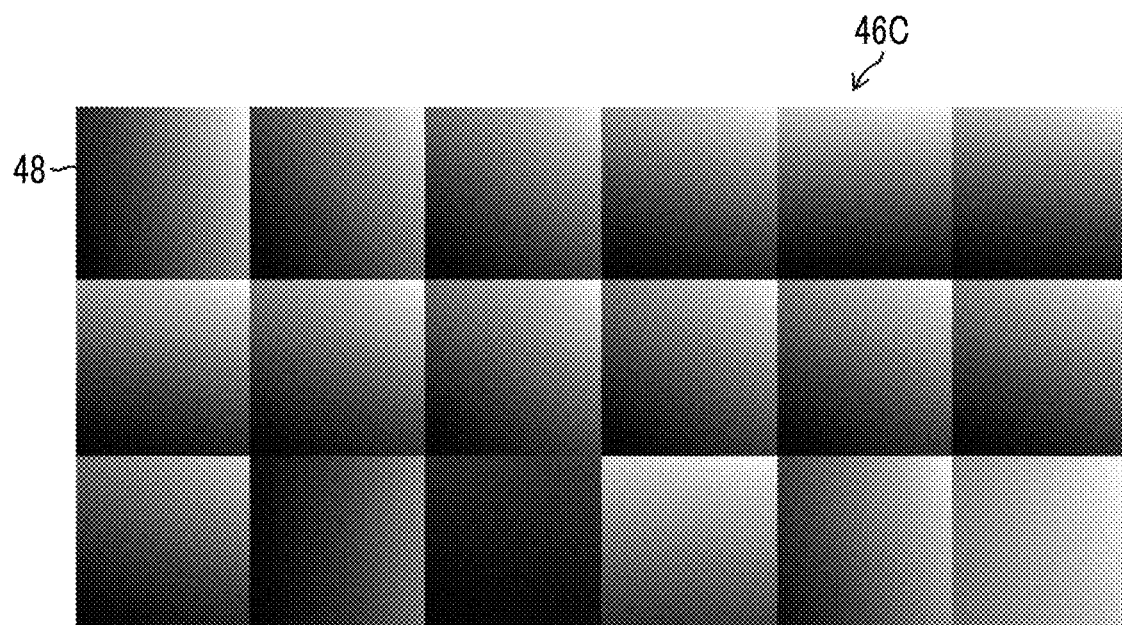
FIG. 24 is a diagram illustrating a part of a color chart which is a gradation chart.

FIG. 24 is a diagram illustrating a part of a color chart 46C which is a gradation chart. FIG. 24 illustrates an example in which 3×6 gradation tiles 48 are arranged, but 256 gradation tiles 48 are included in all colors. In FIG. 24, a single gradation tile 48 includes 256×256 color patches although not sufficiently expressed due to restriction of illustration. The gradation chart is a chart in which a grayscale is consecutively changed.

[Arrangement of Color Patches]

Figure 25:
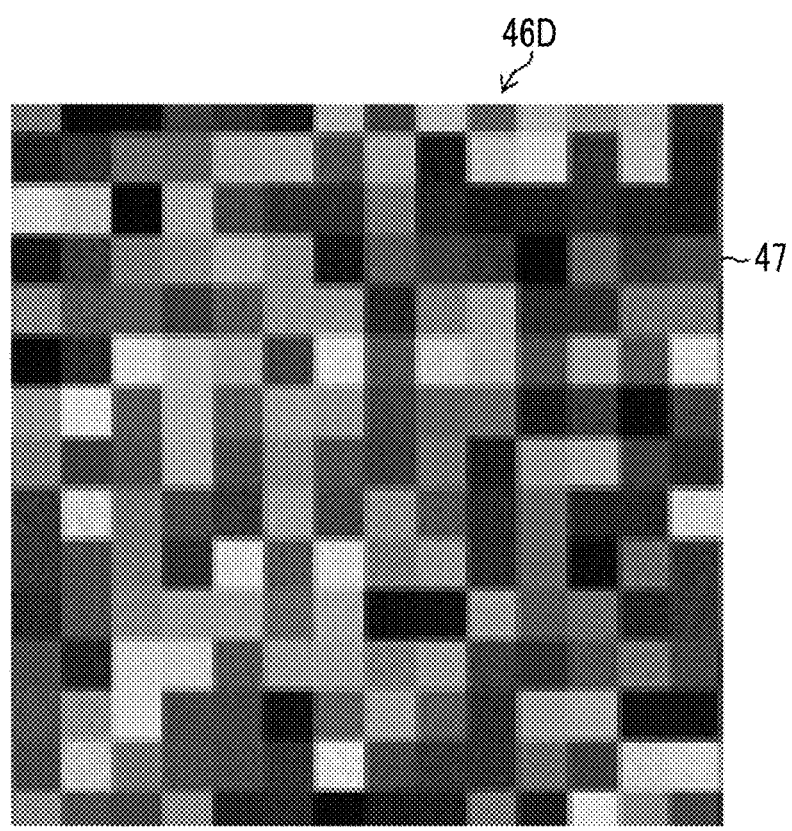
FIG. 25 is an enlarged view illustrating a part of a color chart.

In the color chart described in each of the specific examples in FIGS. 22 to 24, the respective color patches are regularly arranged in a color change order, but the color patches are not required to be regularly arranged, and may be irregularly arranged as illustrated in FIG. 25. FIG. 25 is an enlarged view illustrating a part of a color chart. In a color chart 46D illustrated in FIG. 25, the respective color patches 47 are irregularly arranged.

Example of Creating Printer Profile by Using General Image

In FIGS. 18 to 25, a description has been made of an aspect of creating a printer profile by using a color chart, but a printer profile may be created by using a general image instead of the color chart.

The "general image" is an image other than a color chart, and indicates an image designated as a printing output object in a printing job. The general image may be referred to as the term such as a printing purpose image, a user image, or a printing object image.

In the configurations described in FIGS. 18 and 20, an output device color conversion table may be created by using image data of a general image instead of the color chart image data 44 and by using a printed article of a general image instead of the color chart printed article 54. The general image here corresponds to an example of a "first image".

A flow of a process of creating an output device color conversion table by using image data of a general image and a printed article of the general image is the same as in the examples described in FIGS. 18 to 21. However, a printer profile is required to cover the entire gamut of a color space unlike a source side target profile. In other words, even in a case where only a specific image can be output, the printer profile is required to profile a range of a wide color gamut to some extent.

A color used in a single general image does not necessarily cover the entire gamut of a color space unlike a color chart. Thus, in a case where a printer profile is created on the basis of a general image, it is an issue how to create a profile covering the entire gamut of a color space.

In relation to the fact, data regarding a wide color gamut may be obtained by using a plurality of general images of different pictures. In this case, a configuration is preferable in which a user can check whether or not a created printer profile covers the entire gamut of a color space.

Therefore, in a case of an aspect of creating a printer profile by using any general image, it is preferable to employ a configuration in which, in creating a printer profile by using some general images of different pictures, whenever each general image is input, a color gamut cover proportion of profiling indicating to what extent the color gamut is covered through profiling is displayed in a numerical value and/or via a graphical user interface (GUI).

Figure 26:
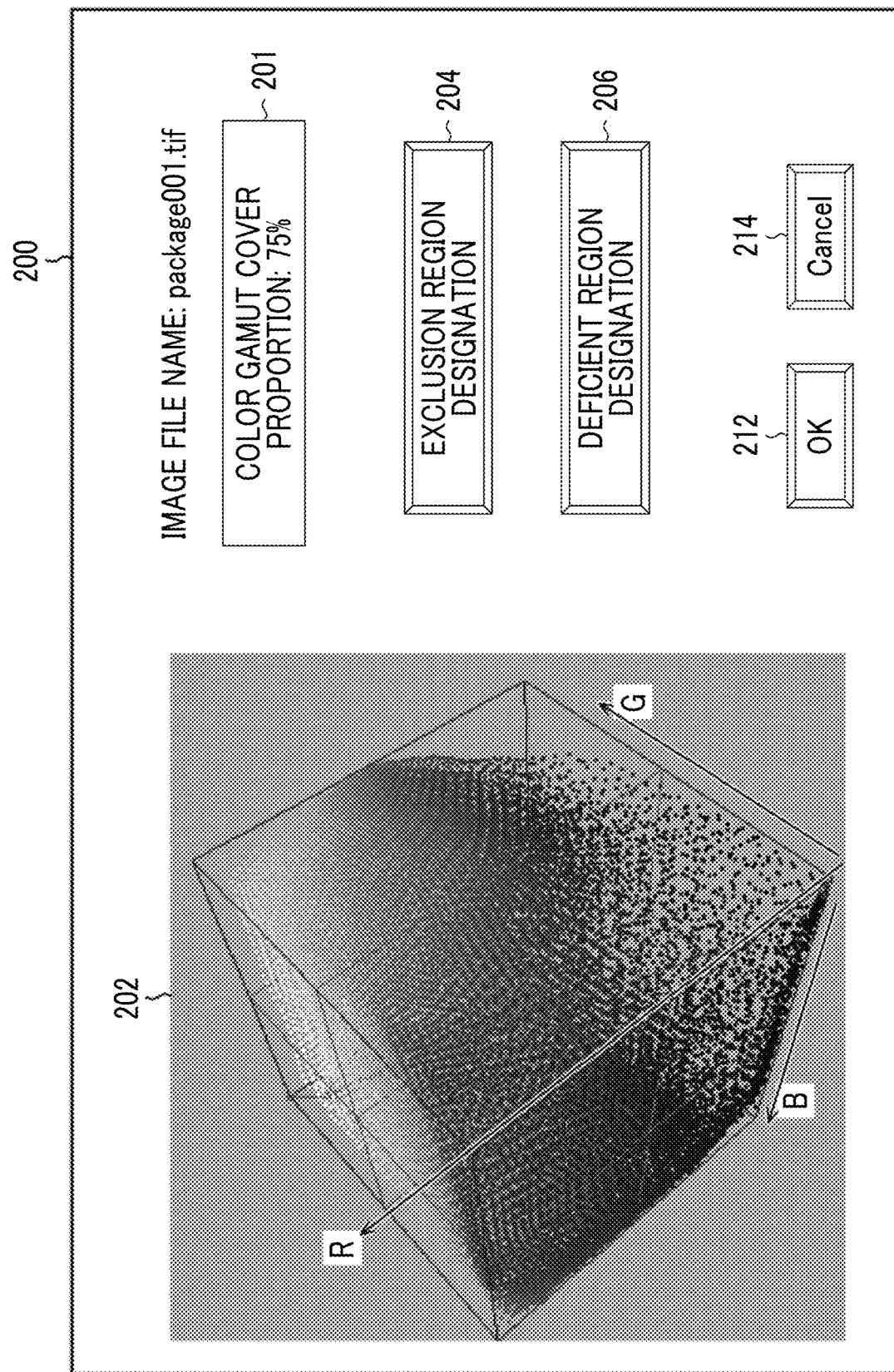
FIG. 26 is a diagram illustrating an example of a graphical user interface (GUI) screen for providing color gamut cover information of a profile created by using a general image.

FIG. 26 is a diagram illustrating an example of a GUI screen for providing color gamut cover information of a profile created by using a general image. An information presentation screen 200 exemplified in FIG. 26 is displayed on the display unit 34 of the image editing apparatus 12 described in FIG. 1. The information presentation screen 200 includes a color gamut cover proportion numerical value display region 201 and a color space display region 202. The color gamut cover information is information indicating a range in which data of a color gamut is covered in the entire color gamut required for a printer profile.

A numerical value of a color gamut cover proportion which is a proportion of a color gamut covered by data of the profile in the entire gamut of a color space is displayed in the color gamut cover proportion numerical value display region 201. The example in FIG. 24 illustrates that the profile covering 75% of the entire color gamut is obtained. The color gamut cover proportion indicates the perfection of the printer profile.

A cover region is graphically displayed through a three-dimensional color solid in the color space display region 202. In FIG. 26, for simplification of description, an RGB color space is exemplified, but a color space is not limited to RGB, and may be a CMY color space, and may be a four-dimensional color space of CMYK or a five or more-dimensional color space in which a special color is added to CMYK. In a case of a multi-dimensional color space including a four or more-dimensional color space, a value of a specific color axis is selectively fixed, and thus two-dimensional or three-dimensional color space display is performed.

For example, in a CMYK four-color base, in a case where a numerical value of any one component of CMYK is designated, a color solid is displayed by data of the other three color components. For example, in a case where K=50 is designated, a three-dimensional color solid of CMY corresponding to K=50 is displayed. For example, in a case where C=20 is designated, a three-dimensional color solid of MYK corresponding to C=20 is displayed.

A color solid diagram in which a range of data of the color gamut filled with data of the profile in the entire gamut of the RGB color space is graphically displayed is displayed in the color space display region 202 illustrated in FIG. 26.

Since the information presentation screen 200 as illustrated in FIG. 26 is displayed on the display unit 34, a user can easily understand a range of data of the color gamut covered by a created profile in the entire color space. There may be an aspect of a screen having at least one of the color gamut cover proportion numerical value display region 201 or the color space display region 202, and has only one display region. There may be an aspect in which an operation of selecting a display form is received from a user by using a display menu or the like (not illustrated), and display of color gamut cover proportion numerical value information and display of graphical display of a color gamut using a color solid diagram switch therebetween.

According to the present system, by using at least one of any general images other than a color chart, preferably a plurality of general images, the output device color conversion table 94A is created on the basis of each general image, creation results are merged such that a printer profile covering the entire gamut of a color space is completed. In other words, it is imagined that, whenever each of a plurality of general image is input, corresponding data of CMYK-Lab is sequentially added under the table described in FIG. 11.

A user can easily understand creation progress situations of a profile accumulated for each general image from the information presentation screen 200 as illustrated in FIG. 26. In a configuration in which a plurality of general images are sequentially input, and data of a profile is accumulated, preferably, a display mode can be switched such that a color gamut of data obtained from the latest read image which is newly read, a color gamut of data already obtained through the past reading, and a combined gamut thereof can be separately displayed in three patterns. The three patterns may be displayed in multi-screens, and may be displayed in an overlay manner. Consequently, it becomes easier to understand a color gamut increase of data added by a newly read image and a color gamut obtained finally.

Printed articles of a plurality of general images having different pictures correspond to "a plurality of types of first printed articles". Each of information displayed in the color gamut cover proportion numerical value display region 201 of the information presentation screen 200 and information displayed in the color space display region 202 thereof is an example "visualized information" provided to a user.

The information presentation screen 200 in FIG. 26 includes an exclusion region designation button 204, a deficient region designation button 206, an OK button 212, and a cancel button 214. The exclusion region designation button 204 is a GUI button for receiving an operation of designating a region excluded from data of the profile in the color gamut displayed in the color space display region 202 and/or a point to be excluded. For example, in a case where the exclusion region designation button 204 is pressed, a selection range (not illustrated) in which any region or any point in the color space display region 202 is selectable is displayed, and the exclusion region designation button 204 is displayed in an emphasis manner. The emphasis display of the GUI button indicates a display aspect in which a state of the button being pressed is visually emphasized through a display form such as blinking display highlight display of the GUI button, or a combination thereof. The expression "press" for the exclusion region designation button 204 and other GUI buttons includes an operation of inputting an instruction corresponding to a button, such as clicking or touching.

A position and a shape of the selection range (not illustrated) may be designated to any position and shape by operating the input device 36 (refer to FIG. 1). In a case where an exclusion region is selected from the color space in the selection range (not illustrated), and the OK button 212 is pressed, data in a region surrounded by the selection range (not illustrated) is deleted from the data of the profile. The OK button 212 is a GUI button for giving an instruction for execution of a process. The cancel button 214 is a GUI button for giving an instruction for canceling a process or an operation.

In a case where a color solid diagram is displayed in the color space display region 202, and data of a single general image is input, a data deficient region is clearly understood. A user may designate a color gamut required to complete the printer profile by referring to the color solid diagram displayed in the color space display region 202.

The deficient region designation button 206 is a GUI button for receiving an operation of designating a data deficient region from the color solid diagram displayed in the color space display region 202. For example, in a case where the deficient region designation button 206 is pressed, a selection range (not illustrated) in which any region or any point in the color space display region 202 is selectable is displayed, and the deficient region designation button 206 is displayed in an emphasis manner.

In a case where a deficient region is designated from the color space in the selection range (not illustrated), and the OK button 212 is pressed, digital data of a color chart including a color patch of a color in a region surrounded by the selection range (not illustrated) is created, and is used as additional input data. The image editing apparatus 12 performs a process of creating digital data of a color chart including color patches of respective colors into which a color gamut of the designated deficient region is equally divided. The digital data of the color chart is image data indicating image contents of the color chart, and has the same meaning as color chart image data.

The digital data of the color chart created in the above-described way is given to the printing apparatus 18, a color chart printed article of the deficient region is printed, the obtained color chart printed article is read by the image reading unit 30, and thus the output device color conversion table 94A including data of the deficient region can be obtained.

A procedure of an operation for designating a deficient region is not limited to the above-described example. As another operation procedure, an object region may be selected with a mouse, a touch panel, or the like before the exclusion region designation button 204 is pressed, and then an exclusion process may be performed by pressing the exclusion region designation button 204.

[Designation of Data Used to Create Printer Profile]

In the configuration of creating a printer profile by using a general image, a configuration may be employed in which data used for a profile creation process can be selectively designated. According to the configuration, it is possible to exclude data of an image region with dust or a flaw in a case where a printed article which is printed by using the printing apparatus 18 on the basis of image data of the general image is read by the image reading unit 30.

According to the configuration, for example, data of only a central portion of a printed article may be designated to be used by taking into consideration printer locality of the printing apparatus 18. The printer locality is one of printing characteristics in the printing apparatus 18, and indicates nonuniformity of printing performance of a printed article depending on a place. For example, the printer locality is a characteristic specific to the printing apparatus 18, such as a printing density of a peripheral portion being thinner than that of a central portion of a printed article.

Specifically, a region with a lot of noise may be designated from an image read by the image reading unit 30, so as to be excluded from data to be used. The region with a lot of noise is, for example, a portion attached with dust, a portion with a flaw in a printed image, in-surface nonuniformity in the printing apparatus 18, and a printing unstable region.

Instead of the aspect of designating a region to be excluded or in a combination therewith, there may be a configuration in which only a region desired to be used is designated from an image read by the image reading unit 30, so as to be input as data to be used. The region desired to be used may be, for example, a portion without dust or a flaw, a central portion of a printed article of which printing is stable, and a color gamut of which data is deficient on the basis of display of the color solid diagram in the color space display region 202. There may be an aspect in which a user designates only a deficient region in display in the color space display region 202 by referring to the information presentation screen 200 described in FIG. 25.

Figure 27:
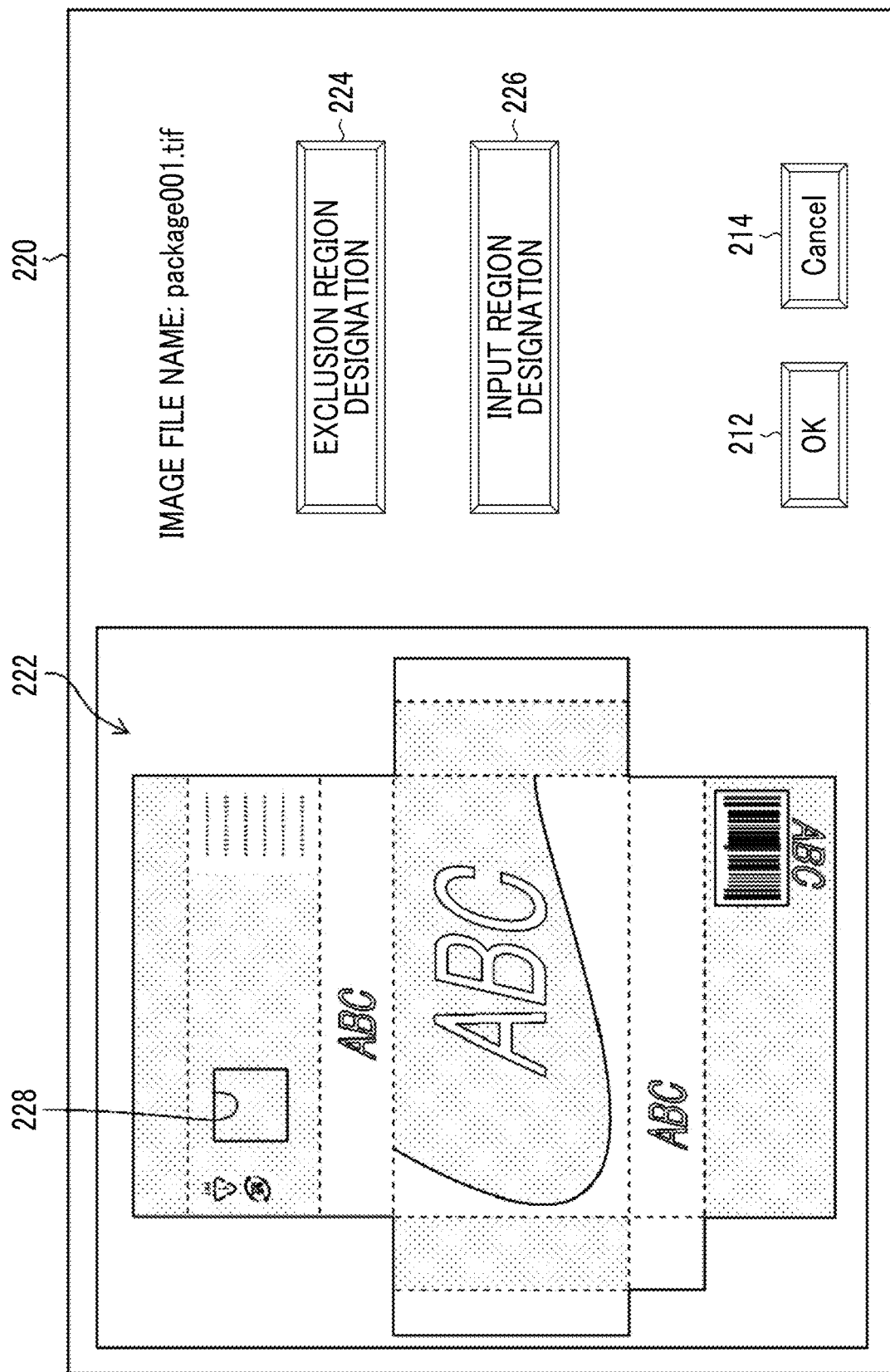
FIG. 27 is a diagram illustrating an example of a designation operation screen for input data.

FIG. 27 is a diagram illustrating an example of input data designation operation screen. A designation operation screen 220 exemplified in FIG. 27 includes a read image display region 222, an exclusion region designation button 224, an input region designation button 226, the OK button 212, and the cancel button 214.

Contents of a read image which is read by using the image reading unit 30 are displayed in the read image display region 222. The exclusion region designation button 224 is a GUI button for receiving an operation of designating an exclusion region which is an image region not desired to be used in the read image.

The input region designation button 226 is a GUI button for receiving an operation of designating a usage region which is an image region desired to be used as data in the read image.

For example, in a case where the exclusion region designation button 224 is pressed, a selection range 228 in which any region or any point in the read image display region 222 is selectable is displayed, and the exclusion region designation button 224 is displayed in an emphasis manner. A position and a shape of the selection range 228 may be designated to any position and shape by operating the input device 36 (refer to FIG. 1) typified by a mouse and/or a touch panel. In a case where an exclusion region is selected from the read image in the selection range 228, and the OK button 212 is pressed, data in a region surrounded by the selection range 228 is inhibited from being used in a process of creating an output device color conversion table in the second color conversion table creation unit 66A, and the color conversion table is created by using the rest data.

With this configuration, data of a region with a lot of noise can be extracted and excluded from data of a read image, and thus a color conversion table with high accuracy can be created.

For example, in a case where the input region designation button 226 is pressed, the selection range 228 in which any region or any point in the read image display region 222 is selectable is displayed, and the input region designation button 226 is displayed in an emphasis manner. In a case where a usage region is selected from the read image in the selection range 228, and the OK button 212 is pressed, only data in a region surrounded by the selection range 228 is used in a process of creating an output device color conversion table in the second color conversion table creation unit 66A, and the color conversion table is created.

Consequently, data of a region with a lot of noise can be extracted and excluded, and thus a table with high accuracy can be created.

The configuration of designating an exclusion region from a read image may also be applied to a configuration of reading a color chart. In the present embodiment, as exemplified in FIGS. 23 and 24, since a large amount of chromaticity value data can be obtained by using a color chart including color patches at a fine pitch, a sufficient data group required to create a printer profile can be secured even though some data influenced by noise is excluded.

[Function of Creating Data of Deficient Region]

Since a color gamut is displayed by employing the configuration described in FIG. 26, a data deficient region in a printer profile which is created as a result of a (single) general image being input once is clearly understood. Therefore, a configuration in a functional aspect of manually designating a deficient region, or automatically designating a deficient region through automatic determination, and creating and outputting digital data of a color belonging to the deficient region, may be employed.

The digital data of the color belonging to the deficient region is, for example, digital image data indicating image contents of a color chart including a color patch of the color belonging to the deficient region. The digital data of the color belonging to the deficient region designated manually or automatically will be referred to as "deficient region image data".

Modification Example 1 of Color Conversion Table Creation Apparatus 12A

Figure 28:
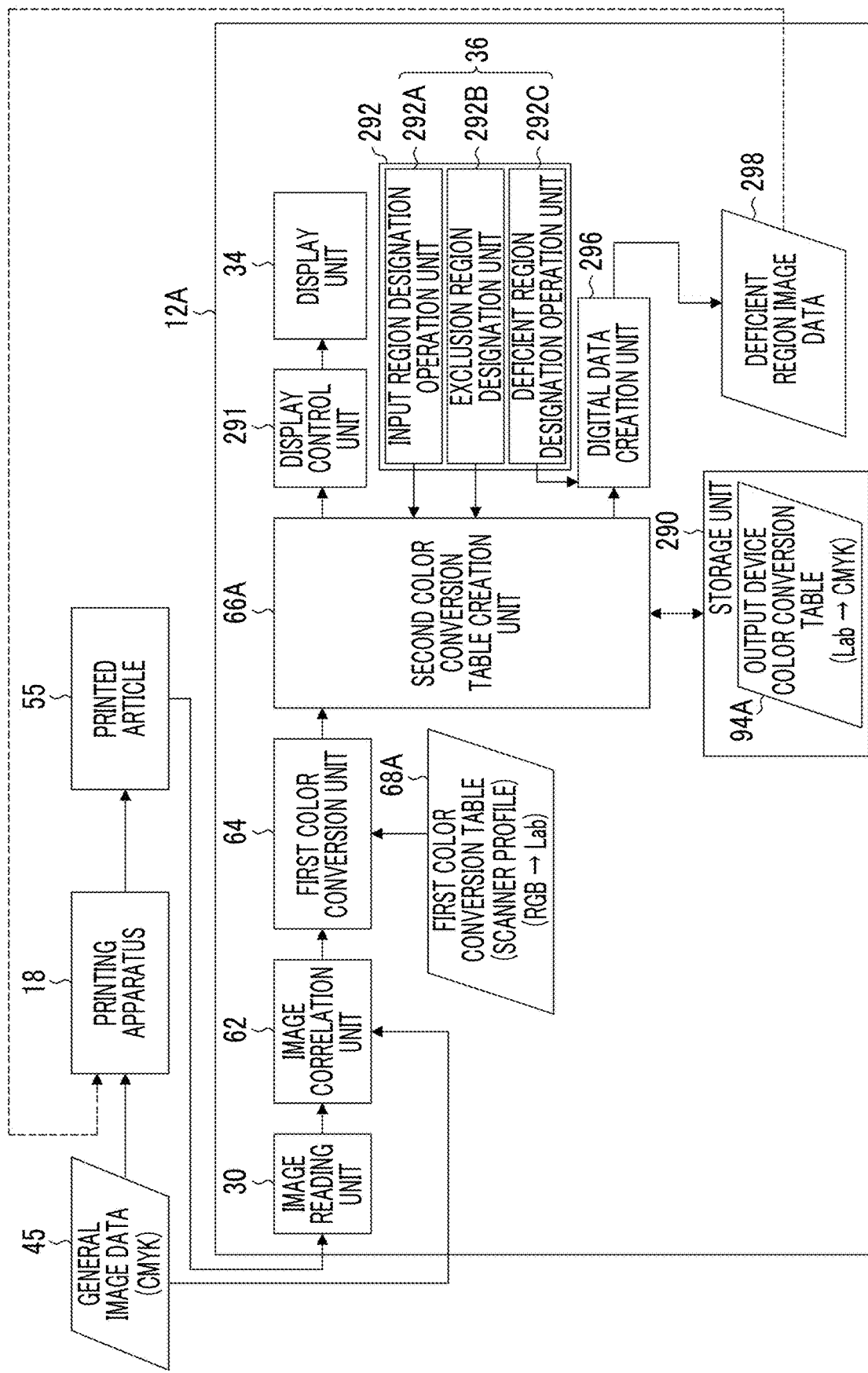
FIG. 28 is a block diagram illustrating an example of a configuration of a color conversion table creation apparatus providing a function of creating deficient region image data.

FIG. 28 is a block diagram illustrating an example of a configuration of a color conversion table creation apparatus providing a function of creating deficient region image data. In FIG. 28, a configuration for providing a function of creating deficient region image data is added to the configuration of the first type of color conversion table creation apparatus 12A described in FIG. 18.

In FIG. 28, a constituent element identical or similar to the constituent element described in FIG. 18 is given the same reference numeral, and a description thereof will be omitted.

The color conversion table creation apparatus 12A illustrated in FIG. 28 includes a storage unit 290, a display control unit 291, a designation operation unit 292, and a digital data creation unit 296. The storage unit 290 stores the output device color conversion table 94A created by using the second color conversion table creation unit 66A. The storage unit 290 may be a memory, and may be other storages such as a hard disk drive.

The display control unit 291 controls display contents of the display unit 34. The display control unit 291 creates display signals for displaying the information presentation screen 200 exemplified in FIG. 26, the designation operation screen 220 exemplified in FIG. 27, and the like on the display unit 34, and supplies the created display signals to the display unit 34.

The designation operation unit 292 includes an input region designation operation unit 292A, an exclusion region designation unit 292B, and a deficient region designation operation unit 292C. The input region designation operation unit 292A is an operation unit which receives an operation for a user designating data used to create the output device color conversion table 94A. The input device 36 (refer to FIG. 1) for operating the input region designation button 226 described in FIG. 27 functions as the input region designation operation unit 292A. The operation of a user designating data used to create the output device color conversion table 94A by using the input region designation operation unit 292A corresponds to an example of a "first designation operation".

The exclusion region designation unit 292B is an operation unit which receives an operation for a user designating an exclusion region. The input device 36 for operating the exclusion region designation button 204 described in FIG. 26 or the exclusion region designation button 224 described in FIG. 27 functions as the exclusion region designation unit 292B. An operation of a user designating an exclusion region by using the exclusion region designation unit 292B, that is, an operation of designating data not to be used which is not used to create the output device color conversion table 94A corresponds to an example of a "second designation operation".

The deficient region designation operation unit 292C is an operation unit which receives an operation for a user designating a deficient region. In other words, the deficient region designation operation unit 292C is an operation unit which receives an operation of a user designating a deficient region which is a color gamut of which data is deficient in the entire color gamut required for an output device color conversion table used as a printer profile. The input device 36 for operating the deficient region designation button 206 described in FIG. 26 functions as the deficient region designation operation unit 292C.

The digital data creation unit 296 creates deficient region image data 298 according to designation from the deficient region designation operation unit 292C. The digital data creation unit 296 equally divides the designated deficient region, computes a signal value of a color patch of each color, and creates image data of a color chart including each color patch.

An operation of the configuration illustrated in FIG. 28 is as follows.

General image data 45 is given to the printing apparatus 18, and printing is performed on the basis of the general image data 45 by using the printing apparatus 18 such that a printed article 55 of the general image is obtained. The printed article 55 is read by the image reading unit 30, and thus a read image of the printed article 55 is acquired. A processing process in which the output device color conversion table 94A is created through processes in the image correlation unit 62, the first color conversion unit 64, and the second color conversion table creation unit 66A on the basis of the read image of the printed article 55 and the general image data 45 of the printed article 55 is the same as in the example described in FIG. 18. The general image data 45 illustrated in FIG. 28 indicates image data of a general image other than a color chart. The general image data 45 is image data of an original document image designated in a printing job.

The output device color conversion table 94A created in the second color conversion table creation unit 66A is stored in the storage unit 290. With respect to the created output device color conversion table 94A, as described in FIG. 26, information regarding a cover proportion of a color gamut is displayed on the display unit 34.

In a case where a user operates the deficient region designation operation unit 292C, and thus designates a deficient region, the digital data creation unit 296 creates the deficient region image data 298 related to the designation. The deficient region image data 298 created by the digital data creation unit 296 is given to the printing apparatus 18, and thus a printed article of the deficient region image data is obtained. The printed article of the deficient region image data will be referred to as a "deficient region image printed article". The deficient region image printed article obtained in the above-described way is read by the image reading unit 30, and thus a read image of the deficient region image printed article is acquired.

An output device color conversion table of the deficient region is created through processes in the image correlation unit 62, the first color conversion unit 64, and the second color conversion table creation unit 66A on the basis of the read image of the deficient region image printed article and the deficient region image data. The output device color conversion table covering the entire gamut of a color space can be obtained by merging the output device color conversion table of the deficient region obtained in the above-described way with the output device color conversion table 94A created on the basis of the general image data 45.

The deficient region image data 298 created by the digital data creation unit 296 corresponds to an example of "first image data". The deficient region image printed article corresponds to an example of a "first printed article". The general image data 45 and the deficient region image data 298 correspond to examples of a "plurality of types of first image data".

Modification Example 2 of Color Conversion Table Creation Apparatus 12A

Figure 29:
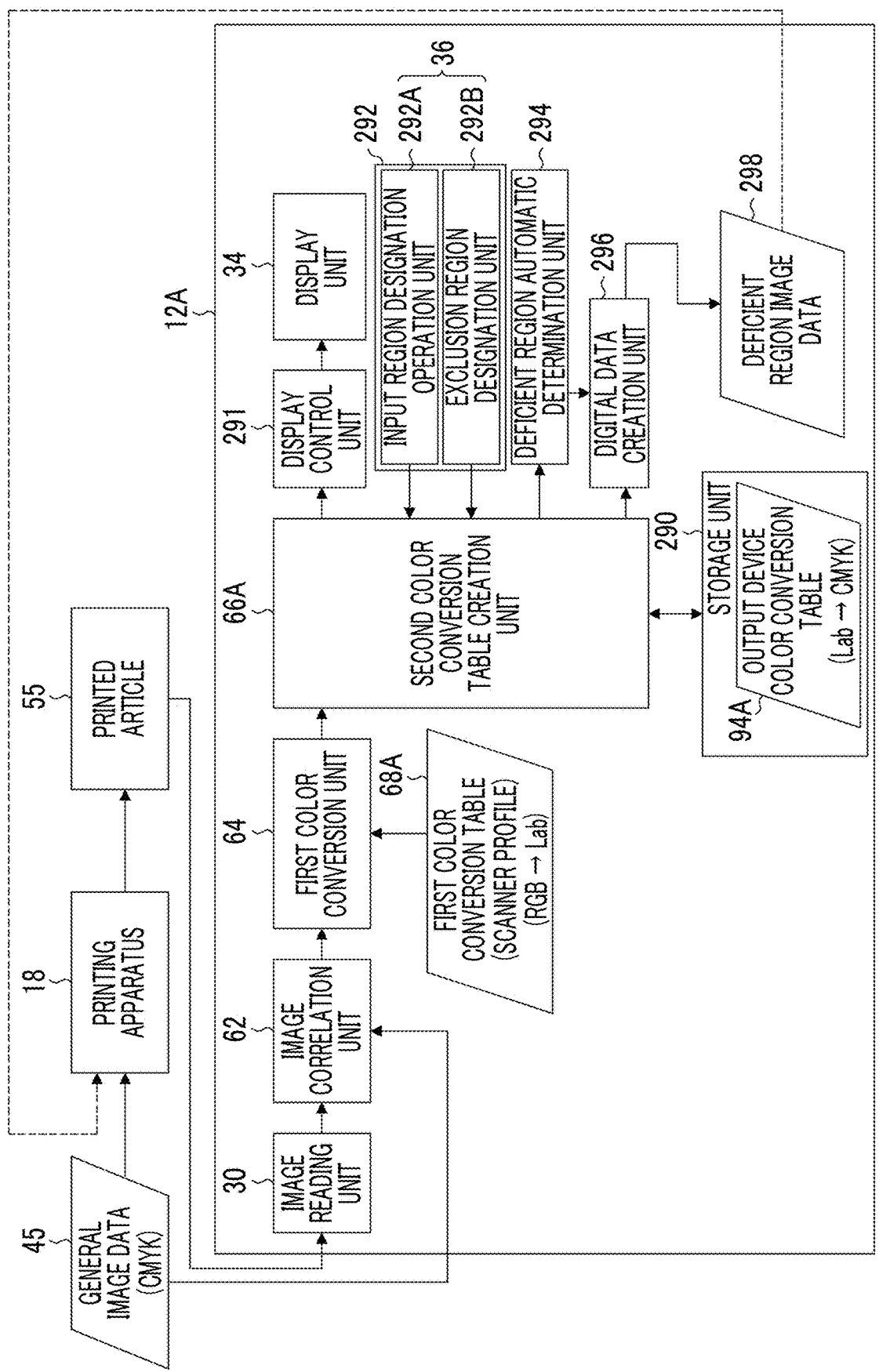
FIG. 29 is a block diagram illustrating another example of a configuration of a color conversion table creation apparatus providing a function of creating deficient region image data.

FIG. 29 is a block diagram illustrating another example of a configuration of a color conversion table creation apparatus providing a function of creating deficient region image data. FIG. 29 illustrates a configuration in which a deficient region automatic determination unit 294 is provided instead of the "deficient region designation operation unit 292C" in the color conversion table creation apparatus 12A described in FIG. 28.

In FIG. 29, a constituent element identical or similar to the constituent element described in FIG. 28 is given the same reference numeral, and a description thereof will be omitted. The deficient region automatic determination unit 294 of the color conversion table creation apparatus 12A illustrated in FIG. 29 automatically determines a deficient region from the output device color conversion table 94A which is created by the second color conversion table creation unit 66A on the basis of the general image data 45. A target color gamut defining a color gamut which is necessary in a printer profile is set in the deficient region automatic determination unit 294. The deficient region automatic determination unit 294 automatically determines a deficient region by comparing data of the output device color conversion table 94A created by the second color conversion table creation unit 66A with the predefined target color gamut, and a deficient region is automatically designated according to a determination result. The determination result in the deficient region automatic determination unit 294 is sent to the digital data creation unit 296.

The digital data creation unit 296 generates the deficient region image data 298 corresponding to the deficient region designated by the deficient region automatic determination unit 294. An output device color conversion table of the deficient region is created by using the deficient region image data 298 which is automatically created in the above-described way, and is merged with the output device color conversion table 94A created on the basis of the general image data 45, and thus an output device color conversion table covering the entire gamut of a color space can be obtained.

The function of the digital data creation unit 296 described in FIGS. 28 and 29 may be installed in the printing apparatus 18, and there may be an aspect in which the printing apparatus 18 creates the deficient region image data 298 and outputs a deficient region image printed article.

<Application to Second Type of Color Conversion Table Creation Apparatus 12B>

In FIGS. 28 and 29, the first type of color conversion table creation apparatus 12A has been described as an example, and the identical configuration of the modification example may be applied to the second type of color conversion table creation apparatus 12B.

<Process of Updating Printer Profile Using General Image>

As described above, according to the present embodiment, the output device color conversion table 94A can be created by using a general image. Due to the function, a printer profile can be completed by using a plurality of general images, and the printer profile which is temporarily created can be updated at any time.

For example, after a printer profile is temporarily completed by using a color chart or a plurality of general image, a desired printed article can be obtained by executing a printing job by using the printer profile. In a case where the printing job is finished, whenever the printing job is finished, a printed article which is an output result of the printing job may be read by the image reading unit 30, the output device color conversion table 94A may be created by using image data (general image data) designated in the printing job, and a printer profile may be automatically updated to the latest data. By performing such an update process, the latest printer profile can be obtained in accordance with a temporal change of the printing apparatus 18.

According to such an aspect, a printer profile is updated to the latest data by using image data related to designation of a printing job in printing business and a printed article which is an output result of the printing job, and thus a separate calibration operation or the like is not necessary.

Color chart image data and general image data in a case where a printer profile is first created by using a color chart, and then the printer profile is updated by using the general image data designated in the subsequent printing job and a printed article thereof correspond to examples of a "plurality of types of first image data".

<<Function of Selecting Scanner Profile>>

Even in a case where an identical scanner is used, it is preferable to selectively apply an appropriate scanner profile depending on a combination of the type of color material, the type of base material, and the type of printing apparatus, used for printing.

Figure 30:
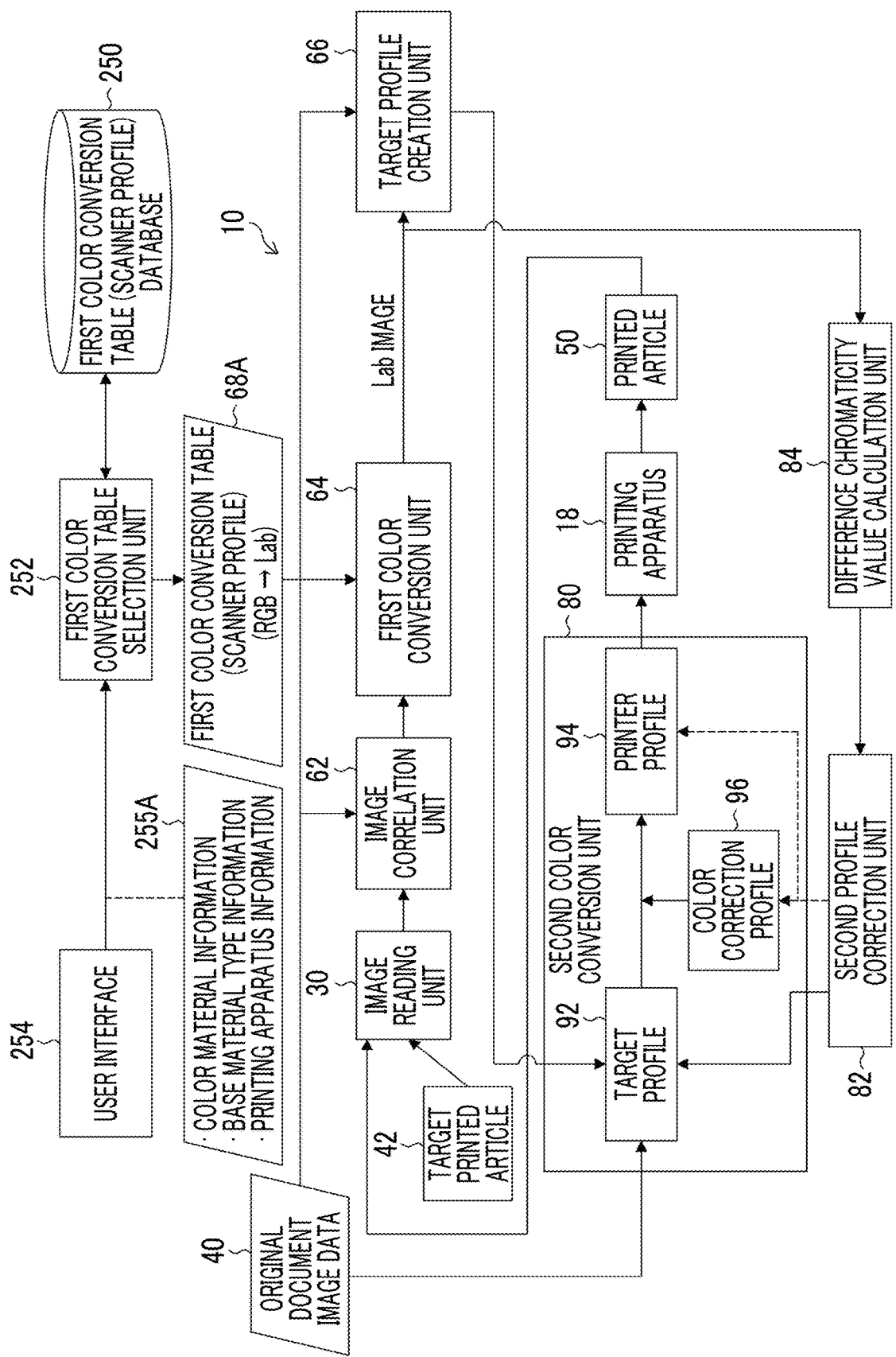
FIG. 30 is a block diagram illustrating a configuration example of the printing system including means for selecting a scanner profile.

FIG. 30 is a block diagram illustrating a configuration example of a printing system including means for selecting a scanner profile. In FIG. 30, a constituent element identical or similar to the constituent element described in FIG. 2 is given the same reference numeral, and a description thereof will be omitted.

The printing system 10 illustrated in FIG. 30 has a configuration in which a first color conversion table database 250, a first color conversion table selection unit 252, and a user interface 254 are added to the configuration illustrated in FIG. 2.

The user interface 254 is configured to include the display unit 34 and the input device 36 described in FIG. 1. The user interface 254 receives input of various pieces of information from a user. The user operates may input information 255A including at least one of color material information, base material type information, or printing apparatus information by operating the user interface 254.

The color material information is information for specifying the type of color material used for printing. The type of color material will be referred to as a color material type. The color material type may be, for example, an ink jet dye, an ink jet pigment, offset printing ink, or toner.

The base material type information is information for specifying the type of base material used for printing. The type of base material will be referred to as a base material type. The base material type may be, for example, plain paper, fine paper, exclusive paper for ink jet, a building material tile, a cotton fabric, or a polyester fabric.

The printing apparatus information is information for specifying the type of printing apparatus used for printing. The type of printing apparatus may be, for example, an ink jet printer, an offset printing machine, or an electrophotographic printer. In a case where a printing apparatus used for printing is fixedly specified, input of the printing apparatus information may be omitted.

In order to facilitate user's information input work, it is preferable to employ a graphical user interface causing a combination of a color material and a base material used for printing to be easily selected.

The user interface 254 receives an input operation on the information 255A for specifying a combination of a color material type and a base material type used for the printing apparatus 18 to create the printed article 50. The user interface 254 corresponds to an example of an "information acquisition unit which acquires information for specifying a combination of a color material type and a base material type used for a printing apparatus to create a printed article".

A plurality of scanner profiles for combinations of various color materials or base materials are stored in the first color conversion table database 250. A scanner profile created or corrected in the present system in the past may be preserved in the color conversion table database 250. The first color conversion table database 250 stores a color conversion table representing a correspondence relationship between a reading signal from the image reading unit 30 and a chromaticity value for each combination with respect to a plurality of combinations of color material types and base material types which may be used for printing in the printing apparatus 18.

For example, a plurality of color conversion tables stored in the first color conversion table database 250 may be configured to include a color conversion table corresponding to each of a plurality of base material types classified into at least two categories among three categories such as paper, a fabric, and a building material.

The first color conversion table database 250 may be stored in a storage device such as a storage provided in the image editing apparatus 12 (refer to FIG. 1), and may be stored in an external storage device connected to the image editing apparatus 12. The term "connection" indicates a relationship of data being capable of being transmitted and received, and is not limited to wired connection, and may be wireless connection.

The first color conversion table selection unit 252 performs a process of selecting an appropriate single scanner profile from the first color conversion table database 250 on the basis of the information 255A obtained from the user interface 254. The first color conversion table 68A obtained through the selection process in the first color conversion table selection unit 252 is applied to the first color conversion unit 64. The first color conversion table selection unit 252 is configured as one of processing units of the image editing apparatus 12 (refer to FIG. 1).

According to the configuration example illustrated in FIG. 30, the first color conversion unit 64 can perform a conversion process by using an appropriate scanner profile (first color conversion table) according to a combination of a color material and a base material to be used.

A scanner profile may be changed at an appropriate timing as necessary. For example, during creation of the target profile 92, a scanner profile may be selected. During creation of the output device color conversion table 94A, a scanner profile may be selected. During correction of a color conversion table using the third color conversion table creation unit 102 described in FIG. 5, a scanner profile may be selected.

Figure 31:
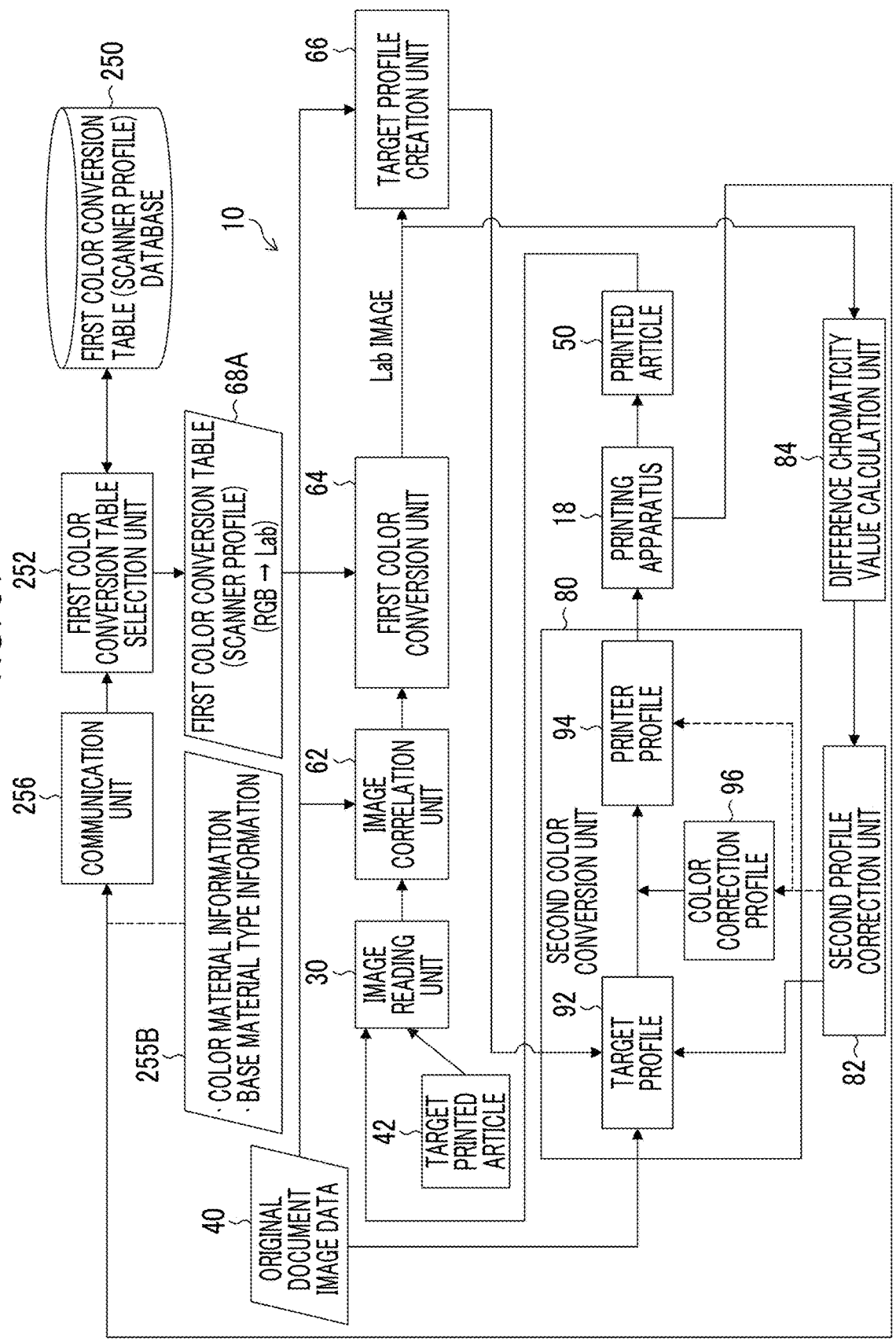
FIG. 31 is a block diagram illustrating another configuration example of the printing system including means for selecting a scanner profile.

FIG. 31 is a block diagram illustrating another configuration example of a printing system including means for selecting a scanner profile. In FIG. 31, a constituent element identical or similar to the constituent element described in FIG. 30 is given the same reference numeral, and a description thereof will be omitted.

The printing system 10 illustrated in FIG. 31 includes a communication unit 256 as an information acquisition unit which acquires information 255B for specifying a combination of a color material type and a base material type from the printing apparatus 18. The image editing apparatus 12 (refer to FIG. 1) includes the communication unit 256 incorporating the information 255B from the printing apparatus 18. Instead of or in combination with the user interface 254 described in FIG. 31, a configuration of automatically acquiring the information 255B from the printing apparatus 18 via the communication unit 256 may be employed. The information 255B from the printing apparatus 18 includes color material information and base material type information.

The first color conversion table selection unit 252 performs a process of selecting an appropriate single scanner profile from the first color conversion table database 250 on the basis of the information 255B acquired via the communication unit 256.

According to the configuration example illustrated in FIG. 31, the first color conversion unit 64 can perform a conversion process by using an appropriate scanner profile (first color conversion table) according to a combination of a color material and a base material to be used.

In FIGS. 30 and 31, an example of the first type has been described, but a configuration of realizing the function of selecting a scanner profile may be applied to the configuration of the second type described in FIG. 4 in the same manner as in FIGS. 30 and 31.

<Case of Applying Four-Color-Based System to Three-Color Base>

Hitherto, a description has been made of an example of the four-color-to-four-color conversion system which converts CMYK four-color original document image data into CMYK four-color printing image data which is then output, but the present invention may be applied to a three-color base such as CMY or RGB in the same manner. The present invention may also be applied a multi-color base of five or more colors.

Hereinafter, a description will be made of an example of a case where a configuration of a four-color-to-four-color conversion system is used as a three-color-to-three-color conversion system. First, an outline of a four-color-to-four-color conversion system will be described.

Figure 32:
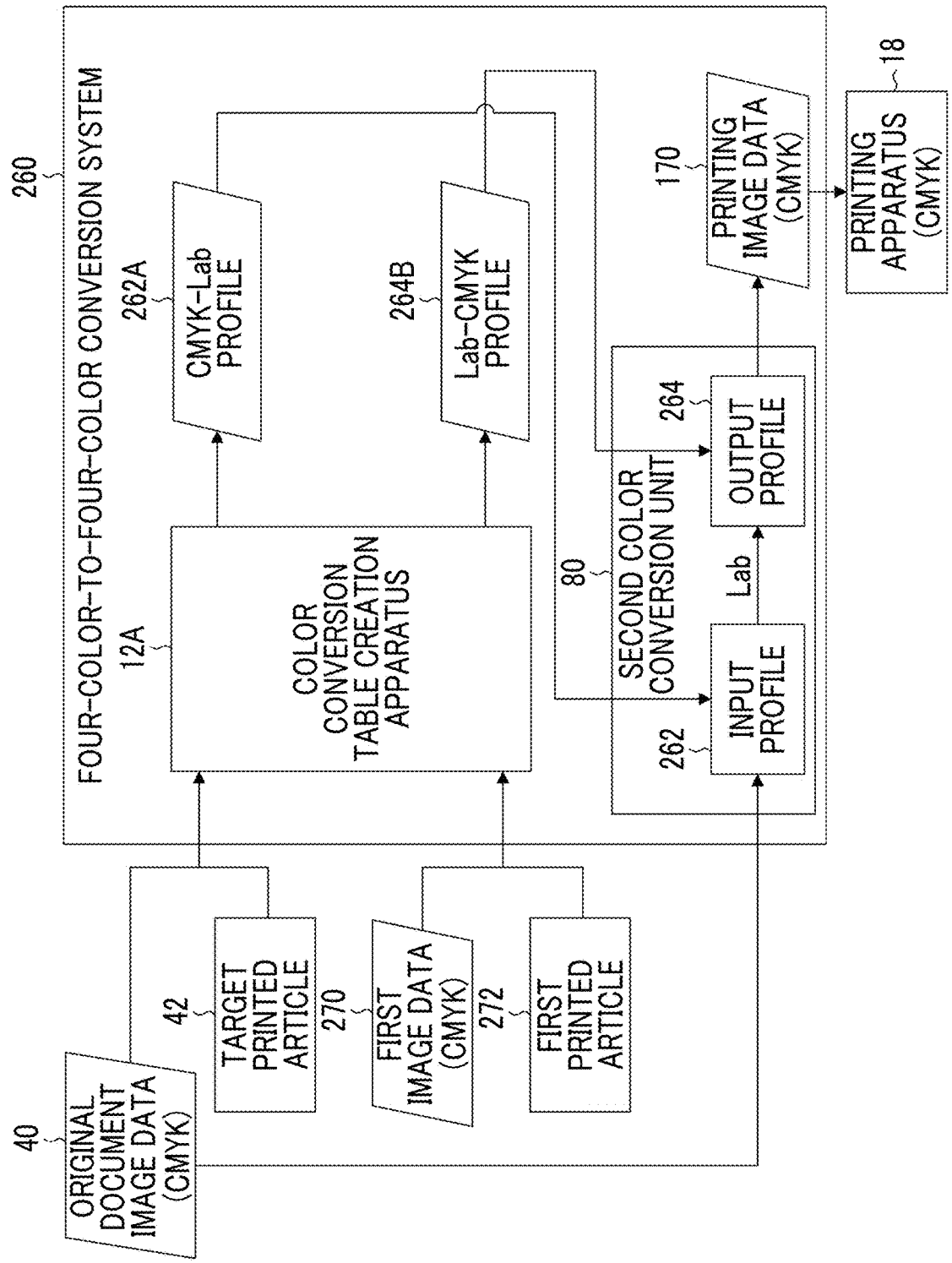
FIG. 32 is a block diagram illustrating a simplified configuration of a four-color-to-four-color conversion system including the color conversion table creation apparatus according to the embodiment.

FIG. 32 is a block diagram illustrating a simplified configuration of a four-color-to-four-color conversion system 260 including the color conversion table creation apparatus 12A according to the embodiment. A four-color-to-four-color conversion system including the color conversion table creation apparatus 12B described in FIG. 20 instead of the color conversion table creation apparatus 12A may be used.

The four-color-to-four-color conversion system 260 is configured to include the color conversion table creation apparatus 12A and the second color conversion unit 80. The color conversion table creation apparatus 12A creates a CMYK-Lab profile 262A defining a conversion relationship of "CMYK→Lab" on the basis of the original document image data 40 of CMYK and the target printed article 42 which is a color sample. The CMYK-Lab profile 262A is used as an input profile 262 in the second color conversion unit 80. The CMYK-Lab profile 262A corresponds to the second color conversion table 92A described in FIG. 3.

The color conversion table creation apparatus 12A creates an Lab-CMYK profile 264B defining a conversion relationship of "Lab→CMYK" on the basis of a color chart or first image data 270 of CMYK corresponding to a general image, and a first printed article 272 which is a printed article thereof. The Lab-CMYK profile 264B is used an output profile 264 in the second color conversion unit 80.

The first image data 270 and the first printed article 272 respectively correspond to the color chart image data 44 and the color chart printed article 54 illustrated in FIG. 18. Alternatively, the first image data 270 and the first printed article 272 illustrated in FIG. 32 respectively correspond to the general image data 45 and the printed article 55 illustrated in FIGS. 28 and 29. The Lab-CMYK profile 264B illustrated in FIG. 32 corresponds to the output device color conversion table 94A illustrated in FIG. 18.

The second color conversion unit 80 performs a CMYK→CMYK conversion process on the input original document image data 40 of CMYK by using the input profile 262 and the output profile 264, so as to generate the printing image data 170 of CMYK. In the above-described way, the printing image data 170 generated by the four-color-to-four-color conversion system 260 is sent to the printing apparatus 18 coping with CMYK four colors, and printing is performed.

(1) Correspondence Example of Three-Color-to-Three-Color Conversion System

In a case where image data which is input as an original document image is three-color-based data such as CMY data or RGB data, and a printing apparatus copes with a three-color base, even though a three-color-based system coping with three-color-based input and output is not made, a three-color-to-four-color conversion process is put in the previous stage of a CMYK four-color-based system such that a three-color-based image signal is converted into a four-color-based image signal, and a four-color-to-three-color conversion process is put in the subsequent stage of the process in the second color conversion unit 80 such that the four-color-based image signal is converted into a three-color-based image signal, and thus the four-color-based system can be used without being changed. The notation "three-color-to-four-color conversion" indicates that a three-color-based signal is converted into a four-color-based signal. For example, "RGB→CMYK" conversion of converting an RGB signal into a CMYK signal or "CMY→CMYK" conversion of converting a CMY signal into a CMYK signal corresponds to "three-color-to-four-color conversion".

The notation "four-color-to-three-color conversion" indicates that a four-color-based signal is converted into a three-color-based signal. For example, "CMYK-RGB" conversion of converting a CMYK signal into an RGB signal or "CMYK→CMY" conversion of converting a CMYK signal into a CMY signal corresponds to "four-color-to-three-color conversion".

Figure 33:
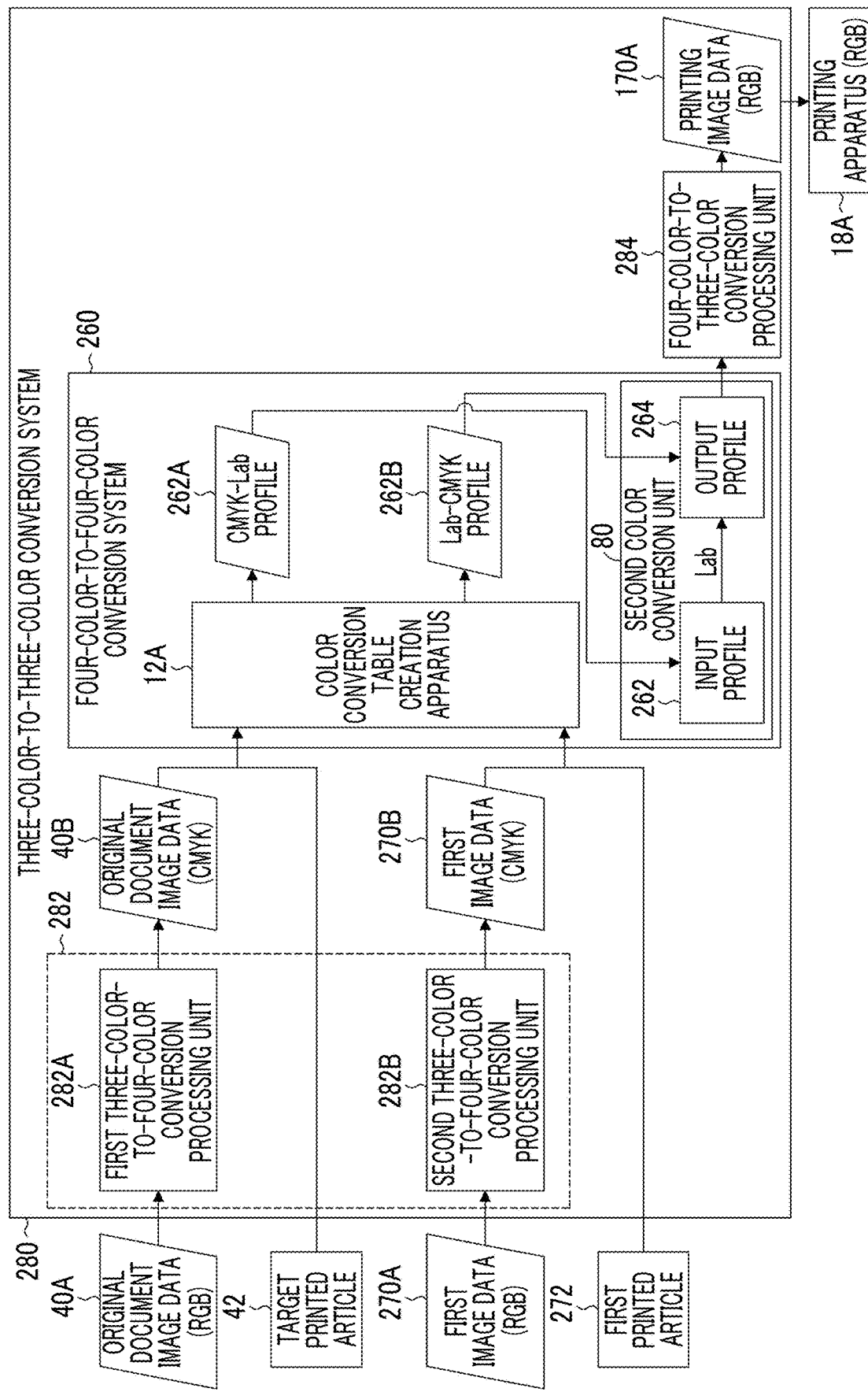
FIG. 33 is a block diagram illustrating an example of applying the four-color-to-four-color conversion system to a three-color-to-three-color conversion system.

FIG. 33 is a block diagram illustrating an example of applying the four-color-to-four-color conversion system 260 to a three-color-to-three-color conversion system 280. In FIG. 33, a constituent element identical or similar to the constituent element described in FIG. 32 is given the same reference numeral, and a description thereof will be omitted. FIG. 33 exemplifies a three-color-based system coping with input and output of RGB data.

In a case of the three-color-to-three-color conversion system 280 illustrated in FIG. 33, the target printed article 42 and original document image data 40A of RGB thereof are given. In creation of the Lab-CMYK profile 264B used as the output profile 264, first image data 270A of RGB and first printed article 272 which is a printed article thereof are given.

The three-color-to-three-color conversion system 280 includes a three-color-to-four-color conversion processing unit 282, the four-color-to-four-color conversion system 260, and a four-color-to-three-color conversion processing unit 284. The three-color-to-four-color conversion processing unit 282 performs a three-color-to-four-color conversion process in the previous stage of a process in the four-color-to-four-color conversion system 260. The three-color-to-four-color conversion processing unit 282 may be configured to include a first three-color-to-four-color conversion processing unit 282A and a second three-color-to-four-color conversion processing unit 282B. The first three-color-to-four-color conversion processing unit 282A performs a process of converting the given original document image data 40A of RGB into original document image data 40B of CMYK in creation of the CMYK-Lab profile 262A used as the input profile 262.

The second three-color-to-four-color conversion processing unit 282B performs a process of converting the first image data 270A of RGB into first image data 270B of CMYK in creation of the Lab-CMYK profile 264B used as the output profile 264.

The first three-color-to-four-color conversion processing unit 282A performs a process of converting the original document image data 40A of RGB into the original document image data 40B of CMYK in converting the original document image data 40A of RGB into printing image data 170A of RGB through a process in the second color conversion unit 80.

Different color conversion tables may be used for the conversion process in the first three-color-to-four-color conversion processing unit 282A and the conversion process in the second three-color-to-four-color conversion processing unit 282B. An identical color conversion table may be used for the conversion process in the first three-color-to-four-color conversion processing unit 282A and the conversion process in the second three-color-to-four-color conversion processing unit 282B, and, in this case, the first three-color-to-four-color conversion processing unit 282A and the second three-color-to-four-color conversion processing unit 282B may be integrated into a single three-color-to-four-color conversion processing unit.

The four-color-to-three-color conversion processing unit 284 performs a four-color-to-three-color conversion process in the subsequent stage of the conversion process in the second color conversion unit 80. The conversion process in the four-color-to-three-color conversion processing unit 284 is an inverse conversion process to the conversion process in the second three-color-to-four-color conversion processing unit 282B.

The process functions of the three-color-to-four-color conversion processing unit 282 and the four-color-to-three-color conversion processing unit 284 illustrated in FIG. 33 may be included in the color conversion table creation apparatus 12A. A four-color-to-four-color conversion system including the color conversion table creation apparatus 12B described in FIG. 20 instead of the color conversion table creation apparatus 12A in FIG. 33 may be used. The three-color-to-three-color conversion system 280 illustrated in FIG. 33 corresponds to an example of a color conversion apparatus.

(2) Specific Example 1 of Three-Color-to-Four-Color Conversion

There may be various three-color-to-four-color conversion methods of converting a three-color-based signal into a four-color-based signal. One of the three-color-to-four-color conversion methods is a method in which an RGB→CMYK color conversion process is performed on RGB image data by using an RGB→Lab profile and an Lab-CMYK profile, and a CMYK signal obtained through the conversion is input to a CMYK four-color-based system.

As the RGB→Lab profile and the Lab→CMYK profile used for the RGB→CMYK color conversion process, for example, a standard profile such as Japan Color (registered trademark) may be used. In this case, K may not be 0.

(3) Specific Example 2 of Three-Color-to-Four-Color Conversion

Another method of the three-color-to-four-color conversion methods is a method in which, for example, in a case where each signal of CMYK and each signal of RGB are signals normalized to a value in a range of 0 to 1, conversion such as C=(1−R), M=(1−G), Y=(1−B), and K=0 is used. By using a conversion relationship in which, among CMYK four colors, three colors of CMY correspond to three colors of RGB on a one-to-one basis, it is possible to improve interpolation accuracy in applying a four-color-based system to a three-color base. This is because a pixel of K≠0 does not occur.

For example, conversion of C=(1−R), M=(1−G), Y=(1−B), and K=0 may be used as conversion common to the first three-color-to-four-color conversion processing unit 282A and the second three-color-to-four-color conversion processing unit 282B in FIG. 33. In this case, the four-color-to-three-color conversion processing unit 284 converts CMYK data output from the second color conversion unit 80 into RGB data by using inverse conversion to the conversion in the second three-color-to-four-color conversion processing unit 282B, that is, a conversion relationship of R=C−1, G=1−M, B=1−Y, and K not in use.

The conversion relationship may be specified by a numerical expression, and may be specified by a lookup table which leads to a conversion result equivalent to a calculation based on a numerical expression. The rule "K not in use" has the same meaning as K not being used, that is, data of K being neglected.

(4) Specific Example 3 of Three-Color-to-Four-Color Conversion

In the above specific example 2, a description has been made of an example of conversion of K=0, but a signal of any one color other than K among CMYK may be 0. For example, conversion of C=0, M=(1−R), Y=(1−G), and K=(1−B) may be performed. Alternatively, conversion of K=(1−R), C=(1−G), M=(1−B), and Y=0 may be performed.

Conversion of C=(1−R), M=(1−G), Y=(1−B), and K=0 may be used as conversion in the first three-color-to-four-color conversion processing unit 282A in FIG. 33, and conversion of K=(1−R), C=(1−G), M=(1−B), and Y=0 may be used as conversion in the second three-color-to-four-color conversion processing unit 282B. In this case, the four-color-to-three-color conversion processing unit 284 converts CMYK data output from the second color conversion unit 80 into RGB data by using inverse conversion to the conversion in the second three-color-to-four-color conversion processing unit 282B, that is, a conversion relationship of R=K−1, G=1−C, B=1−M. and Y not in use.

(5) Operation of Three-Color-to-Three-Color Conversion System 280

Principal functions of the three-color-to-three-color conversion system 280 are a function of creating the input profile 262, a function of creating the output profile 264, and a function of performing a color conversion process on image data by using the created input profile 262 and output profile 264.

Figure 34:
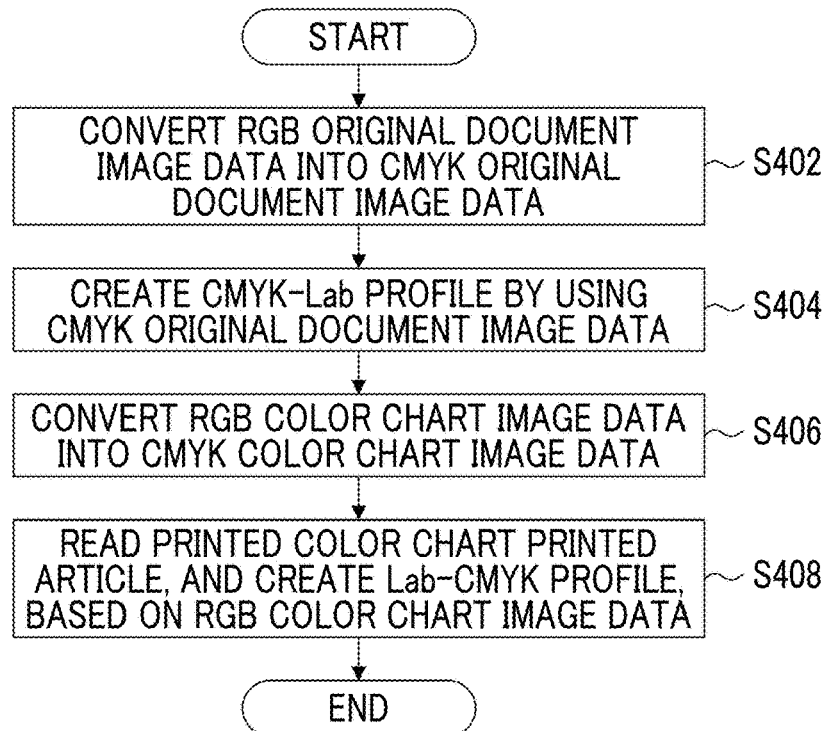
FIG. 34 is a flowchart illustrating examples of procedures of a profile creation process in the three-color-to-three-color conversion system.

FIG. 34 is a flowchart illustrating examples of procedures of a profile creation process in the three-color-to-three-color conversion system 280. Each step illustrated in FIG. 34 is executed by the image editing apparatus 12 which functions as the three-color-to-three-color conversion system 280.

In step S402 in FIG. 34, the first three-color-to-four-color conversion processing unit 282A converts the original document image data 40A of RGB into the original document image data 40B of CMYK. For example, the first three-color-to-four-color conversion processing unit 282A performs three-color-to-four-color conversion according to a relationship of C=(1−R), M=(1−G), Y=(1−B), and K=0.

In step S404, the color conversion table creation apparatus 12A creates the CMYK-Lab profile 262A by using the original document image data 40B of CMYK obtained through the process in step S402.

In step S406, the second three-color-to-four-color conversion processing unit 282B converts color chart image data of RGB into color chart image data of CMYK. For example, the second three-color-to-four-color conversion processing unit 282B performs three-color-to-four-color conversion according to a relationship of K=(1−R), C=(1−

G), M=(1−B), and Y=0. The color chart image data of RGB is an example of the first image data 270A of RGB. The color chart image data of CMYK obtained through the process in step S406 is an example of the first image data 270B of CMYK.

In step S408, the color conversion table creation apparatus 12A reads a color chart printed article which is printed in a printing apparatus 18A, and creates the Lab-CMYK profile 264B on the basis of the color chart image data of RGB.

Step S402 and step S404 in FIG. 34 correspond to an input profile creation step. Step S406 and step S408 correspond to an output profile creation step. Orders of the input profile creation step and the output profile creation step may be replaced with each other.

Figure 35:
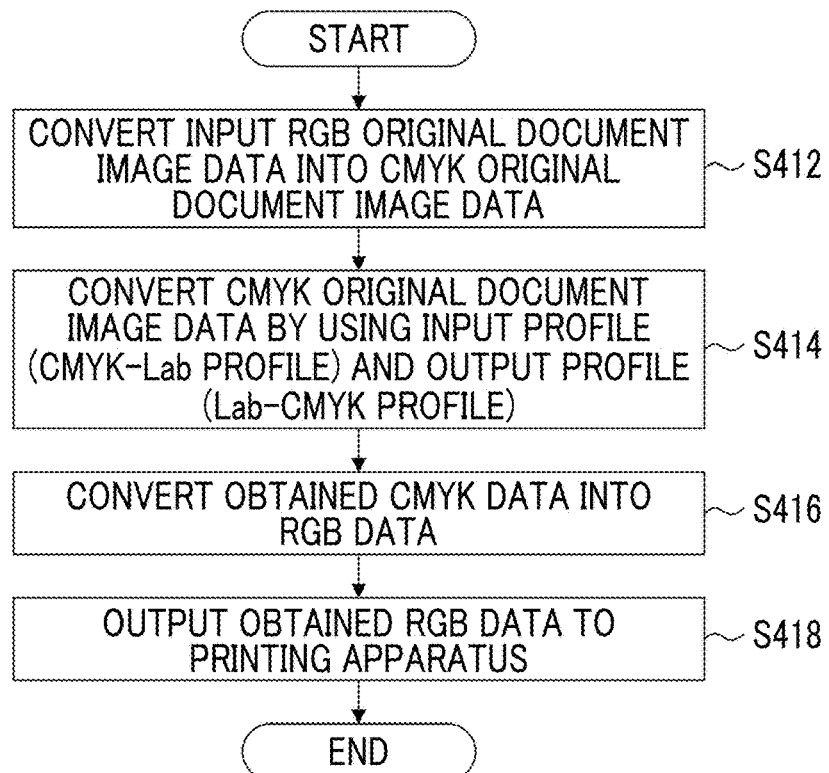
FIG. 35 is a flowchart illustrating examples of procedures of a color conversion process in the three-color-to-three-color conversion system.

FIG. 35 is a flowchart illustrating examples of procedures of a color conversion process in the three-color-to-three-color conversion system 280. Each step illustrated in FIG. 35 is executed by the image editing apparatus 12 which functions as the three-color-to-three-color conversion system 280.

In step S412, the first three-color-to-four-color conversion processing unit 282A converts the input original document image data 40A of RGB into the original document image data 40B of CMYK. The process in step S412 is equivalent to the process in step S402 in FIG. 34. In a case where a result of the process in step S402 can be used, the process in step S412 in FIG. 35 may be omitted.

In step S414, the second color conversion unit 80 converts the original document image data 40B of CMYK by using the input profile 262 and the output profile 264. As the input profile 262, the CMYK-Lab profile 262A created in step S404 in FIG. 34 is used. As the output profile 264, the Lab-CMYK profile 264B created in step S408 in FIG. 34 is used.

In step S416, the four-color-to-three-color conversion processing unit 284 converts CMYK data obtained through the process in step S414 into RGB data. The four-color-to-three-color conversion processing unit 284 converts the CMYK data into the RGB data according to a conversion relationship of R=K−1, G=1−C, B=1−M, and Y not in use. The printing image data 170A of RGB is obtained through the process in step S416.

In step S418, the four-color-to-three-color conversion processing unit 284 outputs the obtained RGB data to the printing apparatus 18A. In the above-described way, printing is performed by the printing apparatus 18A.

(6) Conversion Relationship Between RGB and CMYK

In a conversion relationship between RGB and CMYK, colors are not required to be close to each other, such as C=(1−R), M−(1−G), and Y−(1−B), and any one color may correspond to another single color on a one-to-one basis.

As a specific example of "one-to-one correspondence" in a case where each signal of CMYK and each signal of RGB are signals normalized to a value in a range of 0 to 1, for example, there may be a correspondence relationship of "C=R, M=B, Y=G, and K=0" or a correspondence relationship of "C=$G^2$, M=$B^2$, Y=$R^2$, K=0".

Example of Applying Multi-Color-Based System to Three-Color Base

There is no limitation to a four-color-based system, and, even a multi-color-based system of five or more-color base can cope with a three-color base with high accuracy as long as three colors have one-to-one correspondence. As an example, a description will be made of an example of applying a seven-color-based system to a three-color base. In a case where respective colors of seven-color base are indicated by H, I, J, L, N, P, and Q, a signal value of each color of HIJLNPQ and a signal value of each color of RGB are signal values normalized to a value in a range of 0 to 1, three-color-to-seven-color conversion may be performed according to a correspondence relationship of "one-to-one correspondence" such as "H=1−R, I=1−G, J=1−B, L=0, N=0, P=0, and Q=0".

In this case, seven-color data output from the second color conversion unit 80 is subjected to a seven-color-to-three-color conversion process according to a conversion relationship of R=1−H, G=1−I, B=1−J, and L, N, P, and Q not in use, and is thus converted into RGB data (three-color data).

A description will be made of an example of applying a nine-color-based system to a three-color base. In a case where respective colors of nine-color base are indicated by H, I, J. L, N, P, Q, S, and T, a signal value of each color of HIJLNPQST and a signal value of each color of RGB are signal values normalized to a value in a range of 0 to 1, three-color-to-nine-color conversion may be performed according to a correspondence relationship of "one-to-one correspondence" such as "H=0, I=0, J=0, L=R, N=G, P=B, Q=0, S=0, and T=0".

In this case, nine-color data output from the second color conversion unit 80 is subjected to a nine-color-to-three-color conversion process according to a conversion relationship of R=L, G=N, B=P, and H, I, J, Q, S, and T not in use, and is thus converted into RGB data (three-color data).

Similarly, a seven-color-based system may be applied to a four-color base, or a nine-color-based system may be applied to a four-color base.

<Generalization of Process of Converting Nonvolatile of Dimensions of Color Space>

In a case where p is an integer of 3 or greater, and u is an integer greater than p, a u-color-based system may be applied to a p-color base. In other words, a p-color-to-u-color conversion process is added to the previous stage of a process in a u-color-based color conversion system, a u-color-to-p-color conversion process is added to the subsequent stage of the process in the u-color-based color conversion system, and thus a p-color-based system which performs a p-color-to-p-color conversion as a whole may be provided.

Figure 36:
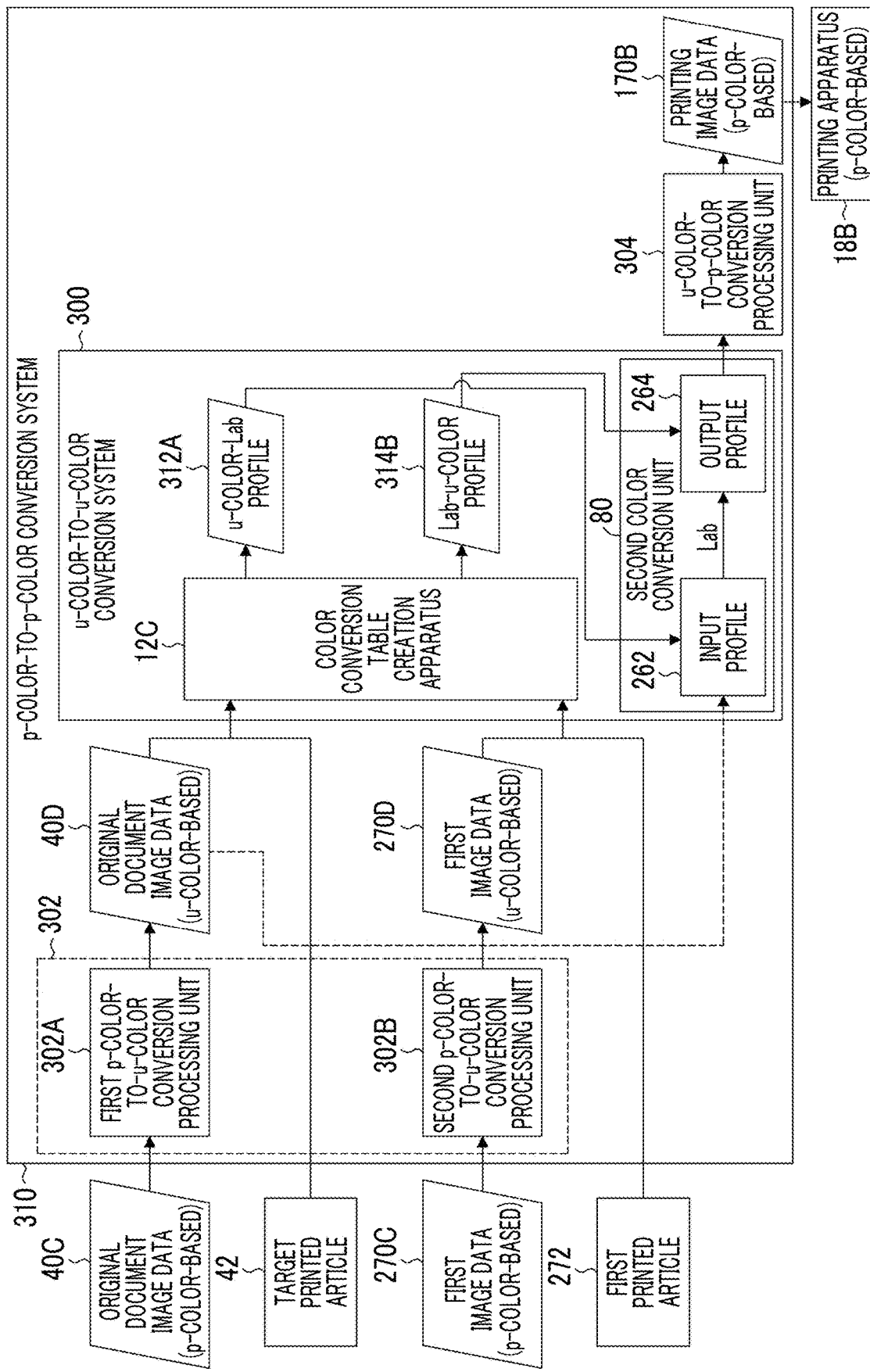
FIG. 36 is a block diagram illustrating an example of applying a u-color-to-u-color conversion system of a multi-color base (u-color base) of four or more colors to a p-color-to-p-color conversion system of a fewer-color base (p-color base).

FIG. 36 is a block diagram illustrating an example of applying a u-color-to-u-color conversion system 300 to a p-color-to-p-color conversion system 310. In FIG. 36, a constituent element identical or similar to the constituent element described in FIG. 33 is given the same reference numeral, and a description thereof will be omitted. A color conversion table creation apparatus 12C illustrated in FIG. 36 is a u-color-based color conversion table creation apparatus including the u-color-based image correlation unit 62 and the second color conversion table creation unit 66A which process u-color-based image data in the same manner as in the example described in FIG. 18.

In a case of the p-color-to-p-color conversion system 310 illustrated in FIG. 36, the target printed article 42 and p-color-based original document image data 40C corresponding to the target printed article 42 are given thereto. The printing apparatus 18B used in combination with the p-color-to-p-color conversion system 310 is a p-color-based printing apparatus.

In creation of a Lab-u-color profile 314B used as the output profile 264, p-color-based first image data 270C and the first printed article 272 which is a printed article based on the first image data 270C are given.

The p-color-to-p-color conversion system 310 includes a p-color-to-u-color conversion processing unit 302, the u-color-to-u-color conversion system 300, and a u-color-to-p-color conversion processing unit 304. The p-color-to-u-color conversion processing unit 302 performs a p-color-to-u-color conversion process in the previous stage of a process in the u-color-to-u-color conversion system 300. The p-color-to-u-color conversion processing unit 302 may be configured to include a first p-color-to-u-color conversion processing unit 302A and a second p-color-to-u-color conversion processing unit 302B.

The first p-color-to-u-color conversion processing unit 302A performs a process of converting the given p-color-based original document image data 40C into u-color-based original document image data 40D in creation of a u-color-Lab profile 312A used as the input profile 262.

The second p-color-to-u-color conversion processing unit 302B performs a process of converting the p-color-based first image data 270C into u-color-based first image data 270D in creation of an Lab-u-color profile 314B used as the output profile 264.

The first p-color-to-u-color conversion processing unit 302A performs a process of converting the p-color-based original document image data 40C into the u-color-based original document image data 40D of in converting the p-color-based original document image data 40C into p-color-based printing image data 170B through a process in the second color conversion unit 80.

Different color conversion tables may be used for the conversion process in the first p-color-to-u-color conversion processing unit 302A and the conversion process in the second p-color-to-u-color conversion processing unit 302B. An identical color conversion table may be used for the conversion process in the first p-color-to-u-color conversion processing unit 302A and the conversion process in the second p-color-to-u-color conversion processing unit 302B, and, in this case, the first p-color-to-u-color conversion processing unit 302A and the second p-color-to-u-color conversion processing unit 302B may be integrated into a single p-color-to-u-color conversion processing unit.

The u-color-to-p-color conversion processing unit 304 performs a u-color-to-p-color conversion process in the subsequent stage of the conversion process in the second color conversion unit 80. The conversion process in the u-color-to-p-color conversion processing unit 304 is an inverse conversion process to the conversion process in the second p-color-to-u-color conversion processing unit 302B.

In the p-color-to-u-color conversion process in the p-color-to-u-color conversion processing unit 302, it is preferable to perform p-color-to-u-color conversion by using a correspondence relationship that p colors of u colors have one-to-one correspondence, and respective components of the rest (u-p) colors of the u colors are "0".

In this case, the u-color-to-p-color conversion processing unit 304 performs inverse conversion to the conversion process in the second p-color-to-u-color conversion processing unit 302B on the basis of the one-to-one correspondence relationship in the second p-color-to-u-color conversion processing unit 302B, and the second p-color-to-u-color conversion processing unit 302B does not use signals of the (u-p) colors to which the correspondence relationship of the signal components being 0 is applied, and thus converts p-color-based image data into u-color-based image data.

Such conversion is performed, and thus a u-color-based system can be used in a p-color base with high accuracy.

The process functions of the p-color-to-u-color conversion processing unit 302 and the u-color-to-p-color conversion processing unit 304 illustrated in FIG. 36 may be included in the color conversion table creation apparatus 12A. A u-color-to-u-color conversion system including a u-color-based color conversion table creation apparatus similar to the color conversion table creation apparatus 12B described in FIG. 20 instead of the color conversion table creation apparatus 12C in FIG. 36 may be used. The p-color-to-p-color conversion system 310 illustrated in FIG. 36 corresponds to an example of a color conversion apparatus.

Figure 37:
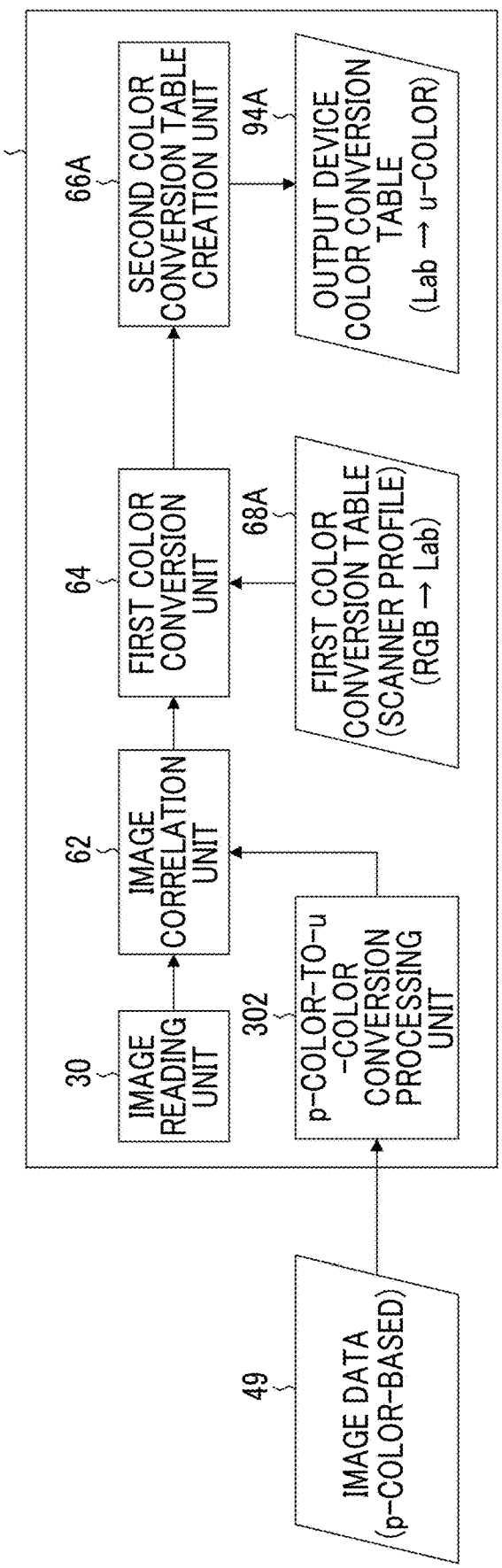
FIG. 37 is a block diagram illustrating a configuration example of the color conversion table creation apparatus in a case of applying a system of a multi-color base (u-color base) of four or more colors to a fewer-color base (p-color base).

Example of Color Conversion Table Creation Apparatus Including p-Color-to-u-Color Conversion Processing Unit FIG. 37 is a block diagram illustrating a configuration example of the color conversion table creation apparatus in a case of applying a system of a multi-color base (u-color base) of four or more colors to a fewer-color base (p-color base). FIG. 37 illustrates an example using the first type of color conversion table creation apparatus 12A described in FIG. 18.

In FIG. 37, a constituent element identical or similar to the constituent element described in FIG. 18 is given the same reference numeral, and a description thereof will be omitted.

It is assumed that the image correlation unit 62 and the second color conversion table creation unit 66A of the color conversion table creation apparatus 12A illustrated in FIG. 37 are configured to handle u-color-based image data.

The color conversion table creation apparatus 12A illustrated in FIG. 37 includes the p-color-to-u-color conversion processing unit 302. The p-color-to-u-color conversion processing unit 302 performs a p-color-to-u-color conversion process of converting p-color-based image data 49 into u-color-based image data. The p-color base is, for example, a three-color base of RGB, and the u-color base is, for example, a four-color base of CMYK. The p-color-based image data 49 may be image data of an original document image, and may be image data of a color chart.

The p-color-to-u-color conversion processing unit 302 preferably converts the p-color-based image data into the u-color-based image data by using a correspondence relationship that p colors of u colors have one-to-one correspondence, and respective signal components of the rest (u-p) colors of the u colors are "0".

A p-color-to-u-color conversion process in the p-color-to-u-color conversion processing unit 302 is put in the previous stage of the image correlation unit 62, and thus a u-color-based system can be applied to a p-color base.

The color conversion table creation apparatus 12A illustrated in FIG. 37 is combined with the second color conversion unit 80 and the u-color-to-p-color conversion processing unit 304 described in FIG. 36, and thus it is possible to realize a p-color-based color conversion system.

FIG. 37 exemplifies the first type of color conversion table creation apparatus 12A, but there may be an aspect in which the p-color-to-u-color conversion processing unit 302 is also added to the second type of color conversion table creation apparatus 12B illustrated in FIG. 20 in the same manner.

[Feedback Adjustment in Third Color Conversion Table Creation Unit 102]

The third color conversion table creation unit 102 described in FIG. 5 has a function of correcting the color conversion table in the second color conversion unit 80 on the basis of CMYK-Lab correspondence relationship data (this will be referred to as "first CMYK-Lab data") created by using the original document image data 40 and a read image of the target printed article 42, and CMYK-Lab correspondence relationship data (this will be referred to as "second CMYK-Lab data") created by using a read image of the actual printed article 50 and the original document image data 40. Such a correction process will be referred to as "feedback adjustment".

In a case of the configuration described in FIG. 5, the process of creating the first CMYK-Lab data and the process of creating the second CMYK-Lab data are separately performed, and a color extraction process in each process is also separately performed. Therefore, there may be a case where the first CMYK-Lab data and the second CMYK-Lab data do not necessarily correspond to each other.

Thus, an aspect of a configuration is preferable in which a process of checking whether or not the first CMYK-Lab data corresponds to the second CMYK-Lab data is added, and only data in which CMYK values match each other of both of the pieces of data is used for feedback adjustment.

In other words, there may be a configuration of performing an "extracted data correlation process" of extracting only data in which CMYK values match each other among CMYK-Lab extracted data groups extracted in the process of creation of the first CMYK-Lab data and CMYK-Lab extracted data groups extracted in the process of creation of the second CMYK-Lab data.

An extracted data correlation processing unit as a processing unit performing the extracted data correlation process may be provided between the first color conversion unit 64 and the third color conversion table creation unit 102 illustrated in FIG. 5, that is, in the subsequent stage of the first color conversion unit 64 and the previous stage of the third color conversion table creation unit 102. Alternatively, the extracted data correlation processing unit may be installed as a part of the functions of the third color conversion table creation unit 102.

An extracted data correlation process step may be added as a preprocess in step S146 in FIG. 6.

[Case where Camera is Used in Image Reading Unit]

In a case where a camera is used for image reading, unevenness may occur in a read image due to unevenness of light applied to a printed article. The light applied to a printed article may be, for example, ambient light, illumination light, or a combination thereof. As mentioned above, in order to cope with the problem that unevenness may occur in a read image acquired in a camera due to unevenness of light applied to a printed article, shading correction is also preferably performed in a case of using a camera in the image reading unit 30 (refer to FIG. 1).

A captured image obtained through imaging in a camera corresponds to a "read image". The term "imaging" has the same meaning as "image capturing". The camera has a two-dimensional image sensor as an imaging element, converts an imaged optical image into electrophotographic data, and generates captured image data as a color image indicating a captured image. A specific aspect of the camera is not particularly limited. The camera may be a single-plate type imaging device in which R. G, and B color filters are arranged in a mosaic form in correspondence to respective photosensitive pixels on a light receiving surface of a two-dimensional image sensor, and may be a three-plate type imaging device including a color separation optical system which separates incident light into color components of R, G, and B, and a two-dimensional image sensor provided for each channel of R, G, and B.

<Hardware Configuration of Computer Functioning as Image Editing Apparatus 12>

Figure 38:
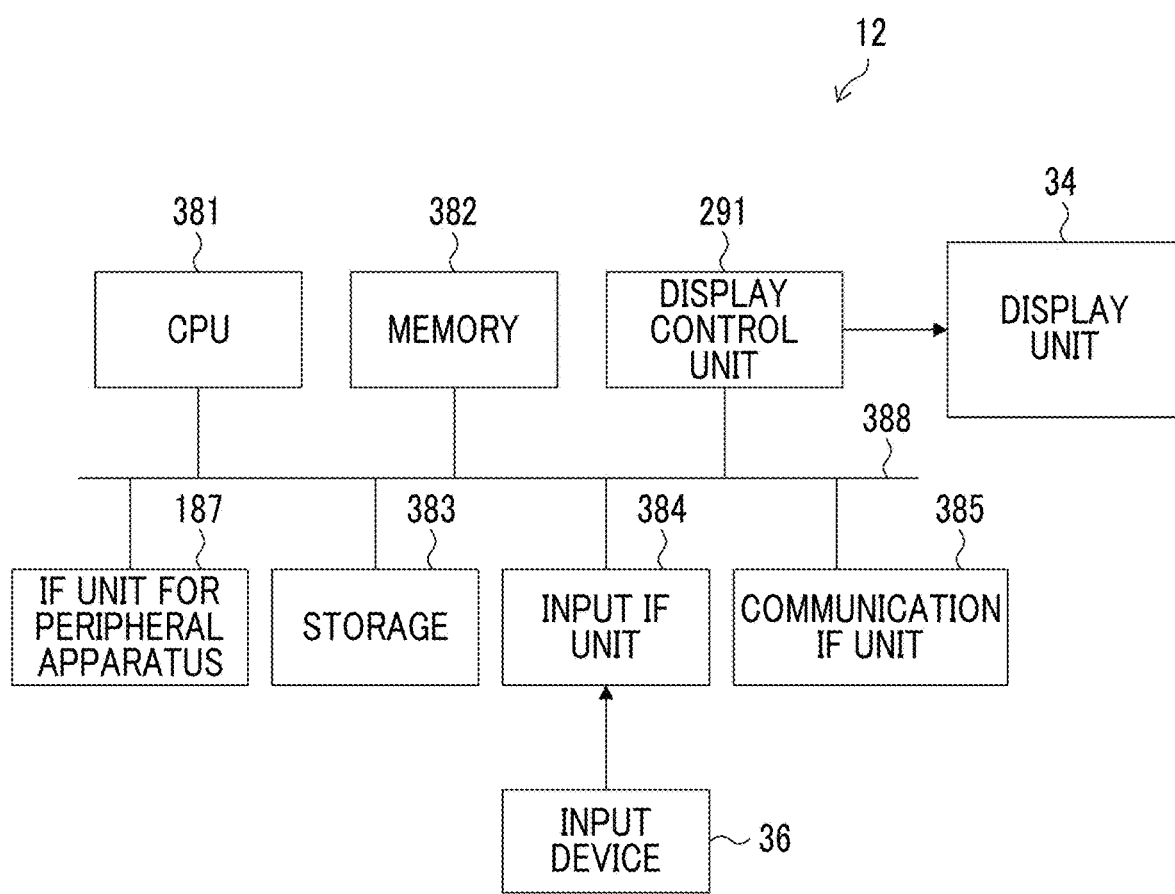
FIG. 38 is a block diagram illustrating an example of a hardware configuration of a computer.

FIG. 38 is a block diagram illustrating an example of a hardware configuration of a computer functioning as the image editing apparatus 12. The image editing apparatus 12 may be implemented by using a computer. The computer includes various types of computers such as a desktop computer, a notebook computer, or a tablet computer. The computer may be a server computer, and may be a microcomputer.

The computer functioning as the image editing apparatus 12 includes a central processing unit (CPU) 381, a memory 382, a storage 383, an input interface unit 384, a communication interface unit 385 for connection to a network, a display control unit 291, an interface unit 387 for a peripheral apparatus, and a bus 388. The "IF" in FIG. 38 indicates "interface".

The storage 383 is a storage device such as a hard disk drive and/or a solid state drive. The storage 383 stores various programs or data required to process signals. The programs stored in the storage 383 are loaded to the memory 382, and are executed by the CPU 381, and thus the computer functions as various pieces of means defined in the programs. The input device 36 is connected to the input interface unit 384. The display unit 34 is connected to the display control unit 291.

Each function including the color conversion table creation function and the color conversion processing function of the image editing apparatus 12 may be realized by a plurality of computers.

<Program Causing Computer to Function as Color Conversion Table Creation Apparatus>

A program causing a computer to function as the color conversion table creation apparatus described in the embodiment may be recorded on a CD-ROM, a magnetic disk, or other computer readable media (non-transitory information storage media which are tangible objects), and the program may be provided via the information storage media. Instead of the aspect in which a program is stored in an information storage medium so as to be provided, program signals may be provided as a download service by using a communication network such as the Internet.

The program is incorporated into the computer, and thus the computer can realize each function of the color conversion table creation apparatus, and can realize the color conversion table creation function or the color conversion processing function described in the embodiment.

Modification Examples of Embodiment

The configuration examples regarding the first principal configuration and the additional configuration thereof described in FIGS. 3, 4, 18, 20, and 28 to 37 may be combined with the configuration examples of the second principal configuration and the additional configuration thereof described in FIGS. 5 and 16 as appropriate.

The configuration using a color chart described in FIGS. 18 to 25 may be combined with the configuration using a general image described in FIGS. 26 to 29.

Advantages of Embodiment (1) According to the present embodiment, it is possible to create an output device color conversion table of a printing apparatus by using a structure of creating a target profile on the basis of a target printed article and original document image data thereof. According to the present embodiment, it is possible to improve color matching accuracy.

(2) According to the present embodiment, it is possible to create a printer profile with high accuracy without using a colorimeter. Of course, in the present embodiment, measurement accuracy may be further increased by using a colorimeter together.

(3) According to the present embodiment, it is possible to create an output device color conversion table with high accuracy by using a large number of color patches which are hard to implement in a method of creating a printer profile by using a colorimeter of the related art.

(4) According to the present embodiment, it is possible to create an output device color conversion table on the basis of data of a gradation chart or a general image and a printed article thereof.

(5) According to the aspect described in FIGS. 26 to 29, since measured data used for a profile creation process can be selected, and a sufficient amount of measured data can be secured, it is possible to create an output device color conversion table with high accuracy.

(6) Since a printer profile can be updated to the latest printer profile by using image data used for a printing job and a printed article obtained through execution of the printing job, special calibration work for a printing apparatus is not necessary.

(7) As described in FIG. 30, according to the aspect in which a scanner profile can be selected, it is possible to increase the accuracy of color management according to the accuracy requested by a customer by changing a scanner profile. For example, according to an aspect of providing an option function of being capable of selecting a scanner profile via a user interface, a user can determine whether or not a scanner profile is required to be changed as necessary, and can perform a scanner profile selection operation. According to the aspect, in a case where color reproduction accuracy satisfying a level requested by a customer can be realized, the scanner profile selection operation can be omitted, and thus it is possible to alleviate a user's operation burden. On the other hand, in a case where a level requested by a customer is not satisfied, a burden of an operation of selecting a scanner profile is increased, but it is possible to achieve accuracy improvement through a change to a more appropriate scanner profile.

(8) According to the aspect described in FIGS. 33 to 37, a u-color-based color conversion system can be used as a p-color-based color conversion system.

(9) According to the first principal configuration, it is possible to acquire a chromaticity value by reading the target printed article 42 with the image reading unit 30, and to create a color conversion table (second color conversion table 92A) of a target profile on the basis of the target printed article 42. In other words, it is possible to create a color conversion table of a target profile on the basis of the original document image data 40 and read image data of the target printed article 42 without performing printing of the printed article 50 and reading work for the printed article 50.

According to the first principal configuration, in creation of a target profile, work such as printing in the printing apparatus 18 or reading a printed article thereof takes no time.

(10) According to the second principal configuration, it is possible to correct a provisional input color conversion table or output color conversion table or to create a color correction table on the basis of a chromaticity value of the target printed article acquired by reading the target printed article 42 with the image reading unit 30, and a chromaticity value of a printed article acquired by reading a printed article with the image reading unit 30, the printed article being subjected to color conversion by using a temporary input color conversion table and being printed. Consequently, it is possible to make a color conversion table applied to the second color conversion unit 80 more appropriate, and thus to improve the accuracy of color conversion.

Such a process is repeatedly performed, and thus a color of a printed article can be caused to come closer to a color of the target printed article 42.

(11) The second color conversion table 92A created by the first principal configuration is used as an initial input color conversion table in the second principal configuration, and thus the accuracy of color reproduction in initial printing is optimized such that convergence of color matching becomes fast.

(12) According to the present embodiment, since a color conversion table representing a multi-dimensional correspondence relationship between the original document image data 40 and a corresponding chromaticity value is created, and colors of a target printed article and a printed article are matched with each other, the degree of freedom of color correction is higher, and color correction (color matching) can be performed with higher accuracy, than in a method of the related art. According to the present embodiment, even in a case where color reproduction characteristics of a printer outputting a target printed article and the printing apparatus 18 used for printing of the printed article 50 are greatly different from each other, it is possible to obtain sufficient color matching accuracy.

(13) According to the present embodiment, even in a case where a color reproduction target is designated in an actual printed article (target printed article), an appropriate color conversion table can be created, and thus color management using an ICC profile is possible. A color matching step for a target printed article can be made efficient.

The above-described embodiment of the present invention may change, add, or delete a constituent element as appropriate within the scope without departing from the spirit of the present invention. The present invention is not limited to the embodiment, and may be variously modified by a person skilled in the art within the technical spirit of the present invention.

EXPLANATION OF REFERENCES

10: printing system
12: image editing apparatus
12A, 12B, 12C: color conversion table creation apparatus
14: printing control device
16: printing section
18, 18A, 18B: printing apparatus
20: image data input unit
22: image data storage unit
24: image processing unit
26: control unit
30: image reading unit
34: display unit
36: input device
40: original document image data
40A: RGB original document image data
40B: CMYK original document image data
40C: p-color-based original document image data
40D: u-color-based original document image data
42: target printed article
44: color chart image data 45: general image data
46, 46B, 46C, 46D: color chart
47: color patch
48: gradation tile
49: p-color-based image data
50: printed article
54: color chart printed article
55: printed article
62: image correlation unit
64: first color conversion unit
66: target profile creation unit
66A: second color conversion table creation unit
68: scanner profile
68A: first color conversion table
80: second color conversion unit
82: second profile correction unit
84: difference chromaticity value calculation unit
92: target profile
92A: second color conversion table
94: printer profile
94A: output device color conversion table
96: color correction profile
102: third color conversion table creation unit
112: geometric correspondence relationship estimation unit
114: geometric transformation unit
120: read image data
122: correlated read image data
130: original document correspondence image extraction unit
132: grayscale conversion unit
134: edge extraction unit
136: thinning unit
140: read original image data
160: color conversion table database
162: input color conversion table selection unit
164: correspondence relationship data between original document image signal and chromaticity value
166: color conversion table
166: color conversion table of input profile
168: color conversion table
168: color conversion table of output profile
170: printing image data
170A: RGB printing image data
170B: p-color-based printing image data
182: color correction table
182: color conversion table
200: information presentation screen
201: color gamut cover proportion numerical value display region
202: color space display region
204: exclusion region designation button
206: deficient region designation button
212: OK button
214: cancel button
220: designation operation screen
222: read image display region
224: exclusion region designation button
226: input region designation button
228: selection range
250: first color conversion table database
252: first color conversion table selection unit
254: user interface
255, 255A. 255B: information
256: communication unit
260: four-color-to-four-color conversion system
262: input profile
262A: CMYK-Lab profile
264: output profile
264B: Lab-CMYK profile
270: first image data
270A: RGB first image data
270B: CMYK first image data
270C: p-color-based first image data
270D: u-color-based first image data
272: first printed article
280: three-color-to-three-color conversion system
282: three-color-to-four-color conversion processing unit
282A: first three-color-to-four-color conversion processing unit
282B: second three-color-to-four-color conversion processing unit
284: four-color-to-three-color conversion processing unit
290: storage unit
291: display control unit
292: designation operation unit
292A: input region designation operation unit
292B: exclusion region designation
292C: deficient region designation operation unit
294: deficient region automatic determination unit
296: digital data creation unit
298: deficient region image data
300: u-color-to-u-color conversion system
302: p-color-to-u-color conversion processing unit
302A: first p-color-to-u-color conversion processing unit
302B: second p-color-to-u-color conversion processing unit
304: u-color-to-p-color conversion processing unit
310: p-color-to-p-color conversion system
312A: u-color-Lab profile
314B: Lab-u-color profile
381: CPU
382: memory
383: storage
384: input interface unit
385: communication interface unit
387: interface unit for peripheral apparatus
388: bus
S110 to S148: steps of process in second principal configuration
S202 to S212: steps of color extraction process
S302 to S312: steps of color conversion table creation method according to embodiment
S402 to S408: steps of profile creation process
S412 to S418: steps of color conversion process

What is claimed is:

1. A color conversion table creation apparatus comprising:
an image reading unit that reads a target printed article, and acquires read image data representing a read image of the target printed article;
a first color conversion unit that converts a signal value of a first color space into a chromaticity value of a second color space by using a first color conversion table representing a correspondence relationship between the signal value of the first color space obtained from the image reading unit and the chromaticity value of the second color space which is a device-independent color space;
an image correlation unit that performs a first image correlation process of performing correlation of a positional relationship between the read image data represented by a signal value of the first color space and original document image data of the target printed article; and a color conversion table creation unit that creates a second color conversion table representing a multi-dimensional correspondence relationship between a third color space of the original document image data and the second color space on the basis of a correspondence relationship between the original document image data represented by a signal value of the third color space which is a device-dependent color space, and a chromaticity value of the read image obtained through the first image correlation process in the image correlation unit and a process in the first color conversion unit, wherein:

the image reading unit reads a first printed article which is printed by a printing apparatus on the basis of first image data represented by a signal value of the third color space, and thus acquires first printed article read image data representing a first printed article read image which is a read image of the first printed article;

the image correlation unit performs a second image correlation process of performing correlation of a positional relationship between the first printed article read image data and the first image data;

the first color conversion unit performs a process of converting a signal value of the first printed article read image data into a chromaticity value of the second color space; and the color conversion table creation unit creates an output device color conversion table representing a multi-dimensional correspondence relationship between the third color space indicating color characteristics of the printing apparatus and the second color space on the basis of a correspondence relationship between a chromaticity value of the first printed article read image and the first image data, obtained through the second image correlation process and a process on the first printed article read image data in the first color conversion unit.

2. A color conversion table creation apparatus comprising:

an image reading unit that reads a target printed article, and acquires read image data representing a read image of the target printed article;

a first color conversion unit that converts a signal value of a first color space into a chromaticity value of a second color space by using a first color conversion table representing a correspondence relationship between the signal value of the first color space obtained from the image reading unit and the chromaticity value of the second color space which is a device-independent color space;

an image correlation unit that performs a third image correlation process of performing correlation of a positional relationship between read chromaticity value image data obtained by converting a signal value of the read image data into a chromaticity value of the second color space in the first color conversion unit, and original document image data of the target printed article; and a color conversion table creation unit that creates a second color conversion table representing a multi-dimensional correspondence relationship between a third color space of the original document image data and the second color space on the basis of a correspondence relationship between the original document image data represented by a signal value of the third color space which is a device-dependent color space, and a chromaticity value of the read image obtained through a process in the first color conversion unit and the third image correlation process in the image correlation unit, wherein:

the image reading unit reads first printed article which is printed by a printing apparatus on the basis of first image data represented by a signal value of the third color space, and thus acquires first printed article read image data indicating a first printed article read image which is a read image of the first printed article;

the first color conversion unit performs a process of converting a signal value of the first printed article read image data into a chromaticity value of the second color space;

the image correlation unit performs a fourth image correlation process of performing correlation of a positional relationship between first printed article read chromaticity value image data obtained by converting a signal value of the first printed article read image data into a chromaticity value of the second color space in the first color conversion unit, and the first image data; and the color conversion table creation unit creates an output device color conversion table representing a multi-dimensional correspondence relationship between the third color space indicating color characteristics of the printing apparatus and the second color space on the basis of a correspondence relationship between a chromaticity value of the first printed article read image and the first image data, obtained through the fourth image correlation process.

3. The color conversion table creation apparatus according to claim 1, wherein:

the first image data is data of a color chart; and the first printed article is a printed article on which the color chart is printed.

4. The color conversion table creation apparatus according to claim 3, wherein:

the color chart is a chart including a plurality of color patches of different colors; and a single partition of the color patches has an area larger than an area of a single pixel of a reading pixel defined on the basis of a reading resolving power of the image reading unit, and has an area smaller than an area of a square shape of which one side has 6 millimeters.

5. The color conversion table creation apparatus according to claim 3, wherein the color chart is a gradation chart in which a grayscale is consecutively changed.

6. The color conversion table creation apparatus according to claim 1, wherein the first image data is image data representing a picture other than a color chart, and is image data of an image which is a picture to be printed and is designated in a printing job.

7. The color conversion table creation apparatus according to claim 1, wherein the output device color conversion table is created by using a plurality of types of the first image data and a plurality of types of the first printed articles which are printed on the basis of the respective types of the first image data.

8. The color conversion table creation apparatus according to claim 7, further comprising:

a display unit that provides visualization information to a user in creating the output device color conversion table by using the plurality of types of first printed articles.

9. The color conversion table creation apparatus according to claim 8, wherein information indicating a range in which data of a color gamut is covered in the entire color gamut required for the output device color conversion table is displayed on the display unit.

10. The color conversion table creation apparatus according to claim 9, further comprising:
a deficient region designation operation unit that receives an operation of a user designating a deficient region which is a color gamut in which data is deficient in the entire color gamut required for the output device color conversion table; and
a digital data creation unit that creates digital data as the first image data including color information of the deficient region according to designation from the deficient region designation operation unit.

11. The color conversion table creation apparatus according to claim 9, further comprising:
a deficient region automatic determination unit that automatically determines a deficient region which is a color gamut in which data is deficient in the entire color gamut required for the output device color conversion table; and
a digital data creation unit that creates digital data as the first image data including color information of the deficient region according to a determination result in the deficient region automatic determination unit.

12. The color conversion table creation apparatus according to claim 8, wherein the first printed article read image is displayed on the display unit.

13. The color conversion table creation apparatus according to claim 8, further comprising a designation operation unit that receives at least one of a first designation operation of a user designating data which is to be used to create the output device color conversion table or a second designation operation of the user designating non-use data which is not to be used to create the output device color conversion table,
wherein the color conversion table creation unit creates the output device color conversion table according to designation from the designation operation unit.

14. The color conversion table creation apparatus according to claim 1, wherein the output device color conversion table is created by the color conversion table creation unit, and then the output device color conversion table is further updated by using, as the first printed article, a printed article which is printed by the printing apparatus according to a printing job.

15. The color conversion table creation apparatus according to claim 1, further comprising:
an information acquisition unit that acquires information for specifying a combination of a color material type and a base material type used to create a printed article in the printing apparatus;
a first color conversion table database that stores a plurality of color conversion tables applicable as the first color conversion table; and
a first color conversion table selection unit that selects a single color conversion table from among the plurality of color conversion tables stored in the first color conversion table database, wherein:
the plurality of color conversion tables include a color conversion table representing a correspondence relationship between a reading signal in the image reading unit and a chromaticity value for each combination of a color material type and a base material type used to create a printed article in the printing apparatus; and
the first color conversion table selection unit performs a process of selecting a single color conversion table from among the plurality of color conversion tables on the basis of the information acquired via the information acquisition unit.

16. The color conversion table creation apparatus according to claim 15, wherein the information acquired by the information acquisition unit includes color material information for specifying a color material type and base material type information for specifying a base material type.

17. The color conversion table creation apparatus according to claim 15, wherein the information acquisition unit is configured to include a user interface that receives an input operation for information for specifying a combination of a color material type and a base material type used to create a printed article in the printing apparatus.

18. The color conversion table creation apparatus according to claim 15, wherein the information acquisition unit is configured to include a communication unit that transmits and receives data to and from the printing apparatus, and incorporates the information from the printing apparatus via the communication unit.

19. The color conversion table creation apparatus according to claim 1, further comprising:
the image correlation unit and the color conversion table creation unit corresponding to a u-color base in a case where p is an integer of 3 or greater, and u is an integer greater than p, in which the third color space is a u-color-based color space; and
a p-color-to-u-color conversion processing unit that converts p-color-based image data into u-color-based image data,
wherein the p-color-to-u-color conversion processing unit converts the p-color-based image data into the u-color-based image data by using a correspondence relationship that p colors of u colors have one-to-one correspondence, and respective signal components of the rest (u-p) colors of the u colors are 0.

20. The color conversion table creation apparatus according to claim 19, wherein:
the u-color base is a four-color base of CMYK using four colors including cyan, magenta, yellow, and black, and the p-color base is a three-color base of RGB using three colors including red, green, and blue; and
in a case where a signal of each color of CMYK and a signal of each color of RGB are signals normalized to a value in a range from 0 to 1, the p-color-to-u-color conversion processing unit converts four-color-based image data into three-color-based image data by using a correspondence relationship of C=(1−R), M=(1−G), Y=(1−B), and K=0.

21. A color conversion apparatus comprising:
the color conversion table creation apparatus according to claim 19;
a second color conversion unit that performs color conversion on image data by using an input profile and an output profile, the second color conversion table created by the color conversion table creation apparatus being used as the input profile, and the output device color conversion table created by the color conversion table creation apparatus being used as the output profile; and
a u-color-to-p-color conversion processing unit that converts u-color-based image data obtained through the color conversion in the second color conversion unit into p-color-based image data, wherein:
each of the original document image data and the first image data is converted into u-color-based image data by the p-color-to-u-color conversion processing unit;

u-color-based original document image data which is u-color-based image data obtained by converting the original document image data in the p-color-to-u-color conversion processing unit is subjected to color conversion in the second color conversion unit; and the u-color-to-p-color conversion processing unit performs inverse conversion to the conversion in the p-color-to-u-color conversion processing unit on the basis of the one-to-one correspondence relationship in the p-color-to-u-color conversion processing unit, and converts p-color-based image data into u-color-based image data by not using signals of the rest (u-p) colors to which a correspondence relationship of signal components being 0 is applied in the p-color-to-u-color conversion processing unit.

22. A color conversion table creation method comprising:

an image reading step of causing an image reading unit to read a target printed article, and to acquire read image data representing a read image of the target printed article;

a first color conversion step of converting a signal value of a first color space into a chromaticity value of a second color space by using a first color conversion table representing a correspondence relationship between the signal value of the first color space obtained from the image reading unit and the chromaticity value of the second color space which is a device-independent color space;

an image correlation step of performing a first image correlation process of performing correlation of a positional relationship between the read image data represented by a signal value of the first color space and original document image data of the target printed article;

a color conversion table creation step of creating a second color conversion table representing a multi-dimensional correspondence relationship between a third color space of the original document image data and the second color space on the basis of a correspondence relationship between the original document image data represented by a signal value of the third color space which is a device-dependent color space, and a chromaticity value of the read image obtained through the first image correlation process in the image correlation step and a process in the first color conversion step;

a step of causing the image reading unit to read a first printed article which is printed by a printing apparatus on the basis of first image data represented by a signal value of the third color space, and thus to acquire first printed article read image data representing a first printed article read image which is a read image of the first printed article;

a step of performing a second image correlation process of performing correlation of a positional relationship between the first printed article read image data and the first image data;

a step of performing a process of converting a signal value of the first printed article read image data into a chromaticity value of the second color space by using the first color conversion table; and a step of creating an output device color conversion table representing a multi-dimensional correspondence relationship between the third color space indicating color characteristics of the printing apparatus and the second color space on the basis of a correspondence relationship between a chromaticity value of the first printed article read image and the first image data, obtained through the second image correlation process and the process of converting a signal value of the first printed article read image data into a chromaticity value of the second color space.

23. A color conversion table creation method comprising:

an image reading step of causing an image reading unit to read target printed article, and to acquire read image data representing a read image of the target printed article;

a first color conversion step of converting a signal value of a first color space into a chromaticity value of a second color space by using a first color conversion table representing a correspondence relationship between the signal value of the first color space obtained from the image reading unit and the chromaticity value of the second color space which is a device-independent color space;

an image correlation step of performing a third image correlation process of performing correlation of a positional relationship between read chromaticity value image data obtained by converting a signal value of the read image data into a chromaticity value of the second color space in the first color conversion step, and original document image data of the target printed article;

a color conversion table creation step of creating a second color conversion table representing a multi-dimensional correspondence relationship between a third color space of the original document image data and the second color space on the basis of a correspondence relationship between the original document image data represented by a signal value of the third color space which is a device-dependent color space, and a chromaticity value of the read image obtained through a process in the first color conversion step and the third image correlation process in the image correlation step;

a step of causing the image reading unit to read a first printed article which is printed by a printing apparatus on the basis of first image data represented by a signal value of the third color space, and thus to acquire first printed article read image data indicating a first printed article read image which is a read image of the first printed article;

a step of performing a process of converting a signal value of the first printed article read image data into a chromaticity value of the second color space by using the first color conversion table;

a step of performing a fourth image correlation process of performing correlation of a positional relationship between first printed article read chromaticity value image data obtained by converting a signal value of the first printed article read image data into a chromaticity value of the second color space by using the first color conversion table, and the first image data; and a step of creating an output device color conversion table representing a multi-dimensional correspondence relationship between the third color space indicating color characteristics of the printing apparatus and the second color space on the basis of a correspondence relationship between a chromaticity value of the first printed article read image and the first image data, obtained through the fourth image correlation process.

24. A non-transitory computer-readable tangible medium comprising computer executable instructions stored thereon, which, when executed by one or more processors, cause the one or more processors to execute:

a function of acquiring read image data representing a read image of a target printed article from an image reading unit reading the target printed article;

a first color conversion function of converting a signal value of a first color space into a chromaticity value of a second color space by using a first color conversion table representing a correspondence relationship between the signal value of the first color space obtained from the image reading unit and the chromaticity value of the second color space which is a device-independent color space;

an image correlation function of performing a first image correlation process of performing correlation of a positional relationship between the read image data represented by a signal value of the first color space and original document image data of the target printed article;

a color conversion table creation function of creating a second color conversion table representing a multi-dimensional correspondence relationship between a third color space of the original document image data and the second color space on the basis of a correspondence relationship between the original document image data represented by a signal value of the third color space which is a device-dependent color space, and a chromaticity value of the read image obtained through the first image correlation process using the image correlation function and a process using the first color conversion function;

a function of causing the image reading unit to read a first printed article which is printed by a printing apparatus on the basis of first image data represented by a signal value of the third color space, and thus to acquire first printed article read image data representing a first printed article read image which is a read image of the first printed article;

a function of performing a second image correlation process of performing correlation of a positional relationship between the first printed article read image data and the first image data;

a function of performing a process of converting a signal value of the first printed article read image data into a chromaticity value of the second color space by using the first color conversion table; and a function of creating an output device color conversion table representing a multi-dimensional correspondence relationship between the third color space indicating color characteristics of the printing apparatus and the second color space on the basis of a correspondence relationship between a chromaticity value of the first printed article read image and the first image data, obtained through the second image correlation process and the process of converting a signal value of the first printed article read image data into a chromaticity value of the second color space.

25. A non-transitory computer-readable tangible medium comprising computer executable instructions stored thereon, which, when executed by one or more processors, cause the one or more processors to execute:

a function of acquiring read image data representing a read image of a target printed article from an image reading unit reading the target printed article;

a first color conversion function of converting a signal value of a first color space into a chromaticity value of a second color space by using a first color conversion table representing a correspondence relationship between the signal value of the first color space obtained from the image reading unit and the chromaticity value of the second color space which is a device-independent color space;

an image correlation function of performing a third image correlation process of performing correlation of a positional relationship between read chromaticity value image data obtained by converting a signal value of the read image data into a chromaticity value of the second color space by using the first color conversion function, and original document image data of the target printed article;

a color conversion table creation function of creating a second color conversion table representing a multi-dimensional correspondence relationship between a third color space of the original document image data and the second color space on the basis of a correspondence relationship between the original document image data represented by a signal value of the third color space which is a device-dependent color space, and a chromaticity value of the read image obtained through a process using the first color conversion function and the third image correlation process using the image correlation function;

a function of causing the image reading unit to read a first printed article which is printed by a printing apparatus on the basis of first image data represented by a signal value of the third color space, and thus to acquire first printed article read image data indicating a first printed article read image which is a read image of the first printed article;

a function of performing a process of converting a signal value of the first printed article read image data into a chromaticity value of the second color space by using the first color conversion table;

a function of performing a fourth image correlation process of performing correlation of a positional relationship between first printed article read chromaticity value image data obtained by converting a signal value of the first printed article read image data into a chromaticity value of the second color space by using the first color conversion table, and the first image data; and a function of creating an output device color conversion table representing a multi-dimensional correspondence relationship between the third color space indicating color characteristics of the printing apparatus and the second color space on the basis of a correspondence relationship a chromaticity value of the first printed article read image and the first image data, obtained through the fourth image correlation process.

* * * * *